United States Patent
Baker et al.

(10) Patent No.: US 11,124,705 B2
(45) Date of Patent: Sep. 21, 2021

(54) LIGHT MODULATION ELEMENT

(71) Applicant: Merck Patent GmbH, Darmstadt (DE)

(72) Inventors: Phil Baker, Eastleigh (GB); Rachel Tuffin, Chandlers Ford (GB); Joseph Sargent, Southampton (GB); Ian Sage, Malvern (GB)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 16/606,324

(22) PCT Filed: Apr. 17, 2018

(86) PCT No.: PCT/EP2018/059711
§ 371 (c)(1),
(2) Date: Oct. 18, 2019

(87) PCT Pub. No.: WO2018/192896
PCT Pub. Date: Oct. 25, 2018

(65) Prior Publication Data
US 2020/0123446 A1    Apr. 23, 2020

(30) Foreign Application Priority Data
Apr. 20, 2017 (EP) .................................... 17167260

(51) Int. Cl.
*C09K 19/56* (2006.01)
*C09K 19/30* (2006.01)
*G02F 1/1337* (2006.01)

(52) U.S. Cl.
CPC .......... *C09K 19/56* (2013.01); *C09K 19/3003* (2013.01); *G02F 1/133788* (2013.01); C09K 2019/301 (2013.01); C09K 2019/3004 (2013.01); C09K 2019/3009 (2013.01); C09K 2019/3016 (2013.01); C09K 2323/00 (2020.08); C09K 2323/03 (2020.08); G02F 1/133738 (2021.01)

(58) Field of Classification Search
CPC ................ C09K 19/56; C09K 19/3003; C09K 2019/3004; C09K 2019/301; C09K 2019/3016; C09K 2323/00; C09K 2323/03; C09K 2323/035; G02F 1/133788; G02F 2001/133738
USPC ....... 428/1.1, 1.3; 252/299.01, 299.4, 299.5; 349/117
See application file for complete search history.

(56) References Cited

U.S. PATENT DOCUMENTS

2016/0062166 A1    3/2016 Kim et al.

FOREIGN PATENT DOCUMENTS

| EP | 0940707 B1 | 7/2006 |
|---|---|---|
| EP | 2990862 A1 | 3/2016 |
| WO | 2017/102068 A1 | 6/2017 |

OTHER PUBLICATIONS

International Search Report dated Jul. 9, 2018 issued in corresponding PCT/EP2018/059711 application (3 pages).
M. Mizusaki et al., "Fabrication of Homogenously Self-Alignment Fringe-Field Switching Mode Liquid Crystal Cell Without Using a Conventional Alignment Layer", Liquid Crystals (2017) pp. 1-8.

*Primary Examiner* — Ruiyun Zhang
(74) *Attorney, Agent, or Firm* — Millen, White, Zelano & Branigan, P.C.

(57) ABSTRACT

The invention relates to a light modulation element comprising a pair of substrates, one or more optical films located on the inner side of one of the substrates, an electrode structure capable of inducing an electric field substantially in parallel to the substrates main plane, and a homogenously aligned liquid crystalline medium which is obtainable from a photoalignment component A) and a liquid-crystalline component B). Furthermore, the invention relates process of production of the light modulation element, to the use of the light modulation element in an electro optical device and to an electro optical device comprising said light modulation element.

14 Claims, No Drawings

LIGHT MODULATION ELEMENT

TECHNICAL FIELD

The invention relates to a light modulation element comprising a pair of substrates, one or more optical films located on the inner side of at least one of the substrates, an electrode structure capable of inducing an electric field substantially in parallel to the substrates main plane, and a homogenously aligned liquid crystalline medium, which is obtainable from a photoalignment component A) and a liquid-crystalline component B). Furthermore, the invention relates to a process of production of the light modulation element, to the use of the light modulation element in an electro optical device and to an electro optical device comprising said light modulation element.

BACKGROUND OF THE INVENTION

Liquid-crystalline media have been used for decades in electro-optical displays (liquid crystal displays—LCD) for the purpose of information display. The liquid crystal displays (LC displays) used at present are often those of the TN ("twisted nematic") type. However, these have the disadvantage of a strong viewing-angle dependence of the contrast.

Furthermore, so-called IPS ("in plane switching") displays and later, FFS ("fringe-field switching") displays have been reported (see, inter alia, S. H. Jung et al., Jpn. J. Appl. Phys., Volume 43, No. 3, 2004, 10289).

FFS displays usually contain an LC medium with positive dielectric anisotropy, and an alignment layer, usually of polyimide, which provides planar alignment to the molecules of the LC medium.

Furthermore, FFS displays have been disclosed (see S. H. Lee et al., Appl. Phys. Lett. 73(20), 1998, 2882-2883 and S. H. Lee et al., Liquid Crystals 39(9), 2012, 1141-1148), which have similar electrode design and layer thickness as FFS displays.

In order to achieve a uniform alignment of the liquid crystal across the whole area of the display, an alignment layer on top of the substrates is required that is in contact with the liquid crystal. Rubbed polyimide has been used for a long time to align liquid crystals homogenous.

However, the rubbing process causes a number of problems: Mura, contamination, problems with static discharge, debris, etc. Hence, the effort for the production of a polyimide layer, treatment of the layer and improvement with bumps or polymer layers is relatively great. A simplifying technology, which on the one hand reduces production costs and on the other hand helps to optimise the image quality (viewing-angle dependence, contrast, and response times), would therefore be desirable.

In the prior art, a mechanism of orienting polymers comprising a suitable chromophore is described where photomodification is initiated by irradiation with linear polarised light resulting in a preferred molecular configuration (cf. U.S. Pat. No. 5,389,698). Based on these findings, photoalignment was developed, which is a technology for achieving liquid crystal alignment that avoids rubbing by such a light-induced orientational ordering of the alignment surface.

Photoalignment is a technology for achieving liquid crystal (LC) alignment that avoids rubbing by replacing it with a light induced orientational ordering of the alignment surface. This can be achieved through the mechanisms of photodecomposition, photodimerization, and photoisomerization. In this regards, N. A. Clark et al., Langmuir 2010, 26(22), 17482-17488 have shown that it is possible to self-assemble a compound of the following structure

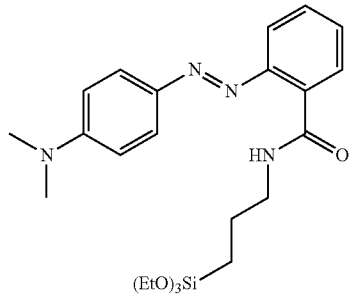

onto a substrate to give a monolayer that is able to be photoaligned to induce homogeneous alignment of a liquid crystal. However, a separate step of self-assembly before manufacture of the LC cell was performed and reversibility of the alignment upon exposure to light was reported.

Further, Mizusaki et al. disclose the fabrication of homogenously self-alignment fringe-field switching mode liquid crystal cell without using a conventional alignment layer in Liquid Crystals 2017, 1-8.

Even though, IPS/FFS displays exhibit, in general, a comparable low viewing-angle dependence of the contrast, there is still the problem of light leakage when crossed linear polarizers are utilized in these modes.

For solving the light leakage problem associated with crossed linear polarizers, several compensation methods have been disclosed. For example, in Chen et al., "Optimum film compensation modes for TN and VA LCDs", SID 1998 Digest, pp 315-318 (1998) and J. E. Anderson and P. J. Bos, "Methods and concerns of compensating in-plane switching liquid crystal displays", Jpn. J. Appl. Phys., Vol. 39, pp 6388-6392 (2000), a method is disclosed for using a positive birefringence C-film ($n_x=n_y<n_z$) plus a positive birefringence A-film ($n_x>n_y=n_z$), where the z-axis is along the film surface normal direction, i.e. the film thickness direction and x axis is parallel to the optical axis direction.

An alternative method using a single biaxial film ($n_x>n_y>n_z$) to compensate for the light leakage of crossed linear polarizers is disclosed in Y. Saitoh et al., "Optimum film compensation of viewing angle of contrast in in-plane-switching-mode liquid crystal display", Jpn. J. Appl. Phys. Part 1, Vol. 37, pp 4822-4828 (1998).

In addition, a design using two biaxial films to compensate light leakage in a large wavelength range is disclosed in T. Ishinable et al., "A wide viewing angle polarizer and a quarter-wave plate with a wide wavelength range for extremely high quality LCDs", IDW"01, pp 485-488 (2001) and T. Ishinable et al., "A wide viewing angle polarizer with a large wavelength range", Jpn. Appl. Phys. Part 1, Vol. 41, pp. 4553-4558 (2002).

However, all of the above-mentioned methods and means are conventionally employed between the LC cell and the polarisers and are consequently separated from the LC by a layer of glass or polymer, which is in some circumstances, for example for touchscreen applications or flexible displays, unfavourable due to a connected change in birefringence of the substrate material. Some of these problems and its respective solutions are disclosed, e.g., in US 2012/0099053 A1, WO 2009/037565 A2 and EP 2990862 A1, which all suggest an in-cell application of optical films.

In detail, compared to conventional displays, where optical films or retarders are usually placed between the LC cell and the polarisers, in-cell application of an optical retardation film has several advantages. For example, a display where the optical film is attached outside of the glass substrates forming the LC cell usually suffers from parallax problems, which can severely impair viewing angle properties. If the optical films are located inside the LC display cell, these parallax problems can be reduced or even avoided.

Furthermore, in-cell application of the optical films allows the reduction of the total thickness of the LCD device, which is an important advantage for flat panel displays. Another advantage is that the resulting displays become more robust.

However, all above-mentioned in-cell applications of an optical film utilize an additional alignment layer on top of the optical films in order to align the liquid crystals homogenously independently of an adjacent optical film. For example, optical films obtainable from reactive mesogen mixtures or polymerisable LC materials have an influence on the alignment of the adjacent liquid crystalline medium, which is caused by the alignment of the utilized reactive mesogens after curing. The orientation of the liquid crystal molecules in the polymerized film can thereby be planar, i.e. where the liquid crystal molecules are oriented substantially parallel to the layer, homeotropic (rectangular or perpendicular to the layer) or tilted. Corresponding optical films are described, for example, in EP 0940707 B1, EP 0888565 B1 and GB 2329393 B1.

Therefore, an additional alignment layer on top of the utilized optical films is usually applied, for example, rubbed polyimide. As commonly known, polyimides are processed at very high temperatures ranging approximately from 180° C. to 220° C. or higher and are consequently not compatible with all types of substrates, such as flexible plastic substrates. Furthermore, baking or annealing of the polyimide at these temperatures typically degrades the retardation of the optical films, in particular optical films based on reactive mesogens, which make them undesirable for in-cell applications. Moreover and as already mentioned above, the following rubbing process of the polyimide causes a number of other problems, such as Mura, contamination, problems with static discharge, debris, etc.

In summary, the attempts of prior art are connected with several disadvantages such as, in particular, a decreasing contrast ratio or unfavourable processing steps, which are especially not compatible with commonly known methods or materials for the mass production of corresponding LC devices.

Thus, one aim of the invention is to provide an alternative or preferably improved liquid crystal (LC) light modulation element, preferably of the FFS or IPS mode, and a process for its production, which does not have the drawbacks of the prior art, and preferably have the advantages mentioned above and below.

Other aims of the present invention are immediately evident to the person skilled in the art from the following detailed description.

Surprisingly, the inventors have found out that one or more of the above-defined aims can be achieved by providing a light modulation element according to claim 1.

TERMS AND DEFINITIONS

The following meanings apply above and below:

The term "liquid crystal", "mesomorphic compound", or "mesogenic compound" (also shortly referred to as "mesogen") means a compound that under suitable conditions of temperature, pressure and concentration can exist as a mesophase (nematic, smectic, etc.) or in particular as a LC phase. Non-amphiphilic mesogenic compounds comprise for example one or more calamitic, banana-shaped or discotic mesogenic groups.

The term "mesogenic group" means a group with the ability to induce liquid-crystalline phase (or mesophase) behaviour. The compounds comprising mesogenic groups do not necessarily have to exhibit a liquid-crystalline mesophase themselves. It is also possible that they show liquid-crystalline mesophases only in mixtures with other compounds, or when the mesogenic compounds or materials, or the mixtures thereof, are polymerised. This includes low-molecular-weight non-reactive liquid-crystalline compounds, reactive or polymerisable liquid-crystalline compounds, and liquid-crystalline polymers. For the sake of simplicity, the term "liquid crystal" is used hereinafter for both mesogenic and LC materials.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" or "polymerisable LC compounds" means a polymerisable mesogenic or liquid crystal compound, preferably a monomeric compound. These compounds can be used as pure compounds or as mixtures of reactive mesogens with other compounds functioning as photoinitiators, inhibitors, surfactants, stabilizers, chain transfer agents, non-polymerisable compounds, etc.

Polymerisable compounds with one polymerisable group are also referred to as "monoreactive" compounds, compounds with two polymerisable groups as "direactive" compounds, and compounds with more than two polymerisable groups, i.e. three, four, five or more as "multireactive" compounds. Compounds without a polymerisable group are also referred to as "non-reactive or non-polymerisable" compounds.

The terms, LC material, LC medium or LC formulation, each non-polymerisable or polymerisable, or photoreactive or non-photoreactive, or mixtures thereof, mean a material, which comprises of more than 80% by weight, preferably more than 90% by weight, more preferably more than 95% by weight of mesogenic compounds, as described above and below.

In a preferred embodiment, the photoalignment component A of the utilized LC medium in accordance with the present invention comprises, preferably consists of, one or more photoreactive compounds, preferably one or more photoreactive mesogenic compounds.

In a preferred embodiment the liquid-crystalline component B) of a LC medium in accordance with the present invention comprises, preferably consists of one or more non-polymerisable mesogenic or nematogenic liquid crystalline compounds.

The term "non-mesogenic compound or material" means a compound or material that does not contain a mesogenic group as defined above.

A photoreactive group according to the present invention is a functional group of a molecule that causes a change of the geometry of the molecule either by bond rotation, skeletal rearrangement or atom- or group-transfer, or by dimerization, upon irradiation with light of a suitable wavelength that can be absorbed by the molecule. Examples of photoreactive groups are —C=C— double bonds and azo groups (—N=N—). Examples of molecular structures or sub-structures comprising such photoreactive groups are stilbene, (1,2-difluoro-2 phenyl vinyl)-benzene, cinnamate, 4-phenylbut-3-en-2-one, chalcone, coumarin, chromone, pentalenone and azobenzene.

The terms "photoreactive compounds", or "photosensitive compounds" refer to compounds, which comprise a photoreactive group, and which change their structure or shape upon photoirradiation by reactions including, but not limited to, photoisomerisation, photo-induced 2+2 cycloaddition, photo-fries arrangement or a comparable photodegradation process. Photopolymerisation reactions are not included in these meanings. However, the photoreactive or photosensitive compounds as described in this invention can in addition also be polymerisable or photopolymerisable.

A photoreactive reactive mesogen according to the present invention is a reactive mesogenic compound comprising one or more photoreactive groups.

"Polymerisable groups" (P) are preferably selected from groups containing a C=C double bond or C≡C triple bond, and groups which are suitable for polymerisation with ring opening, such as, for example, oxetane or epoxide groups.

Preferably, polymerisable groups (P) are selected from the group consisting of $CH_2=CW^1-COO-$, $CH_2=CW^1-CO-$,

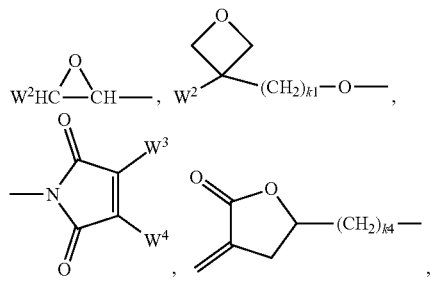

$CH_2=CW^2-(O)_{k3}-$, $CW^1=CH-CO-(O)_{k3}-$, $CW^1=CH-CO-NH-$, $CH_2=CW^1-CO-NH-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-CH=CH—, in which $W^1$ denotes H, F, Cl, CN, $CF_3$, phenyl or alkyl having 1 to 5 C atoms, in particular H, F, Cl or $CH_3$, $W^2$ denotes H or alkyl having 1 to 5 C atoms, in particular H, methyl, ethyl or n-propyl, $W^3$ and $W^4$ each, independently of one another, denote H, Cl or alkyl having 1 to 5 C atoms, Phe denotes 1,4-phenylene, which is optionally substituted by one or more radicals L as being defined below but being different from P-Sp, preferably preferred substituents L are F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl, and $k_1$, $k_2$ and $k_3$ each, independently of one another, denote 0 or 1, $k_3$ preferably denotes 1, and $k_4$ is an integer from 1 to 10.

Particularly preferred polymerizable groups P are $CH_2=CH-COO-$, $CH_2=C(CH_3)-COO-$, $CH_2=CF-COO-$, $CH_2=CH-$, $CH_2=CH-O-$, $(CH_2=CH)_2CH-OCO-$, $(CH_2=CH)_2CH-O-$,

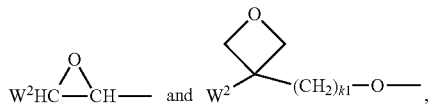

in which $W^2$ denotes H or alkyl having 1 to 5 C atoms, in particular H, methyl, ethyl or n-propyl and $k_1$ denotes 0 or 1.

Further preferred polymerizable groups (P) are, vinyl, vinyloxy, acrylate, methacrylate, fluoroacrylate, chloroacrylate, oxetane and epoxide, most preferably acrylate or methacrylate, in particular acrylate.

Preferably, all multireactive polymerisable compounds and sub-formulae thereof contain instead of one or more radicals P-Sp-, one or more branched radicals containing two or more polymerisable groups P (multireactive polymerisable radicals).

Suitable radicals of this type, and polymerisable compounds containing them, are described, for example, in U.S. Pat. No. 7,060,200 B1 or US 2006/0172090 A1.

Particular preference is given to multireactive polymerisable radicals selected from the following formulae:

| | |
|---|---|
| —X-alkyl-CHP$^x$—CH$_2$—CH$_2$P$^y$ | I*a |
| —X-alkyl-C(CH$_2$P$^x$)(CH$_2$P$^y$)—CH$_2$P$^z$ | I*b |
| —X-alkyl-CHP$^x$CHP$^y$—CH$_2$P$^z$ | I*c |
| —X-alkyl-C(CH$_2$P$^x$)(CH$_2$P$^y$)—C$_{aa}$H$_{2aa+1}$ | I*d |
| —X-alkyl-CHP$^x$—CH$_2$P$^y$ | I*e |
| —X-alkyl-CHP$^x$P$^y$ | I*f |
| —X-alkyl-CP$^x$P$^y$—C$_{aa}$H$_{2aa+1}$ | I*g |
| —X-alkyl-C(CH$_2$P$^y$)(CH$_2$P$^w$)—CH$_2$OCH$_2$—C(CH$_2$P$^x$)(CH$_2$P$^y$)CH$_2$P$^z$ | I*h |
| —X-alkyl-CH((CH$_2$)$_{aa}$P$^x$)((CH$_2$)$_{bb}$P$^y$) | I*i |
| —X-alkyl-CHP$^x$CHP$^y$—C$_{aa}$H$_{2aa+1}$ | I*k | in which alkyl denotes a single bond or straight-chain or branched alkylene having 1 to 12 C atoms, in which one or more non-adjacent $CH_2$ groups may each be replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where R$^x$ has one the abovementioned meaning, aa and bb each, independently of one another, denote 0, 1, 2, 3, 4, 5 or 6, X has one of the meanings indicated for X', and P$^v$ to P$^z$ each, independently of one another, have one of the meanings indicated above for P.

Preferred spacer groups Sp are selected from the formula Sp'-X', so that the radical "P-Sp-" conforms to the formula "P-Sp'-X'—", where Sp' denotes alkylene having 1 to 20, preferably 1 to 12 C atoms, which is optionally mono- or polysubstituted by F, Cl, Br, I or CN and in which, in addition, one or more non-adjacent CH$_2$ groups may each be replaced, independently of one another, by —O—, —S—, —NH—, —NR$^{xx}$—, —SiR$^{xx}$R$^{yy}$—, —CO—, —COO—, —OCO—, —OCO—O—, —S—CO—, —CO—S—, —NR$^{xx}$—CO—O—, —O—CO—NR$^{oxx}$—, —NR$^{xx}$—CO—NR$^{yy}$—, —CH=CH— or —C≡C— in such a way that O and/or S atoms are not linked directly to one another, X' denotes —O—, —S—, —CO—, —COO—, —OCO—, —O—COO—, —CO—NR$^{xx}$—, —NR$^{xx}$—CO—, —NR$^{xx}$—CO—NR$^{yy}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, preferably —O—, —S—, —CO—, —COO—, —OCO—, —O—COO—, —CO—NR$^{xx}$—, —NR$^{xx}$—CO—, —NR$^{xx}$—CO—NR$^{yy}$— or a single bond.

—CH$_2$CF$_2$—, —CF$_2$CF$_2$—, —CH=N—, —N=CH—, —N=N—, —CH=CR$^{xx}$—, —CY$^{xx}$=CY$^{xx}$—, —C≡C—, —CH=CH—COO—, —OCO—CH=CH— or a single bond, R$^{xx}$ and R$^{yy}$ each, independently of one another, denote H or alkyl having 1 to 12 C atoms, and Y$^{xx}$ and Y$^{yy}$ each, independently of one another, denote H, F, Cl or CN.

Typical spacer groups Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{xx}$R$^{yy}$—O)$_{p1}$—, in which p1 is an integer from 1 to 12, q1 is an integer from 1 to 3, and R$^{xx}$ and R$^{yy}$ have independently from another one the above-mentioned meanings.

Particularly preferred groups —X'-Sp'- are —(CH$_2$)$_{p1}$—, —O—(CH$_2$)$_{p1}$—, —OCO—(CH$_2$)$_{p1}$—, —OCOO—(CH$_2$)$_{p1}$—, in which p1 is an integer from 1 to 12.

Particularly preferred groups Sp' are, for example, methylene, ethylene or a straight alkyl chain, such as, for example, propylene, butylene, pentylene, hexylene, heptylene, octylene, nonylene, decylene, undecylene, dodecylene, octadecylene, or ethyleneoxyethylene, methyleneoxybutylene, ethylenethioethylene, ethylene-N-methyliminoethylene, 1-methylalkylene, ethenylene, propenylene and butenylene.

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

The term "(meth)acrylic polymer" as used in the present invention includes a polymer obtained from (meth)acrylic monomers, a polymer obtainable from (meth)acrylic monomers, and a corresponding co-polymer obtainable from mixtures of methacrylic monomers and acrylic monomers.

The term "polymerisation" means the chemical process to form a polymer by bonding together multiple polymerisable groups or polymer precursors (polymerisable compounds) containing such polymerisable groups.

The terms "film" and "layer" include rigid or flexible, self-supporting or freestanding films with mechanical stability, as well as coatings or layers on a supporting substrate or between two substrates.

The term "alignment" or "orientation" relates to alignment (orientation ordering) of anisotropic units of material such as small molecules or fragments of big molecules in a common direction named "alignment direction". In an aligned layer of liquid-crystalline material, the liquid-crystalline director coincides with the alignment direction so that the alignment direction corresponds to the direction of the anisotropy axis of the material.

The terms "uniform orientation" or "uniform alignment" of an liquid-crystalline or RM material, for example in a layer of the material, mean that the long molecular axes (in case of calamitic compounds) or the short molecular axes (in case of discotic compounds) of the liquid-crystalline or RM molecules are oriented substantially in the same direction. In other words, the lines of liquid-crystalline director are parallel.

The term "planar or homogeneous orientation/alignment", for example in a layer of an liquid-crystalline material, means that the long molecular axes (in case of calamitic compounds) or the short molecular axes (in case of discotic compounds) of a proportion of the liquid-crystalline molecules are oriented substantially parallel (about 180°) to the plane of the layer.

The terms "uniform orientation" or "uniform alignment" of an liquid-crystalline material, for example in a layer of the material, mean that the long molecular axes (in case of calamitic compounds) or the short molecular axes (in case of discotic compounds) of the liquid-crystalline molecules are oriented substantially in the same direction. In other words, the lines of liquid-crystalline director are parallel.

The term "director" is known in prior art and means the preferred orientation direction of the long molecular axes (in case of calamitic compounds) or short molecular axes (in case of discotic compounds) of the liquid-crystalline molecules. In case of uniaxial ordering of such anisotropic molecules, the director is the axis of anisotropy.

The term "cholesteric structure" or "helically twisted structure" refers to a film comprising LC molecules wherein the director is parallel to the film plane and is helically twisted around an axis perpendicular to the film plane.

The term "homeotropic structure" or "homeotropic orientation" refers to a film wherein the optical axis is substantially perpendicular to the film plane.

The term "planar structure", "homogenous orientation" or "planar orientation" refers to a film wherein the optical axis is substantially parallel to the film plane.

The term "tilted structure" or "tilted orientation" refers to a film wherein the optical axis is tilted at an angle θ between 0 and 90° relative to the film plane.

The term "splayed structure" or "splayed orientation" means a tilted orientation as defined above, wherein the tilt angle varies in the direction perpendicular to the film plane, preferably from a minimum to a maximum value.

The average tilt angle $\theta_{ave}$ is defined as follows $$\theta_{ave} = \frac{\sum_{d'=0}^{d} \theta'(d')}{d}$$

wherein $\theta'(d')$ is the local tilt angle at the thickness d' within the film, and d is the total thickness of the film.

The tilt angle of a splayed film hereinafter is given as the average tilt angle $\theta_{ave}$, unless stated otherwise.

For sake of simplicity, an optical film with twisted, planar, homeotropic, tilted or splayed orientation or structure is hereinafter also referred to as "cholesteric film", "planar film", "homeotropic film", "tilted film" or "splayed film", respectively.

Tilted and splayed films are also referred to as "O plate".

The term "A plate" or "planar film" refers to an optical film utilizing a layer of uniaxially birefringent material with its extraordinary axis oriented parallel to the plane of the layer.

The term "C plate" or "homeotropic film" refers to an optical film utilizing a layer of uniaxially birefringent material with its extraordinary axis oriented perpendicular to the plane of the layer.

In A/C-plates comprising optically uniaxial birefringent liquid crystal material with uniform orientation, the optical axis of the film is given by the direction of the extraordinary axis. An A (or C) plate comprising optically uniaxial birefringent material with positive birefringence is also referred to as "positive A (or C) plate" or "+A (or +C) plate".

An A (or C) plate comprising a film of optically uniaxial birefringent material with negative birefringence, such as discotic anisotropic materials is also referred to as "negative A (or C) plate" or "−A (or −C) plate" depending on the orientation of the discotic materials. A film made from a cholesteric calamitic material with a reflection band in the UV part of the spectrum also has the optics of a negative C plate.

Biaxial films exhibit a degree of biaxiality which can be expressed by the biaxiality index $BI=R_0/R_{th}$, wherein $$R_0 = d \cdot (n_x - n_y), \text{ and}$$

$$R_{th} = d \cdot [(n_x + n_y)/2 - n_z]$$

wherein d is the film thickness, $n_x$ and $n_y$ are the principal refractive indices in orthogonal directions within the film plane and $n_z$ is the principal refractive index in a direction perpendicular to the film plane.

The definitions as given in C. Tschierske, G. Pelzl and S. Diele, Angew. Chem. 2004, 116, 6340-6368 shall apply additionally to the before given definitions and in particular to non-defined terms related to liquid crystal materials in the instant application.

The birefringence Δn herein is defined by the following equation $$\Delta n = n_e - n_o$$

wherein $n_e$ is the extraordinary refractive index and $n_o$ is the ordinary refractive index and the effective average refractive index $n_{av.}$ is given by the following equation $$n_{av.} = [(2n_o^2 + n_e^2)/3]^{1/2}$$

The extraordinary refractive index $n_e$ and the ordinary refractive index $n_o$ can be measured e.g. using a modified Abbe refractometer in accordance to "Merck Liquid Crystals, Physical Properties of Liquid Crystals", Status November 1997, Merck KGaA, Germany.

The term "negative (optical) dispersion" refers to a birefringent or liquid crystalline material or layer that displays reverse birefringence dispersion where the magnitude of the birefringence (Δn) increases with increasing wavelength (λ). I.e. $|\Delta n(450)| < |\Delta n(550)|$, or $\Delta n(450)/\Delta n(550) < 1$, where Δn (450) and Δn (550) are the birefringence of the material measured at wavelengths of 450 nm and 550 nm respectively. In contrast, positive (optical) dispersion" means a material or layer having $|\Delta n(450)| > \Delta n(550)|$ or $\Delta n(450)/\Delta n(550) > 1$. See also for example A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003).

Since the optical retardation at a given wavelength (R(λ)) is defined as the product of birefringence (Δn(λ)) and layer thickness (d)

$$R(\lambda) = \Delta n(\lambda) \cdot d,$$

the optical dispersion can be expressed either as the "birefringence dispersion" by the ratio $\Delta n(450)/\Delta n(550)$, or as "retardation dispersion" by the ratio $R(450)/R(550)$, wherein R(450) and R(550) are the retardation of the material measured at wavelengths of 450 nm and 550 nm respectively. Since the layer thickness d does not change with the wavelength, R (450)/R (550) is equal to Δn (450)/Δn (550). Thus, a material or layer with negative or reverse dispersion has R (450)/R (550)<1 or $|R(450)| < |R(550)|$, and a material or layer with positive or normal dispersion has R (450)/R (550)>1 or $|R(450)| > |R(550)|$.

In the present invention, unless stated otherwise "optical dispersion" means the retardation dispersion i.e. the ratio R (450)/R (550).

The term "high dispersion" means that the absolute value of the dispersion shows a large deviation from 1, whereas the term "low dispersion" means that the absolute value of the dispersion shows a small deviation from 1. Thus "high negative dispersion" means that the dispersion value is significantly smaller than 1, and "low negative dispersion" means that the dispersion value is only slightly smaller than 1.

The retardation (R(λ)) of a material can be measured using a spectroscopic ellipsometer, for example the M2000 spectroscopic ellipsometer manufactured by J. A. Woollam Co., This instrument is capable of measuring the optical retardance in nanometres of a birefringent sample e.g. Quartz over a range of wavelengths typically, 370 nm to 2000 nm. From this data, it is possible to calculate the dispersion (R(450)/R(550) or Δn(450)/Δn(550)) of a material.

A method for carrying out these measurements was presented at the National Physics Laboratory (London, UK) by N. Singh in October 2006 and entitled "Spectroscopic Ellipsometry, Part1—Theory and Fundamentals, Part 2—Practical Examples and Part 3—measurements". In accordance with the measurement procedures described Retardation Measurement (RetMeas) Manual (2002) and Guide to WVASE (2002) (Woollam Variable Angle Spectroscopic Ellipsometer) published by J. A. Woollam Co. Inc (Lincoln, Nebr., USA). Unless stated otherwise, this method is used to determine the retardation of the materials, films and devices described in this invention.

Visible light is electromagnetic radiation that has wavelength in a range from about 400 nm to about 800 nm.

Ultraviolet (UV) light is electromagnetic radiation with a wavelength in a range from about 200 nm to about 400 nm.

The term "transparent" in the context of this application is taken to mean that the transmission of light through the device is at least 65% of the incident light, more preferably at least 80%, even more preferably at least 90%.

According to the present application, the term "linearly polarised light" means light, which is at least partially linearly polarized. In a preferred embodiment, the aligning light is linearly polarized with a degree of polarization of more than 5:1. Wavelengths, intensity and energy of the linearly polarised light are chosen depending on the photosensitivity of the photoalignable material. Typically, the wavelengths are in the UV-A, UV-B and/or UV-C range or in the visible range. In a preferred embodiment, the linearly polarised light comprises light of wavelengths less than 450 nm, more preferably less than 420 nm.

The Irradiance ($E_e$) or radiation power is defined as the power of electromagnetic radiation ($d\theta$) per unit area ($dA$) incident on a surface:

$$E_e = d\theta/dA.$$

The radiant exposure or radiation dose ($H_e$), is as the irradiance or radiation power ($E_e$) per time (t):

$$H_e = E_e \cdot t.$$

The term "clearing point" means the temperature at which the transition between the mesophase with the highest temperature range and the isotropic phase occurs.

Throughout the application and unless explicitly stated otherwise, all concentrations are quoted in percent by weight and relate to the respective mixture as a whole, all temperatures are quoted in degrees Celsius and all temperature differences are quoted in differential degrees.

In the present application the term "dielectrically positive" is used for compounds or components with $\Delta\varepsilon > 3.0$, "dielectrically neutral" with $-1.5 \leq \Delta\varepsilon \leq 3.0$ and "dielectrically negative" with $\Delta\varepsilon < -1.5$.

$\Delta\varepsilon$ is determined at a frequency of 1 kHz and at 20° C. The dielectric anisotropy of the respective compound is determined from the results of a solution of 10% of the respective individual compound in a nematic host mixture. In case the solubility of the respective compound in the host medium is less than 10% its concentration is reduced by a factor of 2 until the resultant medium is stable enough at least to allow the determination of its properties. In a preferred embodiment, the concentration is kept at least at 5%, however, in order to keep the significance of the results a high as possible. The capacitance of the test mixtures are determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V; however, it is always selected to be below the capacitive threshold of the respective test mixture.

$\Delta\varepsilon$ is defined as $(\varepsilon\| - \varepsilon\perp)$, whereas $\varepsilon_{av.}$ is $(\varepsilon\| + 2\varepsilon\perp)/3$. The dielectric permittivity of the compounds is determined from the change of the respective values of a host medium upon addition of the compounds of interest. The values are extrapolated to a concentration of the compounds of interest of 100%. A typical host medium is ZLI-4792 or BL-087 both commercially available from Merck, Darmstadt.

Unless the context clearly indicates otherwise, as used herein plural forms of the terms herein are to be construed as including the singular form and vice versa.

For the present invention,

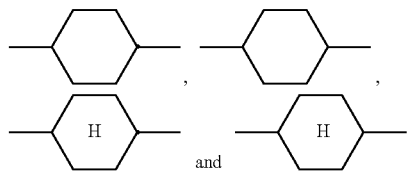

denote 1,4-cyclohexylene, preferably

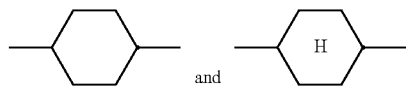

denote trans-1,4-cylohexylene.

For the present invention,

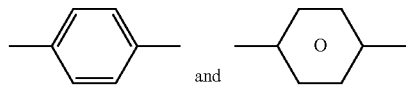

denote 1,4-phenylene.

For the present invention the groups —COO— —C(=O)O— or —CO$_2$— denote an ester group of formula

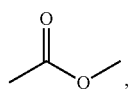

and the groups —OCO—, —OC(=O)—, —O$_2$C— or —OOC— denote an ester group of formula

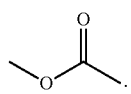

Above and below, "carbyl group" denotes a mono- or polyvalent organic group containing at least one carbon atom which either contains no further atoms (such as, for example, C≡C) or optionally contains one or more further atoms, such as, for example, N, O, S, P, Si, Se, As, Te or Ge (for example carbonyl, etc.). "Hydrocarbyl group" denotes a carbyl group, which additionally contains one or more H atoms and optionally one or more heteroatoms, such as, for example, N, O, S, P, Si, Se, As, Te or Ge.

A carbyl or hydrocarbyl group can be a saturated or unsaturated group. Unsaturated groups are, for example, aryl, alkenyl, or alkinyl groups. A carbyl or hydrocarbyl group having more than 3 C atoms can be straight chain, branched and/or cyclic and may contain spiro links or condensed rings.

Throughout the application, unless stated explicitly otherwise, the term "aryl and heteroaryl groups" encompass groups, which can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings.

Heteroaryl groups contain one or more heteroatoms, preferably selected from O, N, S and Se. Particular preference is given to mono-, bi- or tricyclic aryl groups having 6 to 25 C atoms and mono-, bi- or tricyclic heteroaryl groups having 2 to 25 C atoms, which optionally contain fused rings, and which are optionally substituted. Preference is furthermore given to 5, 6 or 7-membered aryl and heteroaryl groups, in which, in addition, one or more CH groups may be replaced by N, S or O in such a way that O atoms and/or S atoms are not linked directly to one another. Preferred aryl groups are, for example, phenyl, biphenyl, terphenyl, [1,1':3',1"]¬¬terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, more preferably 1,4-phenylene, 4,4'-biphenylene, 1,4-tephenylene.

Preferred heteroaryl groups are, for example, 5 membered rings, such as pyrrole, pyrazole, imidazole, 1,2,3-triazole, 1,2,4-triazole, tetrazole, furan, thiophene, selenophene, oxazole, isoxazole, 1,2 thiazole, 1,3-thiazole, 1,2,3-oxadiazole, 1,2,4 oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6 membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, iso-indole, indolizine, indazole, benzimidazole, benzotriazole, purine, naphth-imidazole, phenanthrimidazole, pyridimidazole, pyrazinimidazole, quinoxalinimidazole, benzoxazole, naphthoxazole, anthroxazole, phen-anthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]-thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

In the context of this application, the term "(non-aromatic) alicyclic and heterocyclic groups" encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S and Se. The (non-aromatic) alicyclic and heterocyclic groups can be monocyclic, i.e. contain only one ring (such as, for example, cyclohexane), or polycyclic, i.e. contain a plurality of rings (such as, for example, decahydro-naphthalene or bicyclooctane). Particular preference is given to saturated groups. Preference is furthermore given to mono-, bi- or tricyclic groups having 3 to 25 C atoms, which optionally contain fused rings and that are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent CH₂ groups may be replaced by —O— and/or —S—. Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]¬pentane-1,3-diyl, bicyclo[2.2.2]octane-1,4-diyl, spiro[3.3]heptane-2,6-diyl, octahydro-4,7-methanoindane-2,5-diyl, more preferably 1,4-cyclohexylene 4,4'-bicyclohexylene, 3,17-hexadecahydrocyclopenta[a]phenanthrene, optionally being substituted by one or more identical or different groups L. Especially preferred aryl-, heteroaryl-, alicyclic- and heterocyclic groups are 1,4-phenylene, 4,4'-biphenylene, 1, 4-terphenylene, 1,4-cyclohexylene, 4,4'-bicyclohexylene, and 3,17-hexadecahydro-cyclopenta[a]-phenanthrene, optionally being substituted by one or more identical or different groups L.

Preferred substituents (L) of the above-mentioned aryl-, heteroaryl-, alicyclic- and heterocyclic groups are, for example, solubility-promoting groups, such as alkyl or alkoxy and electron-withdrawing groups, such as fluorine, nitro or nitrile.

Preferred substituents, also referred to as "L" below, are, for example, F, Cl, Br, I, —OH, —CN, —NO₂, —NCO, —NCS, —OCN, —SCN, —C(=O)N(R$^x$)₂, —C(=O)Y$^x$, —C(=O)R$^x$, —C(=O)OR$^x$, —N(R$^x$)₂, in which R$^x$ has the above-mentioned meaning, and above Y$^x$ denotes halogen, optionally substituted silyl, optionally substituted aryl or heteroaryl having 4 to 40, preferably 4 to 20 ring atoms, and straight-chain or branched alkyl, alkenyl, alkinyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means silyl or aryl substituted by halogen, —CN, R$^y$, —OR$^y$, —CO—R$^y$, —CO—O—R$^y$, —O—CO—R$^y$ or —O—CO—O—R$^y$, in which R$^y$ denotes H, a straight-chain, branched or cyclic alkyl chain having 1 to 12 C atoms.

In the formulae shown above and below, a substituted phenylene ring

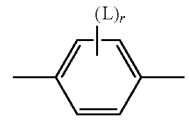

is preferably

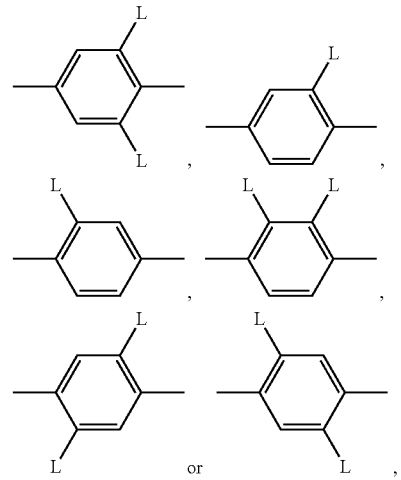

in which L has, on each occurrence identically or differently, one of the meanings given above and below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, most preferably F, Cl, $CH_3$, $OCH_3$, $COCH_3$ or $OCF_3$.

"Halogen" denotes F, Cl, Br or I, preferably F or Cl, more preferably F.

Above and below, the terms "alkyl", "aryl", "heteroaryl", etc., also encompass polyvalent groups, for example alkylene, arylene, heteroarylene, etc.

The term "aryl" denotes an aromatic carbon group or a group derived there from.

The term "heteroaryl" denotes "aryl" in accordance with the above definition containing one or more heteroatoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl.

Preferred alkynyl groups are, for example, ethynyl, propynyl, butynyl, pentynyl, hexynyl, octynyl.

Preferred amino groups are, for example, dimethylamino, methylamino, methylphenylamino, phenylamino.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

Throughout the description and claims of this specification, the words "obtainable" and "obtained" and variations of the words, mean "including but not limited to", and are not intended to (and do not) exclude other components. On the other hand, the word "obtainable" also encompasses the term "obtained" but is not limited to it.

DETAILED DESCRIPTION

In a preferred embodiment of the invention, at least one of the utilized substrates is transparent, more preferably, both substrates are transparent. The substrates may preferably consist, inter alia, each and independently from another of a polymeric material, of metal oxides, for example ITO, and of glass or quartz plates, preferably each and independently of another of glass and/or ITO, in particular glass/glass.

Suitable and preferred polymeric substrates are for example films of cyclo olefin polymer (COP), cyclic olefin copolymer (COC), polyester such as polyethyleneterephthalate (PET) or polyethylene-naphthalate (PEN), polyvinylalcohol (PVA), polycarbonate (PC) or triacetylcellulose (TAC), very preferably PET or TAC films. PET films are commercially available for example from DuPont Teijin Films under the trade name Melinex®. COP films are commercially available for example from ZEON Chemicals L. P. under the trade name Zeonor® or Zeonex®. COC films are commercially available for example from TOPAS Advanced Polymers Inc. under the trade name Topas®.

In a further preferred embodiment of the invention, the layer of the liquid-crystalline medium is located in between of a pair of flexible layers, for example flexible polymer films. The light modulation element according to the invention is consequently flexible and bendable and can be rolled up, for example. The flexible layers can represent, for example, the substrate layer, and/or polarisers. For a more detailed disclosure of the preferred embodiments, in which the layer of the liquid-crystalline medium is located between flexible layers, reference is given to the application US 2010/0045924 A1.

The substrate layers can be kept at a defined separation from one another by, for example, spacers, or projecting structures in the layer. Typical spacer materials are commonly known to the expert and are preferably selected from plastic, silica, epoxy resins, etc.

In a preferred embodiment, the substrates are arranged with a separation in the range from approximately 1 µm to approximately 50 µm from one another, preferably in the range from approximately 1 µm to approximately 25 µm from one another, and more preferably in the range from approximately 1 µm to approximately 15 µm from one another. The layer of the liquid-crystalline medium is thereby located in the interspace formed by the pair of substrates.

In another preferred embodiment, a pair of polarizes act as the pair of substrates and no further substrates are needed or present.

In further preferred embodiment of the invention, the light modulation element comprises two or more polarisers, at least one of which is arranged on one side of the layer of the liquid-crystalline medium, and at least one of which is arranged on the opposite side of the layer of the liquid-crystalline medium. The layer of the liquid-crystalline medium and the polarisers here are preferably arranged substantially parallel to one another.

If precisely two polarisers are present in the light modulation element, also referred below as polarizer and analyser, it is preferred in accordance with the invention for the polarisation directions of the two polarisers to be crossed at an angle of approximately 90°.

The linear polarisers can be standard type absorption polarisers, for example comprising stretched iodine/polyvinylalcohol (PVA) and optionally protective triacetyl cellulose (TAC) layers.

In another preferred embodiment of the present invention the linear polarisers comprise a polymerised or crosslinked LC material, preferably a polymerised calamitic LC material, and optionally one or more absorbing dyes, as described for example in EP 0397263. Commercially available polarisers are usually provided on a transparent birefringent substrate like e.g. a TAC film.

The light modulation element in accordance with the present invention comprises one or more optical films, of which at least one is located on the opposing sides (inner side) of one of the opposing substrates.

In a preferred embodiment, the optical films are obtainable from polymerisable (calamitic) LC materials. Suitable polymerisable LC materials are for example disclosed in WO 93/22397, EP 0261712, DE 19504224, WO 95/22586, WO 97/00600, GB 2351734, WO 98/00475 or WO 98/04651.

The compounds disclosed in these documents, however, are to be regarded merely as examples that shall not limit the scope of this invention. One of the advantages of utilizing polymerisable (calamitic) LC materials is that the polymerisable (calamitic) LC materials have similar dispersion to the non-polymerisable calamitic LC materials in a LC mixture as typically used in the switching layer of typical IPS/FFS display cells and undesired colouration is at least reduced.

In a preferred embodiment, the optical films utilized in a light modulation element in accordance with the present invention are obtainable from a polymerisable LC material, comprising one or more di- or multireactive polymerisable mesogenic compounds and optionally one or more monoreactive polymerisable mesogenic compounds.

Suitable multi-, di- or monoreactive mesogenic compounds are for example disclosed in WO 93/22397, EP 0261712, DE 19504224, WO 95/22586, WO 97/00600, GB 2351734, WO 98/00475 or WO 98/04651.

The compounds disclosed in these documents, however, are to be regarded merely as examples that shall not limit the scope of this invention.

In a preferred embodiment, one or more di- or multireactive mesogenic compounds are selected from compounds of formula DRM, $$P^1\text{-}Sp^1\text{-}MG\text{-}Sp^2\text{-}P^2 \qquad \text{DRM}$$

wherein $P^1$ and $P^2$ independently of each other denote a polymerisable group, $Sp^1$ and $Sp^2$ independently of each other are a spacer group or a single bond, and MG is a mesogenic group, which is preferably selected of formula MG $$-(A^1-Z^1)_n-A^2 \qquad \text{MG}$$

wherein $A^1$ and $A^2$ denote, in case of multiple occurrence independently of one another, an aromatic or alicyclic group, which optionally contains one or more heteroatoms selected from N, O and S, and is optionally mono- or polysubstituted by $L^1$, $L^1$ denotes, in case of multiple occurrence independently of one another, $P^1\text{-}Sp^1\text{-}$, F, Cl, Br, I, —CN, —NO$_2$, —NCO, —NCS, —OCN, —SCN, —C(=O)NR$^{00}$R$^{000}$, —C(=O)OR$^{00}$, —C(=O)R$^{00}$, —NR$^{00}$R$^{000}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, $Z^1$ denotes, in case of multiple occurrence independently of one another, —O—, —S—, —CO—, —COO—, —OCO—, —S—CO—, —CO—S—, —O—COO—, —CO—NR$^{00}$—, —NR$^{00}$CO—, —NR$^{00}$—CO—NR$^{000}$, —NR$^{00}$—CO—O—, —O—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_{n1}$, —CF$_2$CH$_2$—, —CH$_2$CF$_2$—, —CF$_2$CF$_2$—, —CH=N—, —N=CH—, —N=N—, —CH=CR$^{00}$—, —CY$^1$=CY$^2$—, —C≡C—, —CH=CH—COO—, —OCO—CH=CH— or a single bond, $R^{00}$ and $R_{000}$ independently of each other denote H or alkyl with 1 to 12 C-atoms, $Y^1$ and $Y^2$ independently of each other denote H, F, Cl or CN, n is 1, 2, 3 or 4, preferably 1 or 2, most preferably 2, n1 is an integer from 1 to 10, preferably 1, 2, 3 or 4.

Preferred groups $A^1$ and $A^2$ include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, fluorene, naphthalene, tetrahydronaphthalene, anthracene, phenanthrene and dithienothiophene, all of which are unsubstituted or substituted by 1, 2, 3 or 4 groups $L^1$ as defined above.

Particular preferred groups $A^1$ and $A^2$ are selected from 1,4-phenylene, pyridine-2,5-diyl, pyrimidine-2,5-diyl, thiophene-2,5-diyl, naphthalene-2,6-diyl, 1,2,3,4-tetrahydronaphthalene-2,6-diyl, indane-2,5-diyl, bicyclooctylene or 1,4-cyclohexylene wherein one or two non-adjacent CH$_2$ groups are optionally replaced by O and/or S, wherein these groups are unsubstituted or substituted by 1, 2, 3 or 4 groups $L^1$ as defined above.

Especially preferred compounds of formula DRM are selected from trireactive compounds wherein one of $L^1$ denotes $P^1\text{-}Sp^1\text{-}$. Further preferred compounds of formula DRM are selected from multireactive compounds wherein two or more of $L^1$ denotes P1-Sp1-.

Particular preferred groups $Z^1$ are in each occurrence independently from another preferably selected from —COO—, —OCO—, —CH$_2$CH$_2$—, —CF$_2$O—, —OCF$_2$—, —C≡C—, —CH=CH—, —OCO—CH=CH—, —CH=CH—COO—, or a single bond, Very preferred direactive mesogenic compounds of formula DRM are selected from the following formulae:

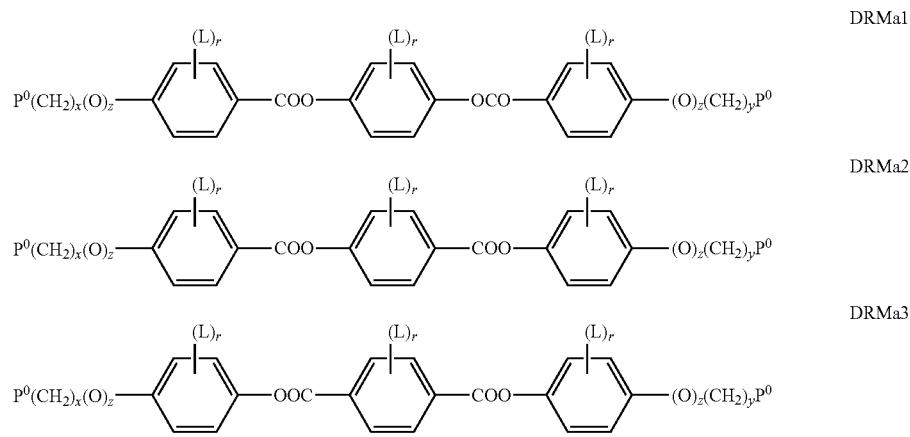

-continued

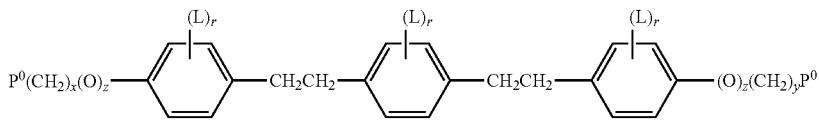

DRMa4

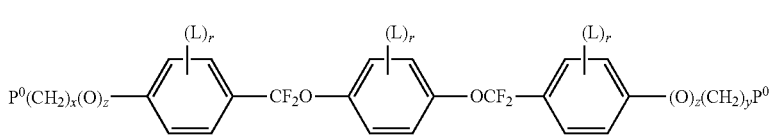

DRMa5

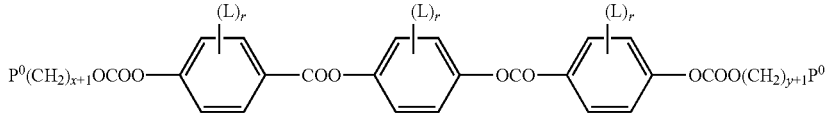

DRMa6

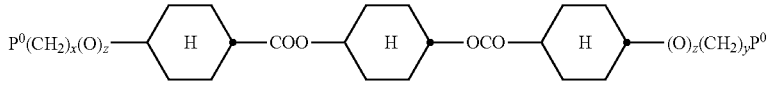

DRMb

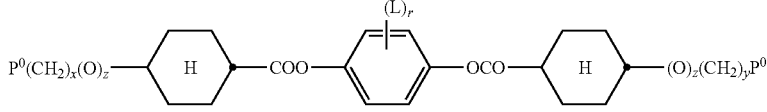

DRMc

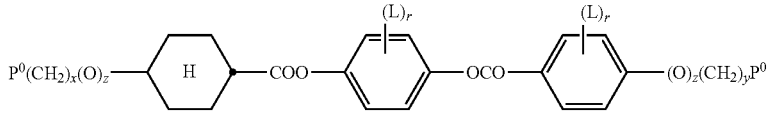

DRMd

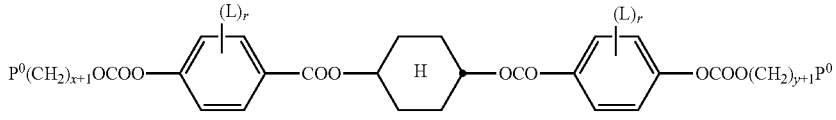

DRMe wherein
$P^0$ is, in case of multiple occurrence independently of one another, a polymerisable group, preferably an acrylate, methacrylate, oxetane, epoxy, vinyl, heptadiene, vinyloxy, propenyl ether or styrene group,
L in case of multiple occurrence independently of one another, selected from F, Cl, CN or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
x and y are independently of each other 0 or identical or different integers from 1 to 12,
z is each and independently, 0 or 1, with z being 0 if the adjacent x or y is 0.

Especially preferred are compounds of formula DRMa1, DRMa2 and DRMa3, in particular those of formula DRMa1.

In another preferred embodiment, the optical film is obtainable, preferably obtained, from polymerisable LC materials comprising, additionally to one or more multi- or direactive mesogenic compounds, one or more monoreactive mesogenic compounds.

Suitable monoreactive mesogenic compounds are preferably selected from compounds of formula MRM, $$P^1\text{-Sp}^1\text{-MG-R} \quad \text{MRM}$$

wherein
$P^1$ denotes a polymerisable group,
$Sp^1$ is a spacer group or a single bond,
MG is a mesogenic group, which is preferably selected of formula MG $$-(A^1-Z^1)_n-A^2- \quad \text{MG}$$

wherein
$A^1$ and $A^2$ denote, in case of multiple occurrence independently of one another, an aromatic or alicyclic group, which optionally contains one or more heteroatoms selected from N, O and S, and is optionally mono- or polysubstituted by $L^2$,
$L^2$ denotes, in case of multiple occurrence independently of one another, F, Cl, Br, I, —CN, —NO$_2$, —NCO, —NCS, —OCN, —SCN, —C(=O)NR$^{00}$R$^{000}$, —C(=O)OR$^{00}$, —C(=O)R$^{00}$, —NR$^{00}$R$^{000}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl,
$Z^1$ denotes, in case of multiple occurrence independently of one another, —O—, —S—, —CO—, —COO—, —OCO—, —S—CO—, —CO—S—, —O—COO—, —CO—NR$^{00}$—, —NR$^{00}$—CO—, —NR$^{00}$—CO—NR$^{000}$, —NR$^{00}$—CO—O—, —O—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_{n1}$—, —CF$_2$CH$_2$—, —CH$_2$CF$_2$—, —CF$_2$CF$_2$—, —CH=N—, —N=CH—, —N=N—, —CH=CR$^{00}$—, —CY$^1$=CY$^2$—, —C≡C—, —CH=CH—COO—, —OCO—CH=CH— or a single bond, R$^{00}$ and R$^{000}$ independently of each other denote H or alkyl with 1 to 12 C-atoms, Y$^1$ and Y$^2$ independently of each other denote H, F, Cl or CN, n is 1, 2, 3 or 4, preferably 1 or 2, most preferably 2, n1 is an integer from 1 to 10, preferably 1, 2, 3 or 4, and R F, Cl, Br, I, —CN, —NO$_2$, —NCO, —NCS, —OCN, —SCN, —C(=O)NR$^x$R$^y$, —C(=O)OR$^x$, —C(=O)R$^y$, —NR$^x$R$^y$, —OH, —SR$^x$, —SF$_5$, optionally substituted silyl, straight chain or branched alkyl having 1 to 20, preferably 1 to 12, C atoms, which is optionally mono- or polysubstituted by F, Cl, Br, I or CN and wherein, in addition, one or more non-adjacent CH$_2$ groups may each be replaced, independently of one another, by —O—, —S—, —NH—, —N(R$^0$)—, —Si(R$^{00}$R$^{000}$)—, —CO—, —CO—O—, —O—CO—, —O—CO—O—, —S—CO—, —CO—S—, —N(R$^{00}$)—CO—O—, —O—CO—N(R$^{00}$)—, —N(R$^{00}$)—CO—N(R$^{00}$)—, —CH=CH— or —C≡C— in such a way that O and/or S atoms are not linked directly to one another, R$^x$ and R$^y$ are independently of each other H or alkyl with 1 to 12 C-atoms.

In a preferred embodiment, the monoreactive mesogenic compounds of formula MRM are selected from compounds of the following formulae:

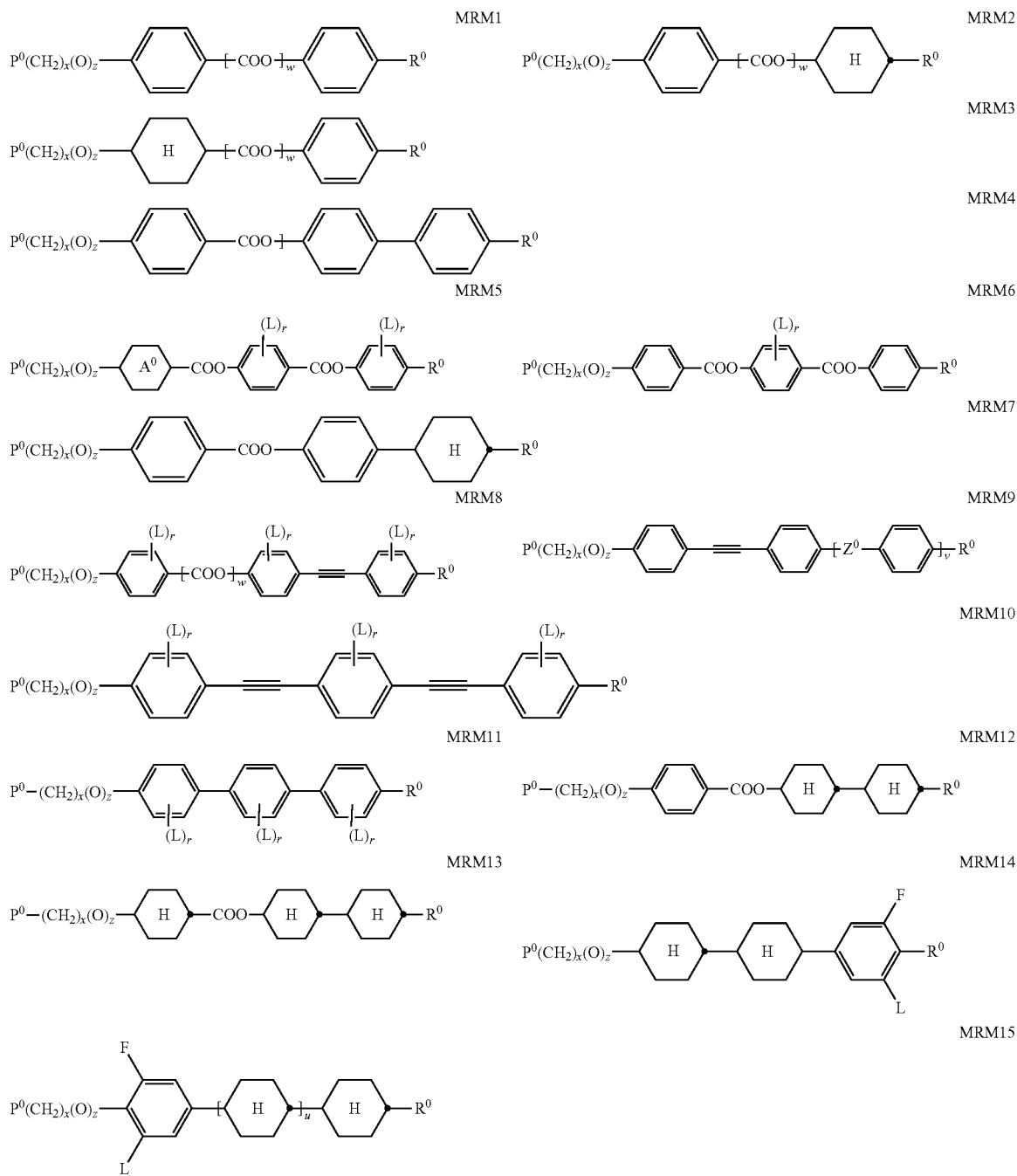

-continued

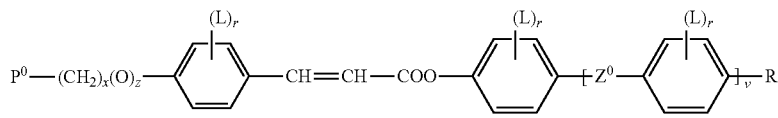
MRM16

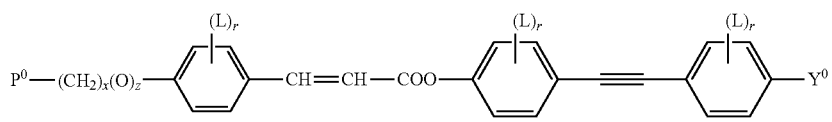
MRM17

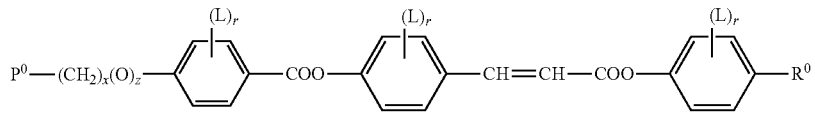
MRM18

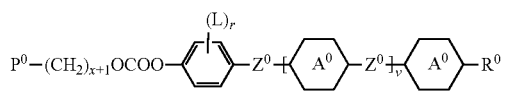
MRM19

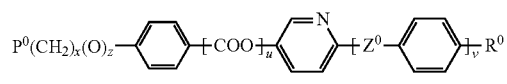
MRM20

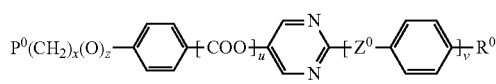
MRM21

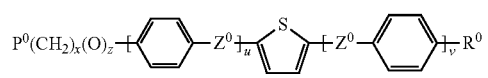
MRM22

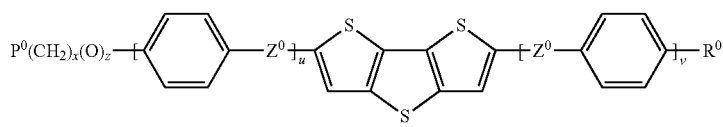
MRM23

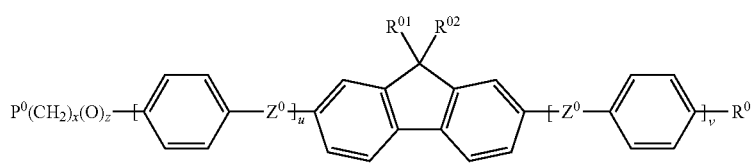
MRM24

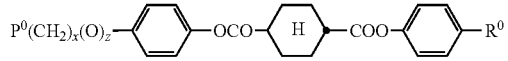
MRM25

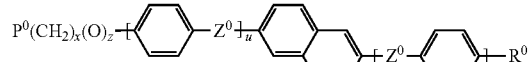
MRM26

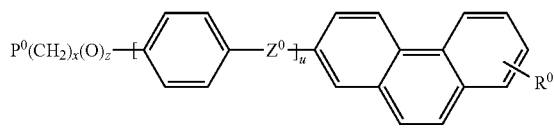
MRM27 wherein P⁰, L, r, x, y and z are as defined in formula DRMa-1 to formula DRMe,

R⁰ is a straight-chain or branched alkyl or alkenyl with up to 15 C atoms in which one or more non adjacent CH$_2$-groups may be replaced by —O—, —S—, —CO—, —C(O)O—, —O—C(O)—, O—C(O)—O—, or Y⁰, preferably Y⁰, Y⁰ is F, Cl, CN, NO$_2$, OCH$_3$, OCN, SCN, SF$_5$, or mono- oligo- or polyfluorinated alkyl, alkenyl or alkoxy with 1 to 4 C atoms, Z⁰ is —COO—, —OCO—, —CH$_2$CH$_2$—, —CF$_2$O—, —OCF$_2$—, —CH=CH—, —OCO—CH=CH—, —CH=CH—COO—, or a single bond, A⁰ is, in case of multiple occurrence independently of one another, 1,4-phenylene that is unsubstituted or substituted with 1, 2, 3 or 4 groups L, or trans-1,4-cyclohexylene, u and v are independently of each other 0, 1 or 2, w is 0 or 1, and wherein the benzene and naphthalene rings can additionally be substituted with one or more identical or different groups L.

Further preferred are compounds of formula MRM1, MRM2, MRM3, MRM4, MRM5, MRM6, MRM7, MRM9 and MRM10, more preferred those of formula MRM1, MRM4, MRM6, and MRM7, and in particular those of formulae MRM1 and MRM7, and especially those of formulae MRM1 and MRM7 wherein R⁰ denotes Y⁰.

In a further preferred embodiment, especially for negative optical dispersion applications, the polymerisable LC material as described above comprises additionally one or more compounds of formula ND,

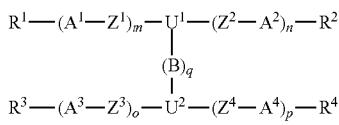

wherein
$U^{1,2}$ are independently of each other selected from

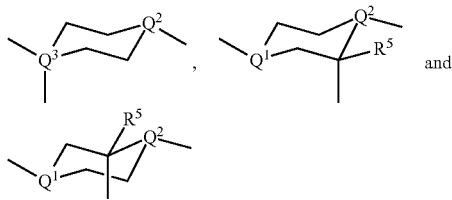

including their mirror images, wherein the rings $U^1$ and $U^2$ are each bonded to the group —(B)$_q$— via the axial bond, and one or two non-adjacent CH$_2$ groups in these rings are optionally replaced by O and/or S, and the rings $U^1$ and $U^2$ are optionally substituted by one or more groups L,
$Q^{1,2}$ are independently of each other CH or SiH,
$Q^3$ is C or Si,
B is in each occurrence independently of one another —C≡C—, —CY$^1$=CY$^2$— or an optionally substituted aromatic or heteroaromatic group,
$Y^{1,2}$ are independently of each other H, F, Cl, CN or R$^0$,
q is an integer from 1 to 10, preferably 1, 2, 3, 4, 5, 6 or 7,
$A^{1-4}$ are independently of each other selected from non-aromatic, aromatic or heteroaromatic carbocyclic or heterocyclic groups, which are optionally substituted by one or more groups R$^5$, and wherein each of —(A$^1$—Z$^1$)$_m$—U$^1$—(Z$^2$—A$^2$)$_n$— and —(A$^3$—Z$^3$)$_o$—U$^2$—(Z$^4$—A$^4$)$_p$— does not contain more aromatic groups than non-aromatic groups and preferably does not contain more than one aromatic group,
$Z^{1-4}$ are independently of each other —O—, —S—, —CO—, —COO—, —OCO—, —O—COO—, —CO—NR$^0$—, —NR$^0$—CO—, —NR$^0$—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond,
R$^0$ and R$^{00}$ are independently of each other H or alkyl with 1 to 12 C-atoms,
m and n are independently of each other 0, 1, 2, 3 or 4,
o and p are independently of each other 0, 1, 2, 3 or 4,
$R^{1-5}$ are independently of each other identical or different groups selected from H, halogen, —CN, —NC, —NCO, —NCS, —OCN, —SCN, —C(=O)NR$^0$R$^{00}$, —C(=O)X$^0$, —C(=O)R$^0$, —NH$_2$, —NR$^0$R$^{00}$, —SH, —SR$^0$, —SO$_3$H, —SO$_2$R$^0$, —OH, —NO$_2$, —CF$_3$, —SF$_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group $R^{1-5}$ denoting or being substituted by P or P-Sp-,
P is a polymerisable group,
Sp is a spacer group or a single bond.

Preferably, the subgroups forming the bridging group B in formula ND are preferably selected from groups having a bonding angle of 120° or more, preferably in the range of 180°. Very preferred are —C≡C— groups or divalent aromatic groups connected to their adjacent groups in para-position, like e.g. 1,4-phenylene, naphthalene-2,6-diyl, indane-2,6-diyl or thieno[3,2-b]thiophene-2,5-diyl.

Further possible subgroups include —CH=CH—, —CY$^1$=CY$^2$—, —CH=N—, —N=CH—, —N=N— and —CH=CR$^0$— wherein $Y^1$, $Y^2$, $R^0$ have the meanings given above.

Preferably the bridging group, or —(B)$_q$— in formula ND, comprises one or more groups selected from the group consisting of —C≡C—, optionally substituted 1,4-phenylene and optionally substituted 9H-fluorene-2,7-diyl. The subgroups, or B in formula ND, are preferably selected from the group consisting of —C≡C—, optionally substituted 1,4-phenylene and optionally substituted 9H-fluorene-2,7-diyl, wherein in the fluorene group the H-atom in 9-position is optionally replaced by a carbyl or hydrocarbyl group.

Very preferably the bridging group, or —(B)$_q$— in formula ND, are selected from —C≡C—, —C≡C—C≡C—, —C≡C—C≡C—C≡C—, —C≡C—C≡C—C≡C—C≡C—,

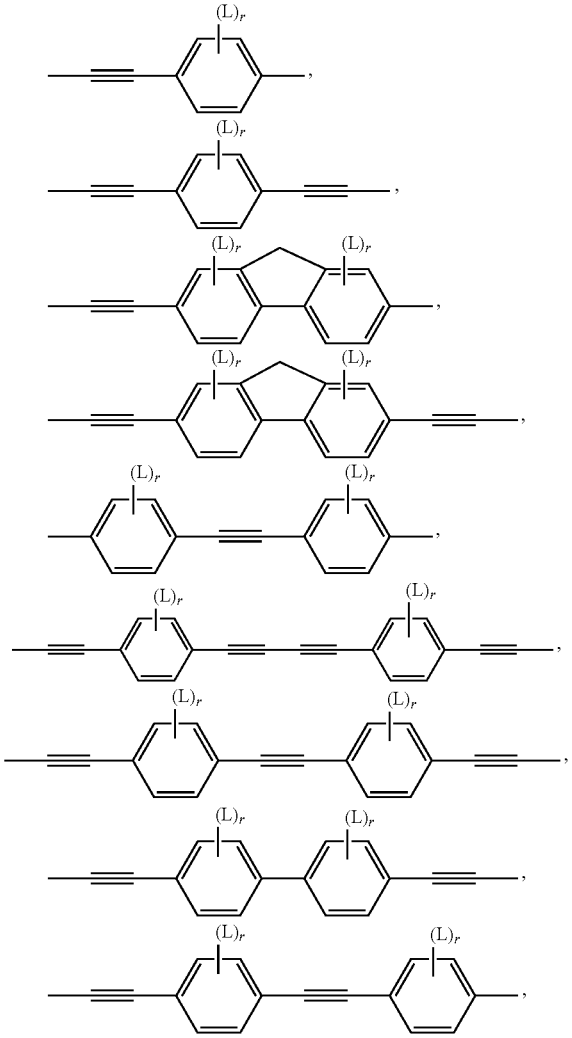

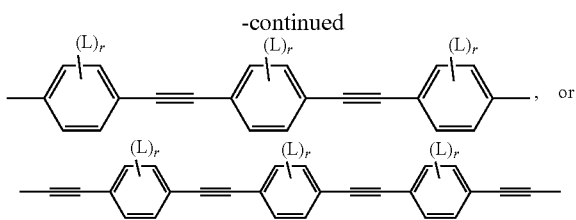

wherein r is 0, 1, 2, 3 or 4 and L has the meaning as described below.

Preferably, the non-aromatic rings of the mesogenic groups where the bridging group is attached, like $U^1$ and $U^2$ in formula ND, are preferably selected from

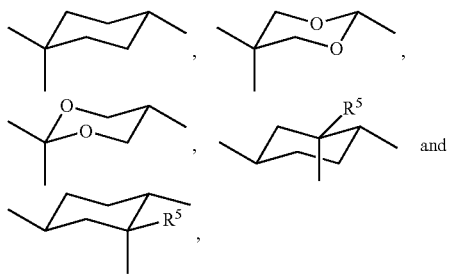

wherein $R^5$ is as defined in formula ND.

Preferably, the aromatic groups $A^{1-4}$ in formula ND, may be mononuclear, i.e. having only one aromatic ring (like for example phenyl or phenylene), or polynuclear, i.e. having two or more fused rings (like for example napthyl or naphthylene). Especially preferred are mono-, bi- or tricyclic aromatic or heteroaromatic groups with up to 25 C atoms that may also comprise fused rings and that are optionally substituted.

Preferably, the non-aromatic carbocyclic and heterocyclic rings $A^{1-4}$ in the compounds of formula ND, include those which are saturated (also referred to as "fully saturated"), i.e. they do only contain C-atoms or hetero atoms connected by single bonds, and those which are unsaturated (also referred to as "partially saturated"), i.e. they also comprise C-atoms or hetero atoms connected by double bonds. The non-aromatic rings may also comprise one or more hetero atoms, preferably selected from Si, O, N and S.

Preferably the non-aromatic and aromatic rings, or $A^{1-4}$ in formula ND, are selected from trans-1,4-cyclohexylene and 1,4-phenylene that is optionally substituted with one or more groups L.

Very preferred are compounds of formula ND, wherein m and p are 1 and n and o are 1 or 2. Further preferred are compounds of formula ND, wherein m and p are 1 or 2 and n and o are 0. Further preferred are compounds wherein m, n, o and p are 2.

In the compounds of formula ND, the linkage groups connecting the aromatic and non-aromatic cyclic groups in the mesogenic groups, or $Z^{1-4}$, are preferably selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH═CH—, —CY$^1$═CY$^2$—, —CH═N—, —N═CH—, —N═N—, —CH═CR$^0$, —C≡C—, —CH═CH—COO—, —OCO— CH═CH—, CR$^0$R$^{00}$ or a single bond, very preferably from —COO—, —OCO— and a single bond.

Preferably, in the compounds of formula ND, the substituents on the rings, such as L, are preferably selected from P-Sp-, F, Cl, Br, I, —CN, —NO$_2$, —NCO, —NCS, —OCN, —SCN, —C(═O)NR$^0$R$^{00}$, —C(═O)X, —C(═O)OR$^0$, —C(═O)R$^0$, —NR$^0$R$^{00}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein R$^0$ and R$^{00}$ are as defined in formula ND and X is halogen.

Preferably, the compounds of formula ND comprise one or more terminal groups, like $R^{1-4}$, or substituents, like $R^5$, that are substituted by two or more polymerisable groups P or P-Sp- (multifunctional polymerisable groups). Suitable multifunctional polymerisable groups of this type are disclosed for example in U.S. Pat. No. 7,060,200 B1 or US 2006/0172090 A1.

Very preferred compounds of formula ND are those of the following sub formulae:

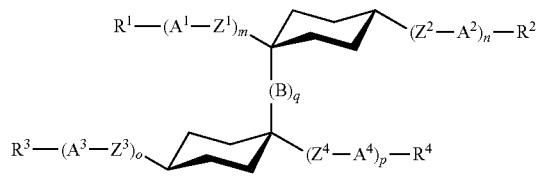

NDa

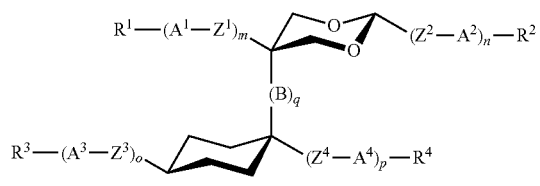

NDb

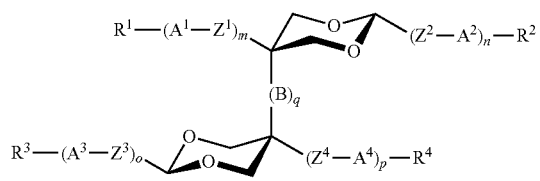

NDc

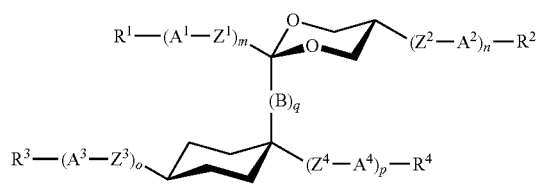

NDd

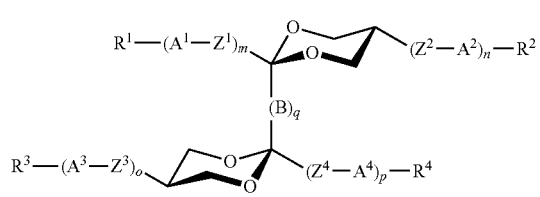

NDe

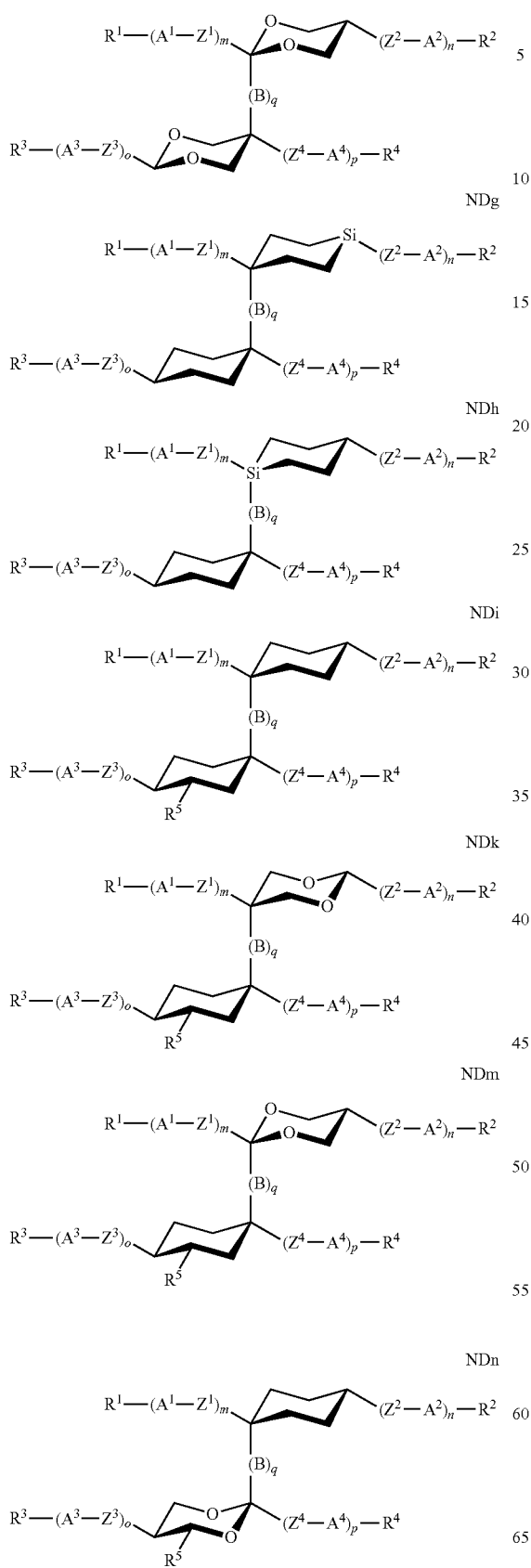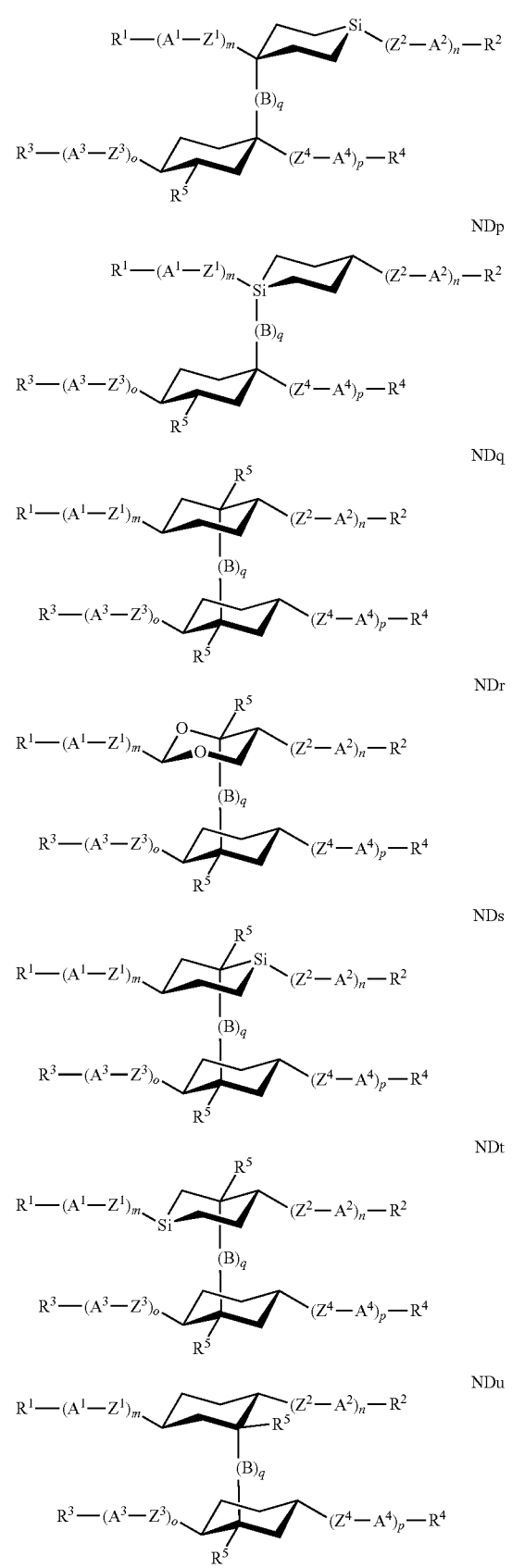

-continued
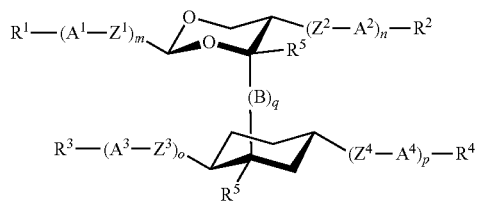 NDv
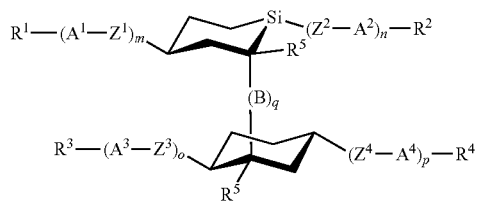 NDw
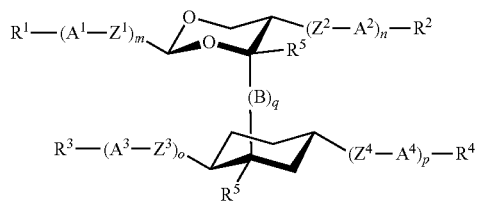 NDx
wherein $R^{1-5}$, $A^{1-4}$, $Z^{1-4}$, B, m, n, o, p and q have one the meanings given above.
Especially preferred are compounds of the following sub formulae:
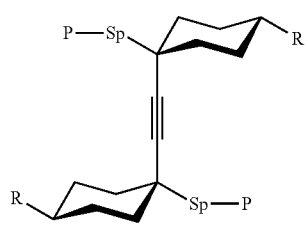 ND1
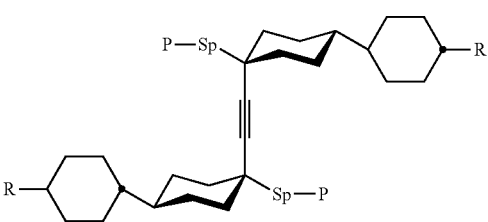 ND2
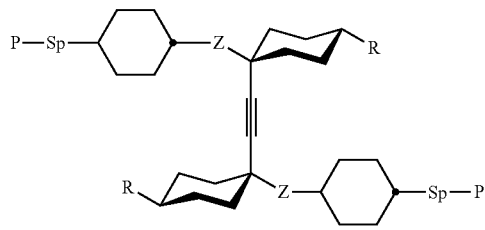 ND3
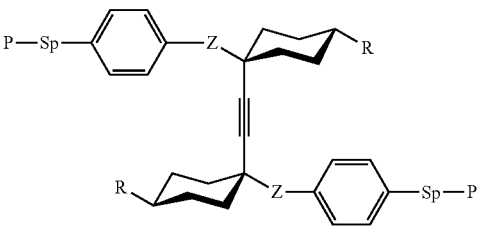 ND4
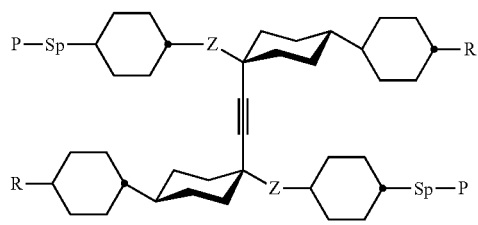 ND5
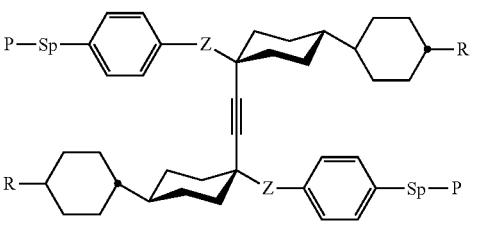 ND6
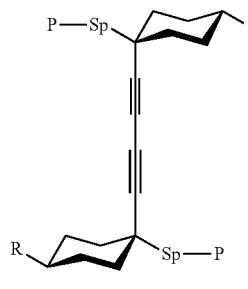 ND7
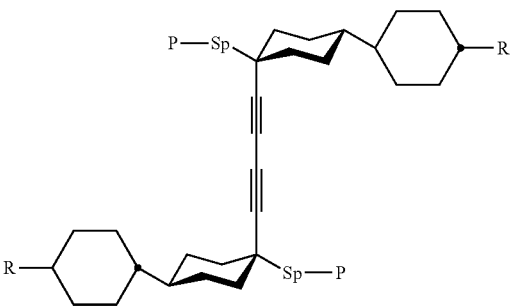 ND8

-continued
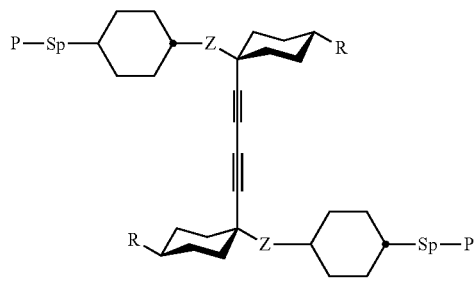
ND9
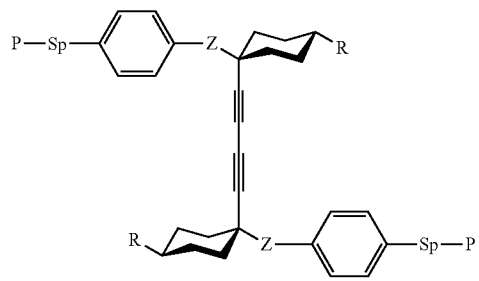
ND10
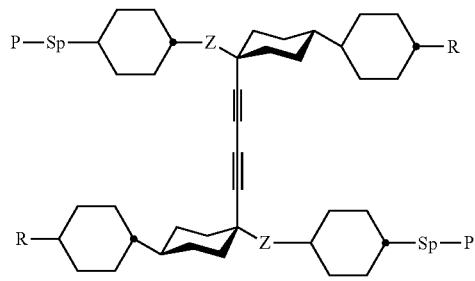
ND11
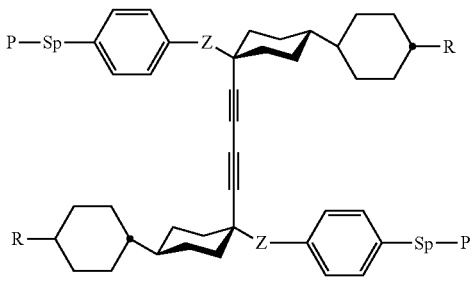
ND12
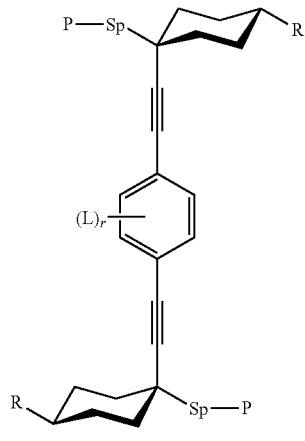
ND13
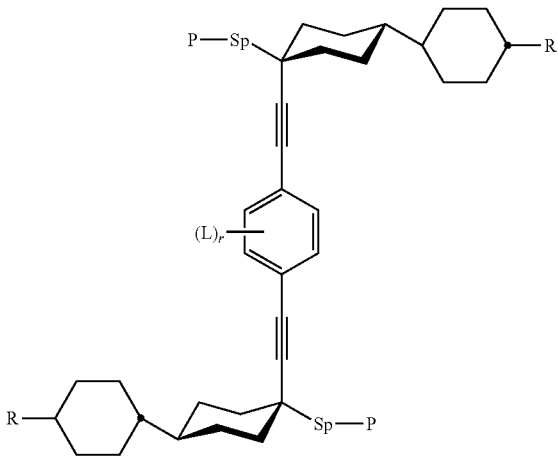
ND14
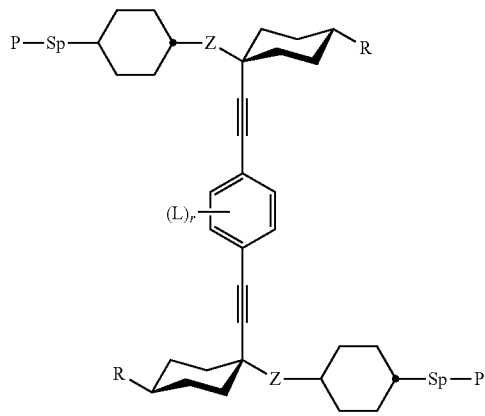
ND15
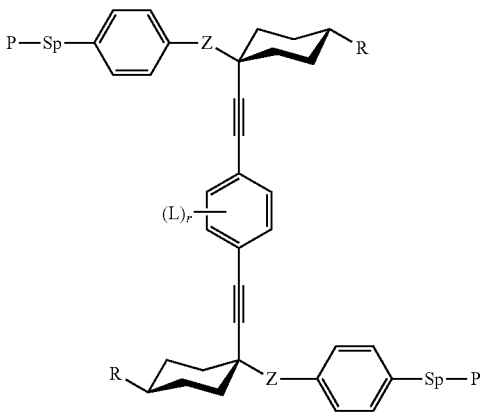
ND16

-continued
ND17
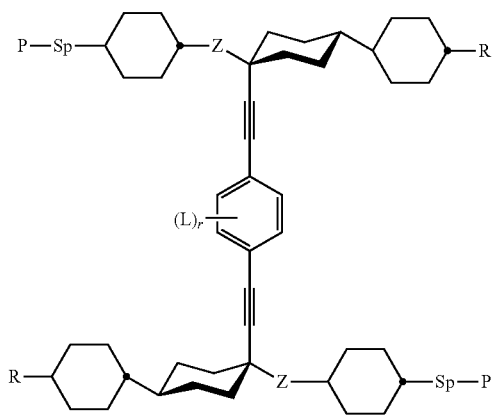
ND18
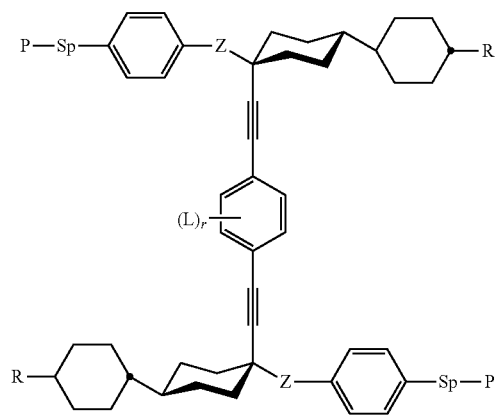
ND19
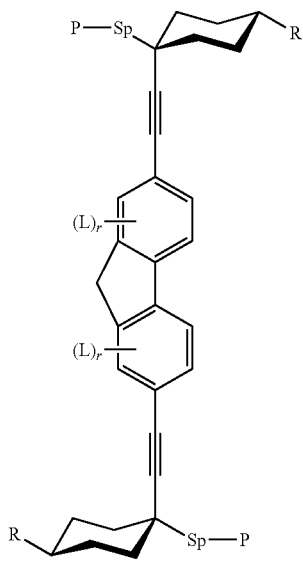
ND20
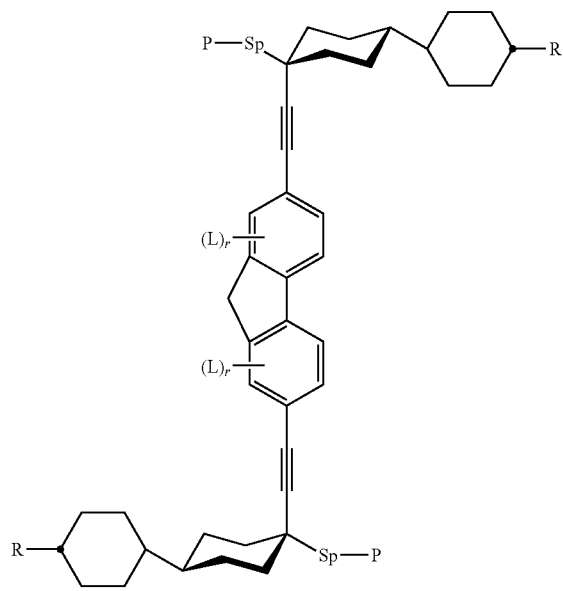
ND21
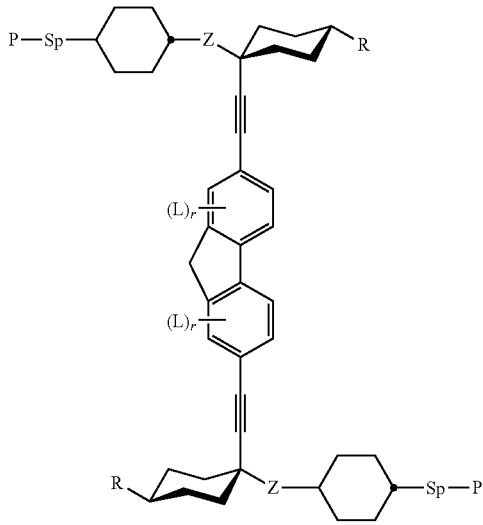
ND22
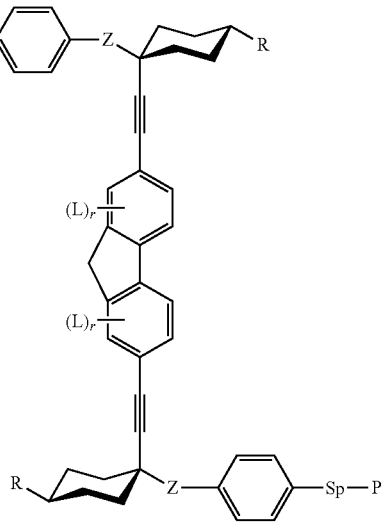

-continued
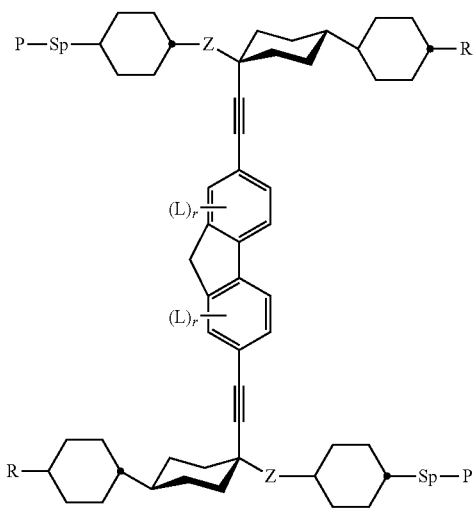
ND23
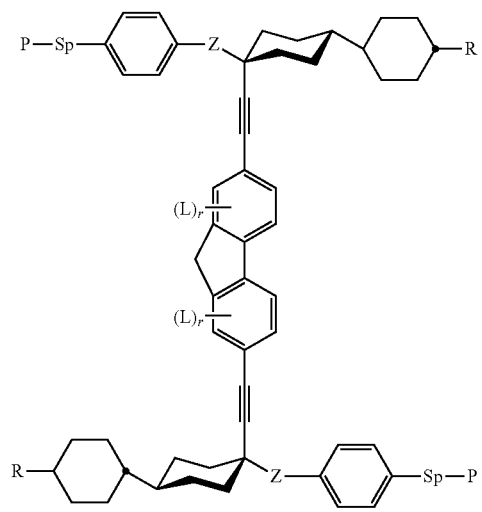
ND24
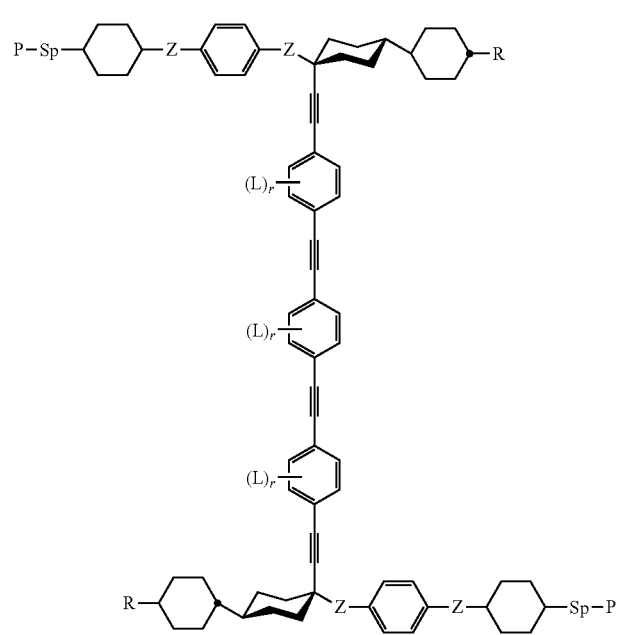
ND25

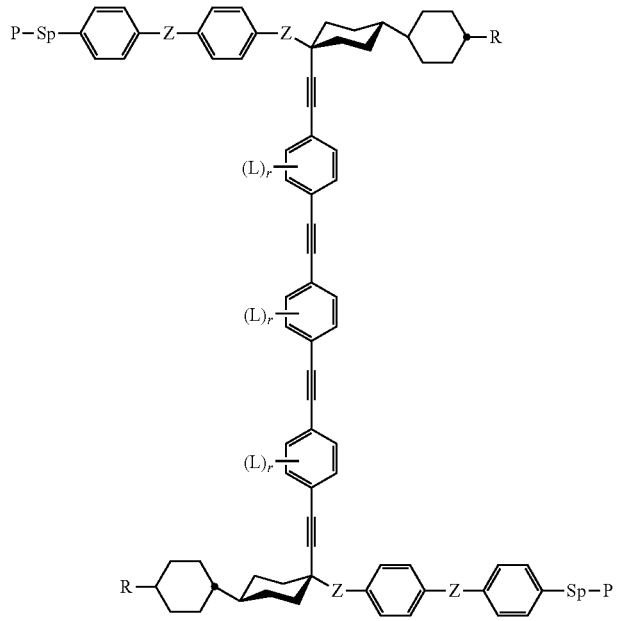

ND26 wherein Z has one of the meanings of $Z^1$ given above, R has one of the meanings of $R^1$ as given above that is different from P-Sp-, and P, Sp, L and r are as defined above, and the benzene rings in the mesogenic groups are optionally substituted by one or more groups L as defined above.

Preference is furthermore given to a polymerisable liquid crystalline medium wherein the compounds of formula ND are selected from the group of compounds of formula ND 25 or ND 26, in particular wherein Z denotes —COO—, r is in each occurrence 0, and P, Sp are as defined above.

P-Sp- in these preferred compounds is preferably P-Sp'-X', with X' preferably being —O—, —COO— or —OCOO—.

The compounds of formula ND, its subformulae and suitable methods for their synthesis are disclosed in WO 2008/119427 A1.

The amount of compounds of formula ND in the polymerisable LC material is preferably from 0 to 50%, very preferably from 0 to 40%.

A preferred polymerisable liquid crystal material for the preparation of an optical film utilized in the light modulation element according to the present invention comprises
5-41%, preferably 5-40%, very preferably 5-32% by weight of one or more direactive achiral mesogenic compounds, and/or
49-90% preferably 50-85% by weight of one or more monoreactive achiral mesogenic compounds, and/or
0.1 to 10% by weight of one or more photoinitiators.

The utilized optical films have preferably a thickness of from 0.2 to 10 µm, very preferably from 0.3 to 5 µm, in particular from 0.5 to 3 µm.

The optical retardation ($\delta(\lambda)$) of an optical film as a function of the wavelength of the incident beam ($\lambda$) is given by the following equation:

$$\delta(\lambda)=(2\pi\Delta n \cdot d)/\lambda$$

wherein ($\Delta n$) is the birefringence of the film, (d) is the thickness of the film and $\lambda$ is the wavelength of the incident beam.

According to Snellius law, the birefringence as a function of the direction of the incident beam is defined as $$\Delta n=\sin\Theta/\sin\Psi$$

wherein $\sin\Theta$ is the incidence angle or the tilt angle of the optical axis in the film and $\sin\Psi$ is the corresponding reflection angle.

Based on these laws, the birefringence and accordingly optical retardation depends on the thickness of an optical film and the tilt angle of optical axis in the film (cf. Berek's compensator). Therefore, the skilled expert is aware that different optical retardations or different birefringence can be induced by adjusting the orientation of the liquid-crystalline molecules in the polymer film.

The birefringence ($\Delta n$) of a suitable optical film according to the present invention is preferably in the range from 0.01 to 0.30, more preferable in the range from 0.01 to 0.25 and even more preferable in the range from 0.01 to 0.16.

The optical retardation as a function of the thickness of a suitable optical film according to the present invention is less than 200 nm, preferable less than 180 nm and even more preferable less than 150 nm.

Especially with respect to the in cell application, the optical films according to the present invention exhibit a high temperature stability. Thus, the polymer films preferably exhibit temperature stability up to 230° C., more preferably up to 250° C., most preferably up to 300° C.

For the preparation of cholesteric films, the polymerizable LC material preferably comprises one or more achiral polymerizable mesogenic compounds and one or more chiral compounds. The chiral compound is preferably selected from non-polymerizable chiral compounds, such as, e.g., conventional chiral dopants, polymerizable chiral non-mesogenic or polymerizable chiral mesogenic compounds.

Very preferred are chiral dopants with a high helical twisting power (HTP), in particular dopants comprising a sorbitol group as described in WO 98/00428, dopants comprising a hydrobenzoin group as described in GB 2,328,207, chiral binaphthyl derivatives as described in WO 02/94805, chiral binaphthol acetal derivatives as described in WO 02/34739, chiral TADDOL derivatives as described in WO 02/06265, and chiral compounds having fluorinated linkage group and a terminal or central chiral group as described in WO 02/06196 and WO 02/06195.

Suitable dopants can be selected, e.g., from the commercially available R or S 811, R or S 1011, R or S 2011 or CB 15 (from Merck KGaA, Darmstadt, Germany).

In a preferred embodiment, the polymerisable LC material additionally comprises one or more photoinitiators. For polymerising acrylate or methacrylate groups preferably, a radical photoinitiator is used. For polymerising vinyl, epoxide or oxetane groups preferably, a cationic photoinitiator is used. It is also possible to use a thermal polymerisation initiator that decomposes when heated to produce free radicals or ions that start the polymerisation.

A typical cationic photoinitiator is for example UVI 6974 (Union Carbide).

Typical photoinitiators for radical polymerisation are preferably selected from the commercially available Irgacure® or Darocure® (Ciba AG) series, in particular, Irgacure 127, Irgacure 184, Irgacure 369, Irgacure 651, Irgacure 817, Irgacure 907, Irgacure 1300, Irgacure, Irgacure 2022, Irgacure 2100, Irgacure 2959, Irgacure Oxe02 or Darocure TPO.

In a further preferred embodiment, the polymerisable LC material additionally comprises one or more other components such as, for example, catalysts, sensitizers, stabilizers, chain-transfer agents, inhibitors, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

In a preferred method of preparation of the utilized optical films, the polymerisable LC material is coated onto a substrate and subsequently photopolymerised for example by exposure to actinic radiation as described for example in WO 01/20394, GB 2,315,072 or WO 98/04651.

In a specific embodiment of the present invention, the polymerisable LC material exhibits a uniform alignment throughout the whole layer before the photopolymerisation.

In another specific embodiment, the polymerisable LC material exhibits a uniform homeotropic alignment before the photopolymerisation.

In further specific embodiment, the polymerisable LC material exhibits a uniform planar alignment before the photopolymerisation.

The Friedel-Creagh-Kmetz rule can be used by the skilled person to predict whether a mixture will adopt planar or homeotropic alignment, by comparing the surface energies (γ) of the RM layer and the substrate or alignment layer:

If $\gamma_{RM} > \gamma_s$ the reactive mesogenic compounds will display homeotropic alignment, if $\gamma_{RM} < \gamma_s$ the reactive mesogenic compounds will display homeotropic alignment.

When the surface energy of a substrate is relatively low, the intermolecular forces between the reactive mesogens are stronger than the forces across the RM-substrate interface. Therefore, reactive mesogens align perpendicular to the substrate (homeotropic alignment) in order to maximise the intermolecular forces.

When the surface tension of the substrate is greater than the surface tension of the RMs, the force across the interface dominates. The interface energy is minimised if the reactive mesogens align parallel with the substrate, so the long axis of the RM can interact with the substrate. Often the spin-coating itself provides sufficient alignment of the polymerisable LC material.

However, it is likewise possible to provide one or more alignment layers on to the substrate or electrode structure inducing the respective initial alignment of the reactive mesogens (RM) before the polymerisation.

Suitable alignment layer materials are commonly known to the expert.

Typical homeotropic alignment layer materials are commonly known to the expert, such as, for example, layers made of alkoxysilanes, alkyltrichlorosilanes, CTAB, lecithin or polyimides, preferably polyimides, such as, for example JALS-2096-R1 or AL-7511 (Nissan Chemical, Japan).

Suitable planar alignment layer materials are commonly known to the expert, such as, for example, AL-1054, AL-3046 or AL-1254 all commercially available from JSR.

In a preferred embodiment, the planar alignment layer is processed by rubbing or photo-alignment techniques known to the skilled person, preferably by rubbing techniques. Accordingly, a uniform preferred direction of the director can be achieved without any physical treatment of the cell like shearing of the cell (mechanical treatment in one direction), etc. The rubbing direction is uncritical and mainly influences only the orientation in which the polarizers have to be applied. Typically the rubbing direction is in the range of +/−45°, more preferably in the range of +/−20°, even more preferably, in the range of +/−10, and in particular, in the range of the direction +/−5° with respect to the substrates largest extension.

Uniform alignment can also be induced or enhanced by additional means like shearing, surface treatment of the substrate, or addition of surfactants to the polymerisable LC material.

Homeotropic alignment can also be achieved by using amphiphilic materials; they can be added directly to the polymerisable LC material, or the substrate can be treated with these materials in the form of a homeotropic alignment layer. The polar head of the amphiphilic material chemically bonds to the substrate, and the hydrocarbon tail points perpendicular to the substrate. Intermolecular interactions between the amphiphilic material and the RMs promote homeotropic alignment. Commonly used amphiphilic surfactants are known by the expert.

Another method used to promote homeotropic alignment is to apply corona discharge treatment to plastic substrates, generating alcohol or ketone functional groups on the substrate surface. These polar groups can interact with the polar groups present in RMs or surfactants to promote homeotropic alignment.

In general, reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A further review of alignment materials and techniques is given by J. Cognard, Mol. Cryst. Liq. Cryst. 78, Supplement 1 (1981), pages 1-77.

Preferably, optical films with uniform alignment are selected from A-plates, C-Plates, or combinations thereof.

In a preferred embodiment, the A (or C) plate comprises an optically uniaxial birefringent material with positive birefringence, referred to as "positive A (or C) plate" or "+A (or +C) plate".

In a preferred embodiment, the A (or C) plate comprises a film of optically uniaxial birefringent material with negative birefringence, such as a discotic anisotropic material, also referred to as "negative A (or C) plate" or "−A (or C) plate" depending on the orientation of the discotic materials.

Suitable and preferred A-plates are for example disclosed in GB 2331813 B or EP 0940707 B whereby the entire disclosures of which are incorporated by reference.

Suitable and preferred C-Plates are for example disclosed in GB 2329393 B whereby the entire disclosure of which is incorporated by reference.

Beside the above mentioned uniform oriented optical films it is likewise preferred to utilize one or more optical films selected from O-plates, biaxial films or cholesteric films, or combinations thereof.

Suitable and preferred O-plates are for example disclosed in U.S. Pat. No. 5,619,352, WO 97/44409, WO 97/44702, WO 97/44703 and WO 98/12584. B whereby the entire disclosure of which is incorporated by reference.

Suitable and preferred biaxial films are for example disclosed in EP 1453 933 B, EP 1789514 B, EP 1786887 B, or EP 1763689 B whereby the entire disclosures of which are incorporated by reference.

Suitable and preferred cholesteric films are for example disclosed in EP 2 218764 B, whereby the entire disclosure of which is incorporated by reference.

In a preferred embodiment, the light modulation element according to the present invention comprises one or more optical films exhibiting positive wavelength dispersion.

It is likewise preferable, that the light modulation element according to the present invention comprises one or more optical films exhibiting negative or flat wavelength dispersion.

Suitable and preferred optical films exhibiting negative of flat wavelength dispersion are, for example, disclosed in WO 2008/119427, WO 2010/020312, WO 2011/003505, WO 2011/050896, WO 2016/020035, or not yet published EP patent application 16000371.1, whereby the entire disclosures of which are incorporated by reference.

In another preferred embodiment, one or more optical films utilized in a light modulation element according to this invention are multilayer optical films comprising preferably one or more optical films selected from A-plates, C-Plates, O-plates, biaxial films or cholesteric films or combinations thereof.

In further preferred embodiment, the optical films forming a multilayer optical film, can be laminated directly onto each other or be connected via transparent intermediate films, like for example TAC, DAC or PVA films or by adhesive layers like for example pressure sensitive adhesives (PSA).

In another preferred embodiment, the optical films forming a multilayer optical film, are obtainable for example by providing a second film comprising second polymerized LC material with uniform orientation directly on a first film obtained from first polymerized LC material with uniform orientation that serves as a substrate, as described for example in U.S. Pat. No. 6,995,825.

If two or more optical films or multilayer optical films are utilized in a light modulation element according to the present invention it is likewise preferred that one or more optical film are inside the LC cell and one or more optical films are outside the LC cell.

In another preferred embodiment, all optical films or multilayer optical films are provided inside the LC cell.

In another preferred embodiment, one or more optical films or multilayer optical films are laminated directly onto the transparent substrate or polariser utilizing adhesive layers like for example pressure sensitive adhesives (PSA).

In a preferred embodiment, the light modulation element according to the present invention comprises one the following optical films or multilayer optical films:
one +A-plate; or
one +C-plate; or
one +A-plate and one −A-plate; or
one +A-plate and one +C-plate; or
two +A-plates and one +C-plate; or
two −A plates and one −C plate, or
one or two biaxial films.

Preferably, if one +A-plate is utilized in the light modulation element according to the present invention, the optical axis of the +A-plate is parallel to the absorption axis of the analyser (upper polarizer).

Preferably, if one +A-plate and one −A-plate are utilized in the light modulation element according to the present invention, the optical axis of the +A-plate is parallel to the absorption axis of the analyser (upper polarizer) and the optical axis of the −A-plate is parallel to the absorption axis of the polarizer (lower polarizer).

Preferably, if one +A-plate and one +C-plate are utilized in the light modulation element according to the present invention, the optical axis of the +A-plate is parallel or perpendicular to the absorption axis of the analyser (upper polarizer).

Preferably, if two +A-plates and one +C-plate are utilized in the light modulation element according to the present invention, the optical axis of the +A-plate is parallel to the absorption axis of the analyser (upper polarizer) and the optical axis of the −A-plate is parallel to the absorption axis of the polarizer (lower polarizer).

Preferably, if one or two biaxial films are utilized in the light modulation element according to the present invention, the in plane optical axis of one or two biaxial films is parallel to the absorption axis of the analyser (upper polarizer).

When manufacturing optical films utilized for the light modulation element in accordance with the present invention, it is generally advantageous and preferred to reduce the number of coating and lamination steps.

The light modulation element according to the present invention may further comprise one or more further optical films such as compensation or retardation films like for example one or more quarter wave retardation films (QWF, λ/4 films) or half wave retardation films (HWF, λ/2 films), positive or negative A, O or C plates or retardation films with twisted, homeotropic, planar, tilted or splayed structure.

In another preferred embodiment, the light modulation element according to the present invention comprises additionally an isotropic layer on top of the optical film.

In a preferred embodiment, the isotropic layer is obtainable from non-mesogenic polymerisable compounds, such as alkyl di(meth)acrylates, or halogenated derivatives thereof.

In a first preferred embodiment, the isotropic layer can be laminated directly onto the optical film by adhesive layers like for example pressure sensitive adhesives (PSA).

In another preferred embodiment, the isotropic layer, is obtainable for example, by providing a layer of a non-mesogenic or isotropic polymerizable material on the optical film that serves as substrate, and subsequent photopolymerising of the non-mesogenic polymerizable material.

In a further preferred embodiment, the optical film utilized in a light modulation element according to the present invention is obtainable from a polymerizable LC material comprising one or more multi- or direactive mesogenic compounds, preferably of formula DRM, optionally one or more monoreactive mesogenic compounds, preferably selected from compounds of formula MRM, and one or more polymerisable isotropic compounds of formula DRI, $$P^1-Sp^1-(CF_2)_n-Sp^2-P^2 \quad \text{DRI}$$

wherein the parameter $P^1$, $P^2$, $Sp^1$ and $Sp^2$ have each and independently from another one of the meanings as given above under formula DRM or MRM and n denotes an integer from 2 to 12, preferably 3 to 10, more preferably 4 to 8.

Not to be bound by the theory, it is strongly believed that the polymerisable isotropic compounds of formula DRI in the polymerizable LC material rises to the surface of the film during the deposition or curing process and forms an isotropic barrier layer.

The present invention also relates to a polymerizable LC material comprising one or more multi- or direactive mesogenic compounds, preferably selected from compounds of formula DRM, optionally one or more monoreactive mesogenic compounds, preferably selected from compounds of formula MRM and one or more polymerisable isotropic compounds of formula DRI.

Preferably, the amount of compounds of formula DRI with respect to the total polymerisable liquid crystalline mixture is in the range from 1 to 40%, more preferably 10 to 35 and most preferably 15 to 25%.

Further, the present invention relates also to a process for the production of an optical according to the present invention, comprising the steps of
1. Optionally, providing an alignment layer on a substrate,
2. Providing a layer of a polymerizable LC material comprising one or more multi- or direactive mesogenic compounds of formula DRM, optionally one or more monoreactive mesogenic compounds of formula MRM, and one or more polymerisable isotropic compounds of formula DRI on top of the alignment layer or substrate,
3. Irradiating the layer stack with actinic radiation,
4. Optionally removing the resulting polymer film from the alignment layer or substrate, and optionally, laminating the polymer film onto another substrate.

The present invention also relates to the use of a polymer film as described above in a light modulation element according to the present invention.

In a preferred embodiment, the light modulation element comprises an electrode structure, which is capable to allow the application of an electric field, which is substantially parallel to the substrates or the liquid-crystal layer or in other words which is capable to allow the application of an electric field, which has at least a substantial component parallel to the substrate main plane or the optical film.

In a preferred embodiment, both substrates carry patterns of opposing parallel electrodes on their facing surfaces with the intervening liquid crystal medium there between. A suitable electrode structure is, for example, a comb-like electrode arrangement.

In another preferred embodiment, one of the substrates includes a pixel electrode and a common electrode for generating an electric field substantially parallel to a surface of the first substrate in the pixel region.

Different kinds of displays having at least two electrodes on one substrate are known to the skilled person wherein the most important difference is that either both the pixel electrode and the common electrode are structured, as it is typical for IPS displays, or only the pixel electrode is structured and the common electrode is unstructured, which is the case for FFS displays.

In further preferred embodiment, a through cell electrode structure is utilized, which serves as both spacer and electrode.

The term through cell electrodes refers to electrodes protruding toward the interior of the formed cell. In detail, electrodes which preferably extend over the entire thickness and entire length of the control layer or the formed cell. The electrodes are preferably arranged substantially parallel to each other. Preferably, the electrodes can have a circular cross-section, in the form of a solid wire or a cylinder, or the electrodes can have a rectangular or almost rectangular cross section. Especially preferred is a rectangular or almost rectangular cross section of the electrodes.

Other suitable electrode structures are commonly known to the expert and for example disclosed in WO 2004/029697 A1.

Suitable electrode materials are commonly known to the expert, as for example electrodes made of metal or metal oxides, such as, for example transparent indium tin oxide (ITO), which is preferred according to the present invention.

The spacing between the electrodes is preferably in the range from approximately 1 µm to approximately 1000 µm, more preferably in the range from approximately 10 µm to approximately 1000 µm, and even more preferably in the range from approximately 20 µm to approximately 1000 µm, in particular in the range from approximately 30 µm to approximately 200 µm.

In a preferred embodiment, the electrodes of the light modulation element are associated with a switching element, such as a thin film transistor (TFT) or thin film diode (TFD).

Suitable liquid crystal media comprise, preferably consist of a photoalignment component A) comprising one or more photoreactive mesogenic compounds of formula I below, and a liquid-crystalline component B), hereinafter also referred to as "LC host mixture", comprising one or more non-polymerisable mesogenic or liquid-crystalline compounds, wherein formula I is as follows:

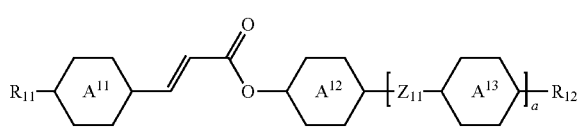

I wherein
$A^{11}$ denotes an aryl or heteroaryl group, which may be substituted by one or more radicals L,
$A^{12}$, $A^{13}$ are each, independently of one another, defined like $A^{11}$ or denote a cycloalkyl group having 3 to 10 C atoms, in which 1 to 4 non-adjacent $CH_2$ groups may be replaced by O and in which one or more H atoms may be replaced by a group L,
L on each occurrence, identically or differently, denotes OH, F, Cl, Br, I, —CN, —$NO_2$, $SF_5$, —NCO, —NCS, —OCN, —SCN, —C(═O)N($R^z$)$_2$, —C(═O)$R^z$, —N($R^z$)$_2$, optionally substituted silyl, optionally substituted aryl having 6 to 20 C atoms, or straight-chain or branched alkyl or alkenyl with up to 15 C atoms in which one or more non adjacent $CH_2$-groups may be replaced by —O—, —S—, —CO—, —C(O)O—, —O—C(O)—, O—C(O)—O—, in which, in addition, one or more H atoms may be replaced by F or Cl,
$Z^{11}$ on each occurrence, identically or differently, denotes —$CH_2CH_2$—, —$CF_2CF_2$—, —$CF_2CH_2$—, —CH$_2$CF$_2$—, —C(O)O—, —OC(O)—, —CH=CH—COO—, —OOC—CH=CH—, or a single bond, preferably —C(O)O—, —OC(O)—, —CH=CH—C(O)O—, —O(O)C—CH=CH—, —CH$_2$CH$_2$— or a single bond, R$^{11}$ and R$^{12}$ identically or differently, denote a group P-Sp-, or halogen, CN, optionally fluorinated alkyl or alkenyl with up to 15 C atoms in which one or more non adjacent CH$_2$-groups may be replaced by —O—, —S—, —CO—, —C(O)O—, —O—C(O)—, O—C(O)—O—, whereby at least one of R$^{11}$ and R$^{12}$ denotes a group P-Sp-, preferably both of R$^{11}$ and R$^{12}$ denote P-Sp-, R$^z$ each, independently of one another, denote H or alkyl having 1-12 C atoms, P a polymerisable group, Sp a spacer group or a single bond, a is 0 or 1.

The compounds of formula I are preferably selected from compounds of the sub-formulae I-1 to I-8.

I-1
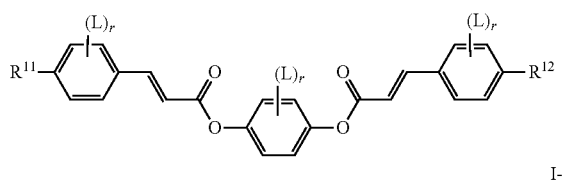

I-2
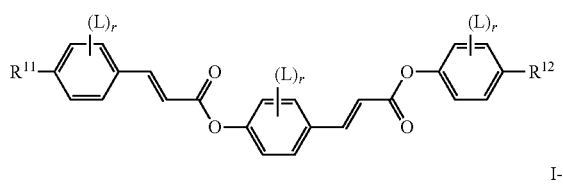

I-3
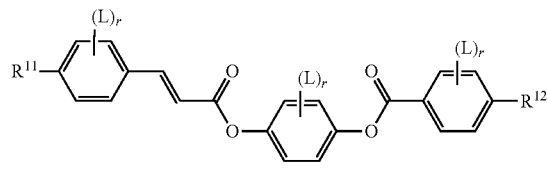

I-4
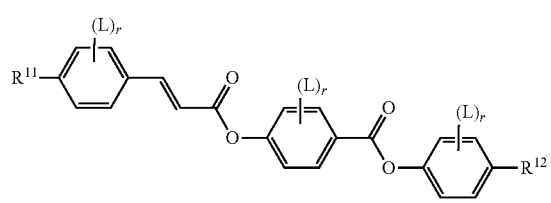

I-5
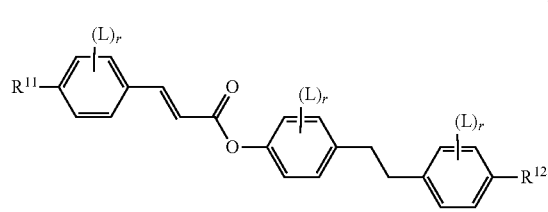

I-6
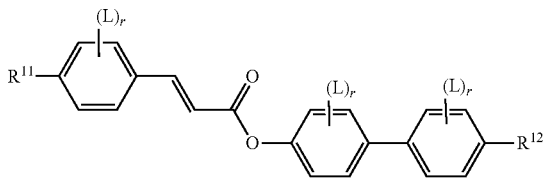

I-7
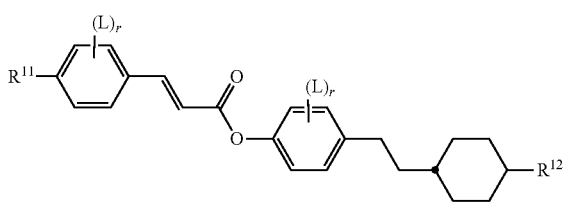

I-8
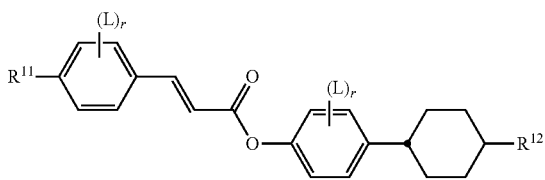

wherein R$^{11}$ and R$^{12}$ and L are defined as indicated above and r, on each occurrence, identically or differently, is 0, 1 or 2.

The group

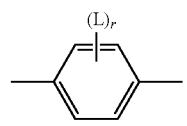

preferably denotes

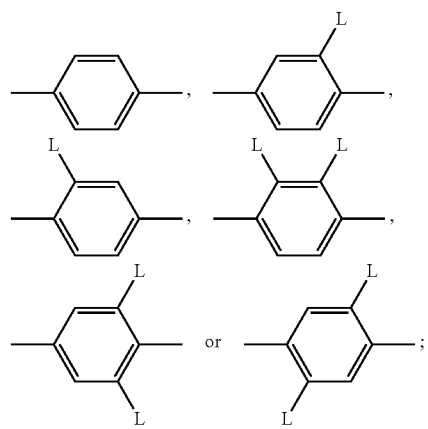

particularly preferably

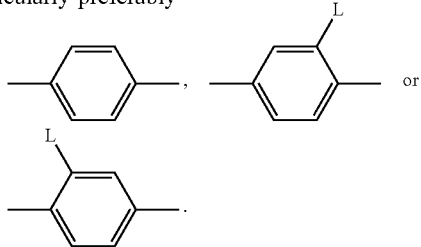

wherein L has the meaning indicated above and preferably denotes alkyl or alkoxy having 1 to 8 C atoms, halogen or CN.

Particularly preferred compounds of formula I are selected from sub-formulae I-1-1, I-3-1 and I-3-2

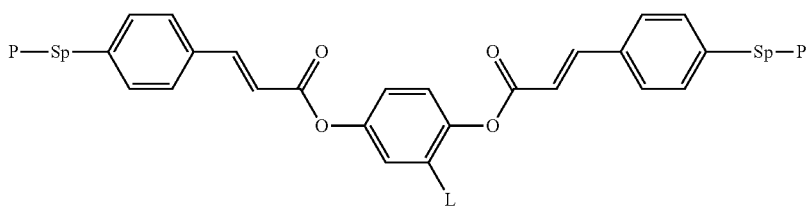

I-1-1

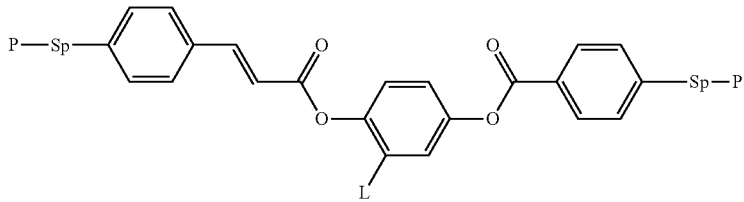

I-3-1

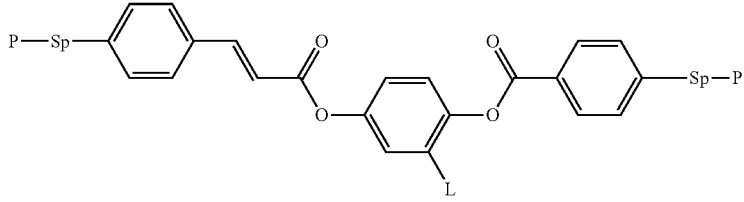

I-3-2 wherein the groups occurring have the meanings indicated above and preferably
- L denotes alkyl or alkoxy having 1 to 6 C atoms, Cl, or F, particularly preferably $CH_3$ or $C_2H_5$,
- P denotes, identically or differently, acrylate or methacrylate,
- Sp denotes, identically or differently, $(CH_2)_t$, $-O(CH_2)_t$, or a single bond, and
- t is an integer from 2 to 12, preferably from 2 to 8.

Preferred compounds of formulae I-1-1, I-3-1 and I-3-2 are compounds of the following sub-formulae:

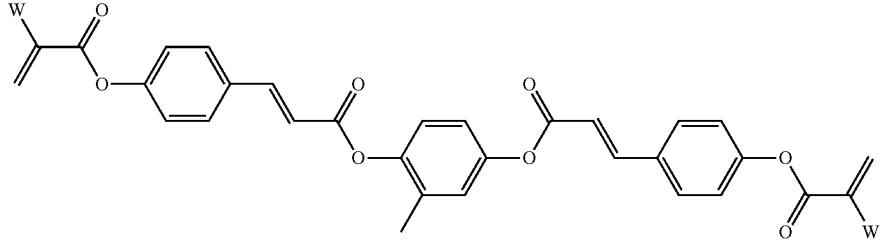

I-1-1a

-continued
I-1-1b
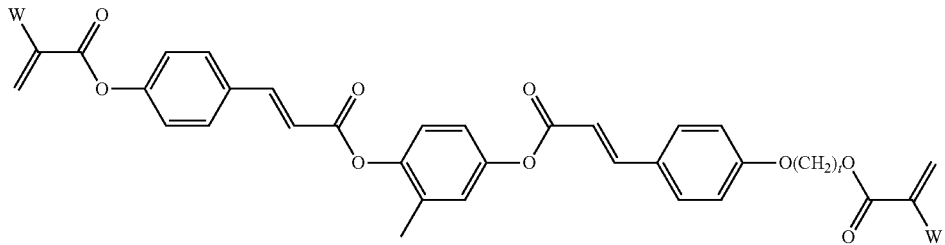
I-1-1c
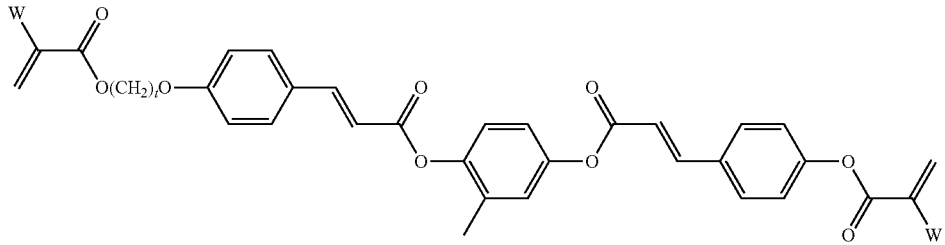
I-1-1d
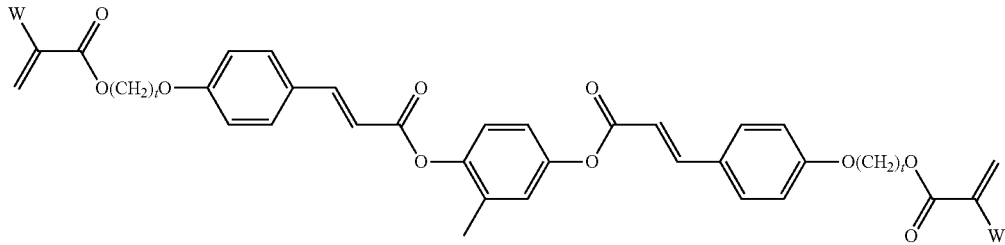
I-1-1a
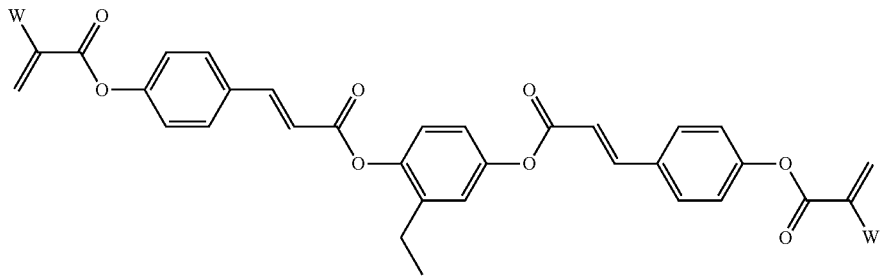
I-1-1f
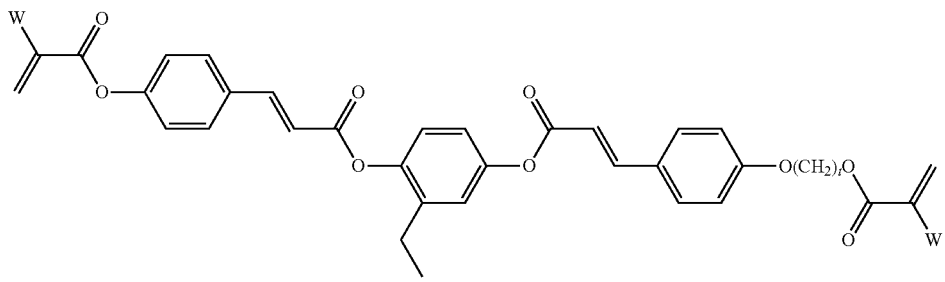
I-1-1g
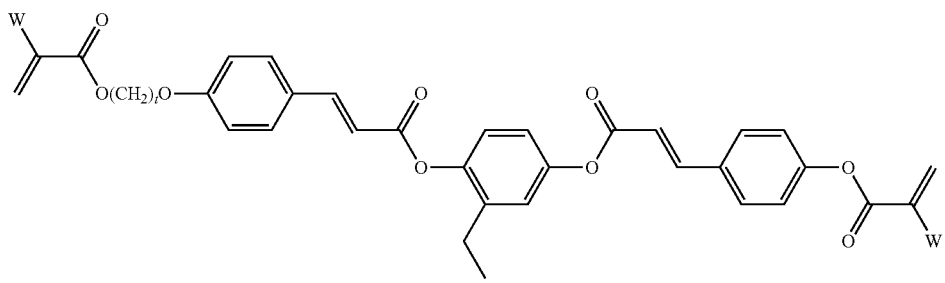

-continued
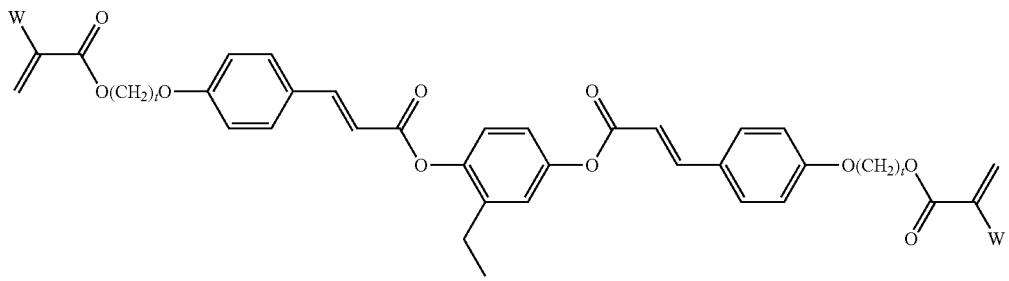
I-1-1h
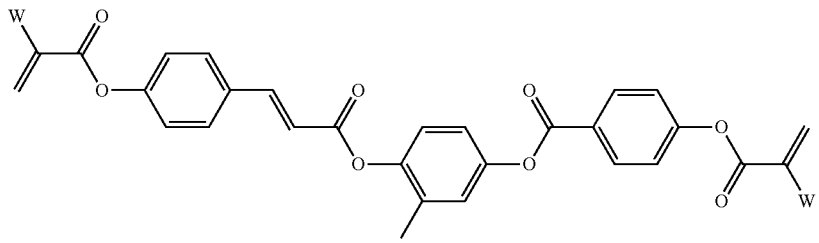
I-3-1a
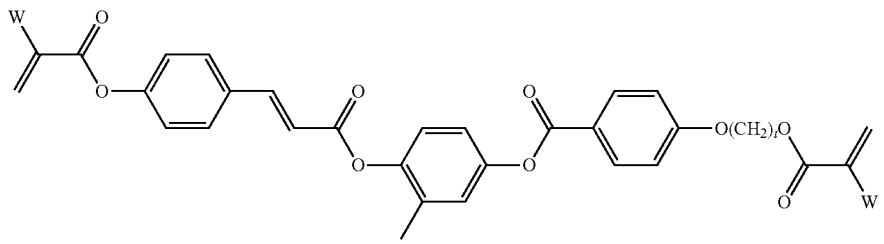
I-3-1b
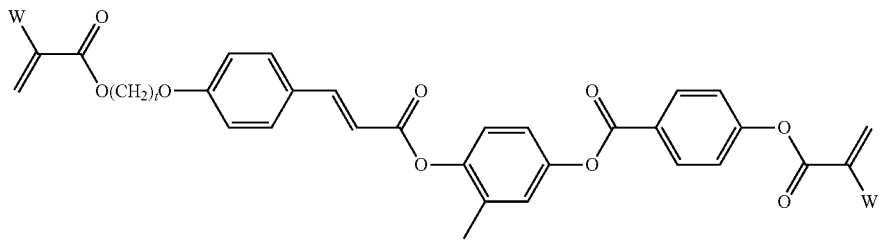
I-3-1c
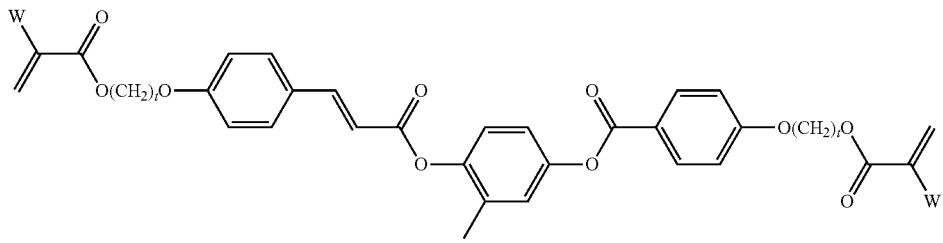
I-3-1d
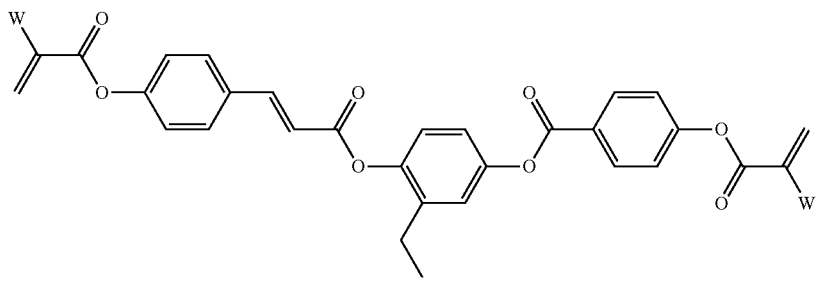
I-3-1a -continued
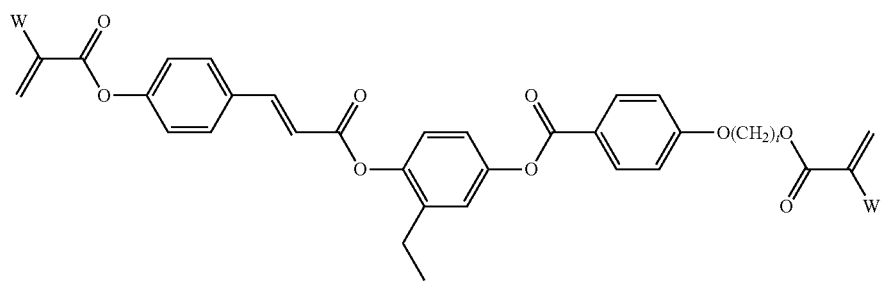
I-3-1b
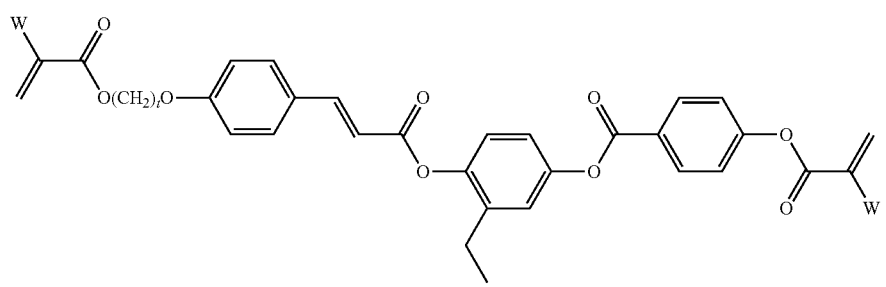
I-3-1c
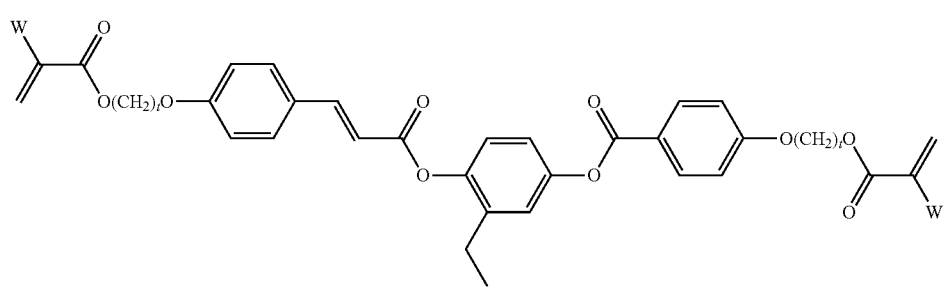
I-3-1d
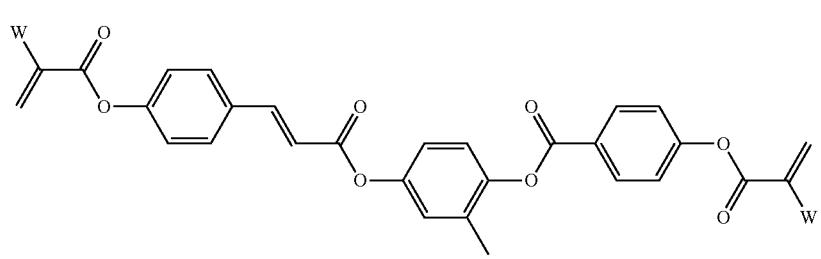
I-3-1a
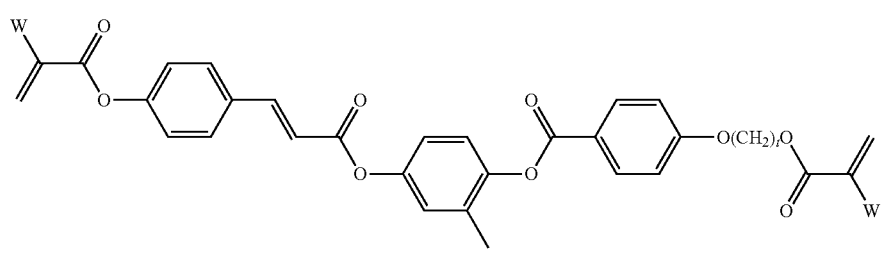
I-3-1b
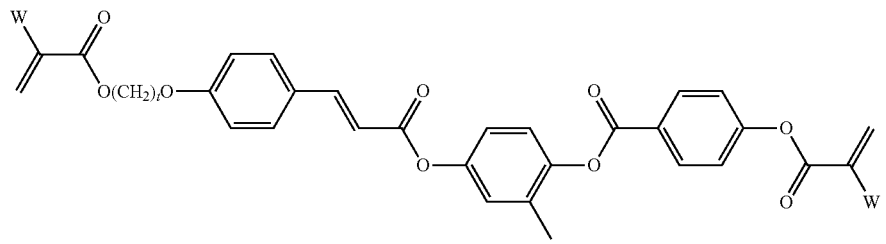
I-3-1c -continued

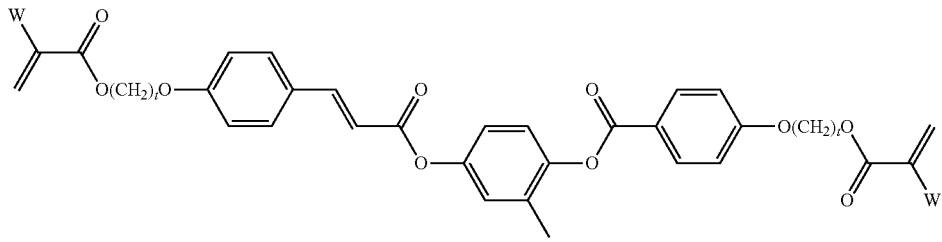

I-3-1d

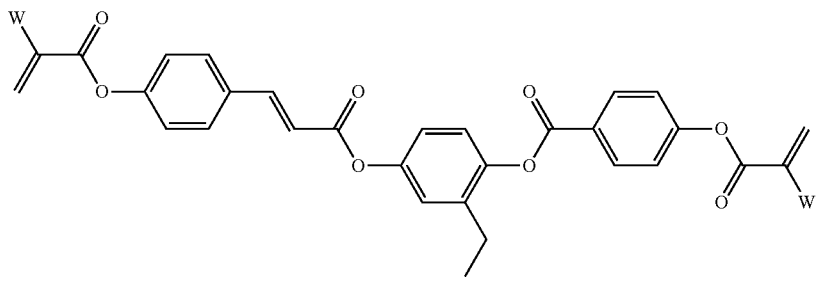

I-3-1a

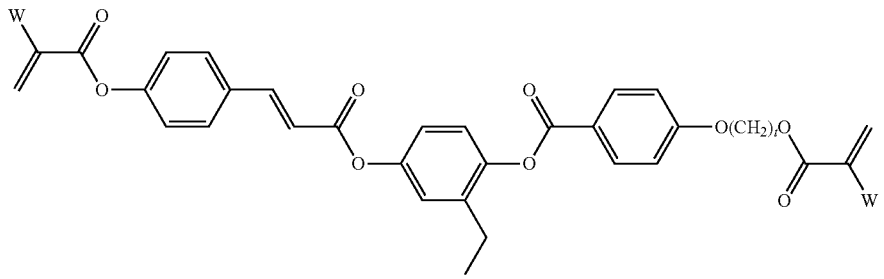

I-3-1b

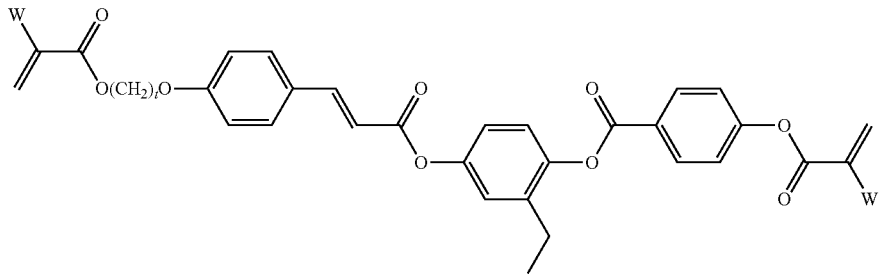

I-3-1c

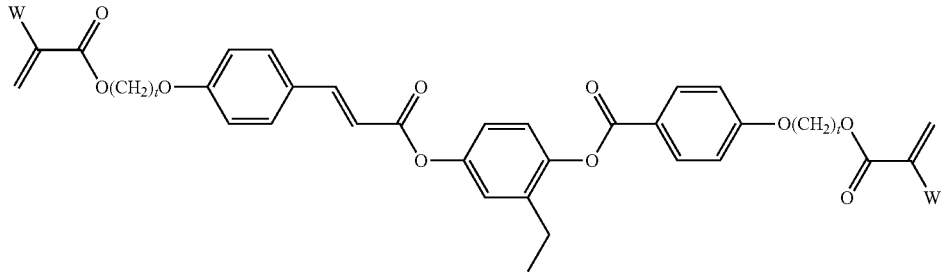

I-3-1d wherein W denotes H or CH$_3$ and t is an integer from 2 to 8.

In a preferred embodiment, the LC-host mixture (component B) according to the present invention comprises one or more, preferably two or more, low-molecular-weight (i.e. monomeric or unpolymerised) compounds. The latter are stable or unreactive with respect to a polymerisation reaction or photoalignment under the conditions used for the polymerisation of the polymerisable compounds or photoalignment of the photoreactive mesogen of formula I.

In principle, a suitable host mixture is any dielectrically negative or positive LC mixture, which is suitable for use in conventional VA, IPS or FFS displays.

Suitable LC mixtures are known to the person skilled in the art and disclosed in the literature. LC media for VA displays having negative dielectric anisotropy are described in for example EP 1378557 A1.

Suitable LC mixtures having positive dielectric anisotropy which are suitable for LCDs and especially for IPS displays are known, for example, from JP 07-181439 (A), EP 0667555, EP 0673986, DE 19509410, DE 19528106, DE 19528107, WO 96/23851, WO 96/28521 and WO2012/079676.

Preferred embodiments of the liquid-crystalline medium having negative or positive dielectric anisotropy according to the invention are indicated below and explained in more detail by means of the working examples.

The LC host mixture is preferably a nematic LC mixture, and preferably does not have a chiral LC phase.

In a preferred embodiment of the present invention, the LC medium contains an LC host mixture with negative dielectric anisotropy. Preferred embodiments of such an LC medium, and the corresponding LC host mixture, are those of sections a)-z) below:

a) LC medium, which comprises one or more compounds of the formulae CY and/or PY:

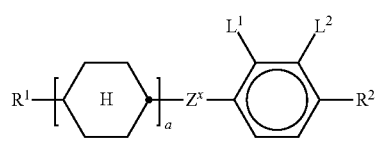

CY

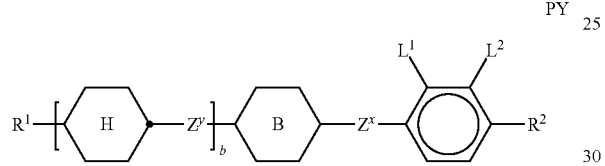

PY wherein
a denotes 1 or 2,
b denotes 0 or 1,

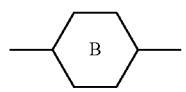

denotes

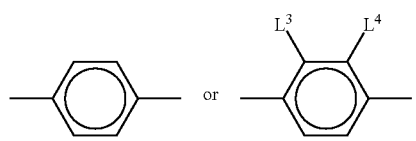

$R^1$ and $R^2$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms, $Z^x$ and $Z^y$ each, independently of one another, denote —CH$_2$CH$_2$—, —CH=CH—, —CF$_2$O—, —OCF$_2$—, —CH$_2$O—, —OC H$_2$—, —CO—O—, —O—OC—, —C$_2$F$_4$—, —CF=CF—, —CH=CH—CH$_2$O— or a single bond, preferably a single bond, $L^{1-4}$ each, independently of one another, denote F, Cl, OCF$_3$, CF$_3$, CH$_3$, CH$_2$F, CHF$_2$.

In a preferred embodiment, both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl.

The compounds of the formula CY are preferably selected from the group consisting of the following sub-formulae:

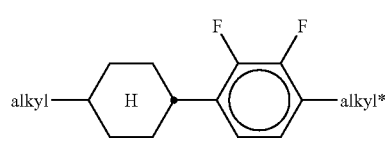
CY1

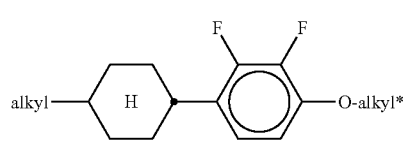
CY2

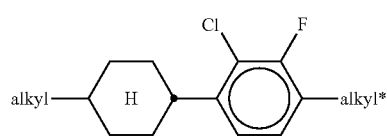
CY3

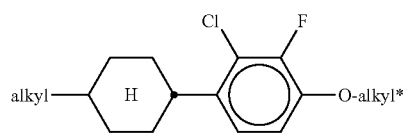
CY4

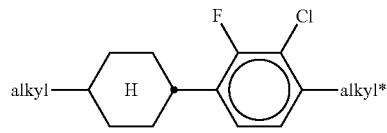
CY5

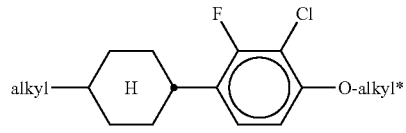
CY6

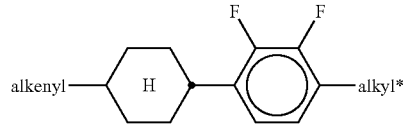
CY7

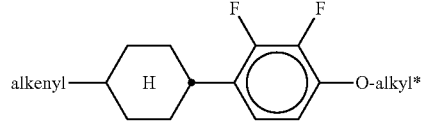
CY8

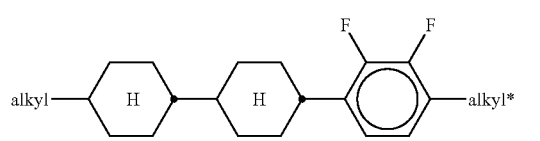
CY9

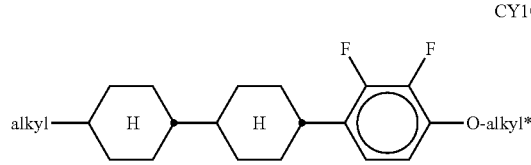
CY10

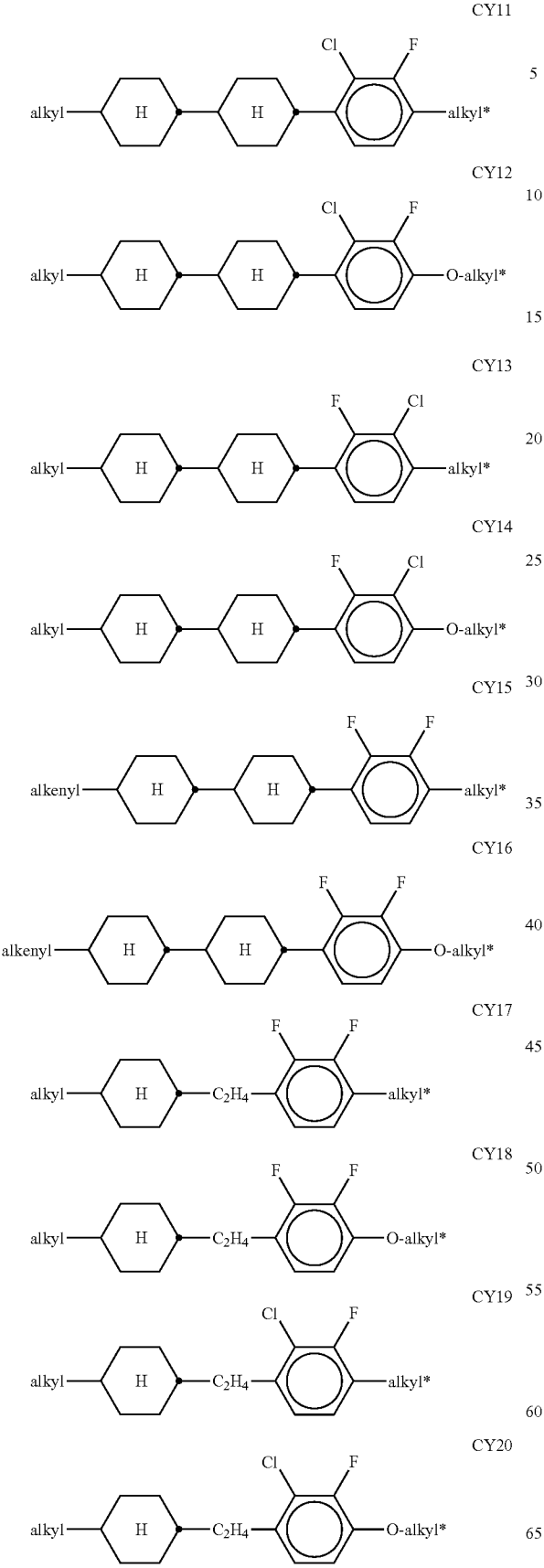
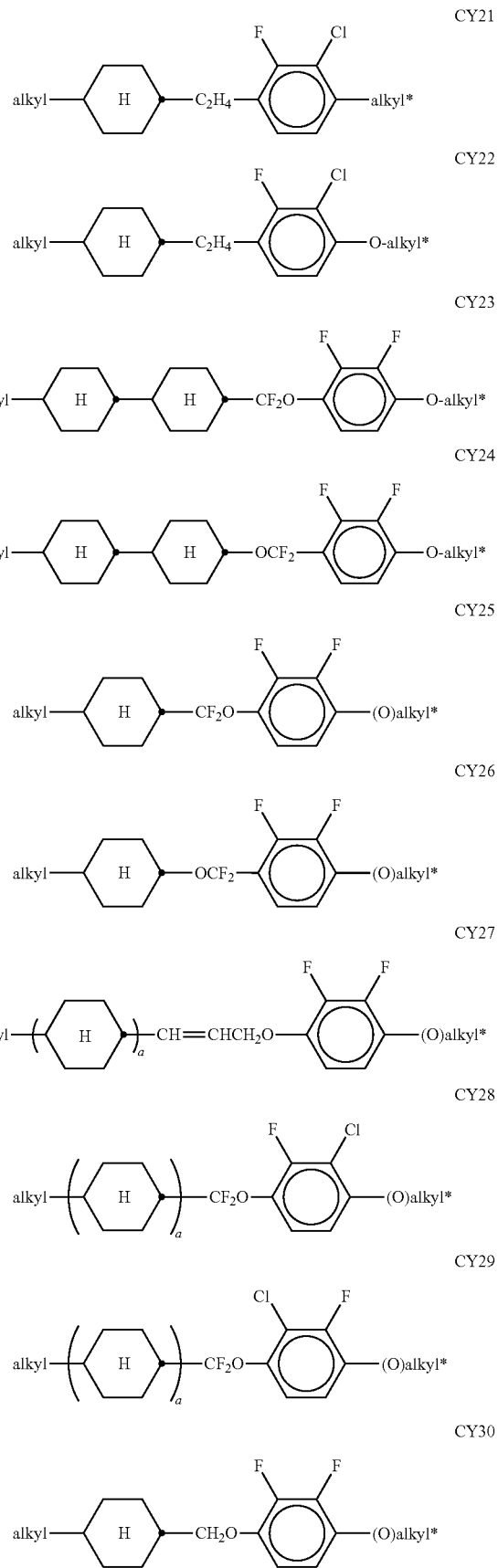

CY31
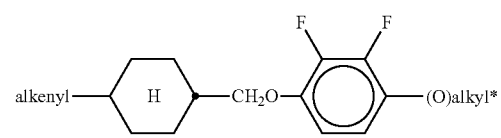

CY32
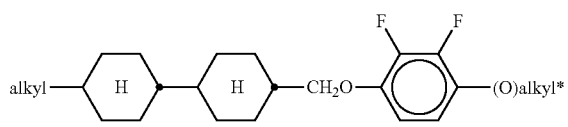

CY33
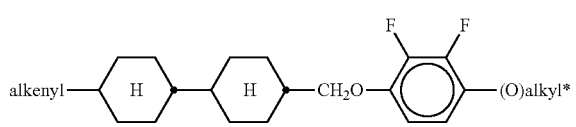

wherein a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The compounds of the formula PY are preferably selected from the group consisting of the following sub-formulae:

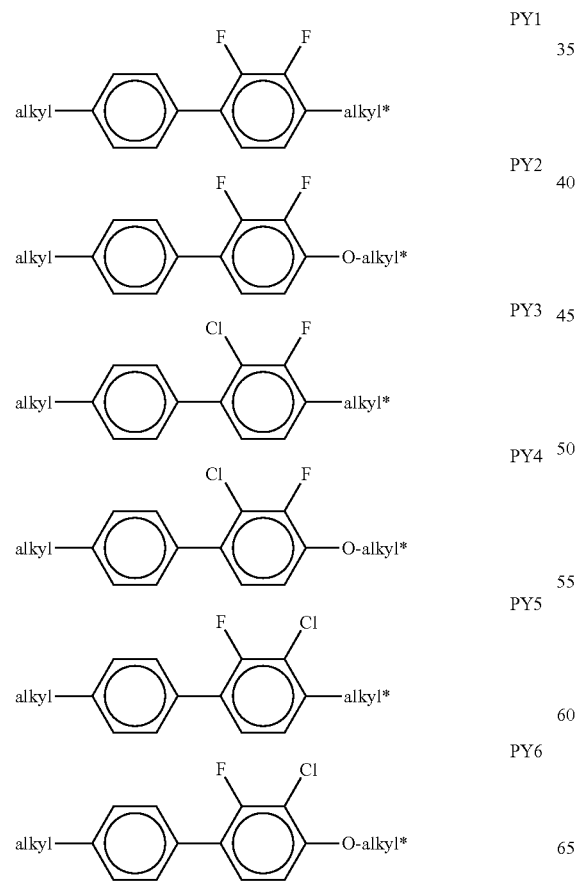

PY7
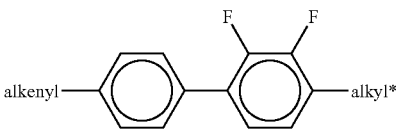

PY8
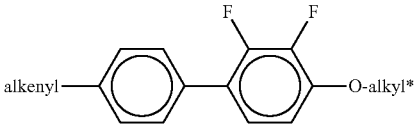

PY9
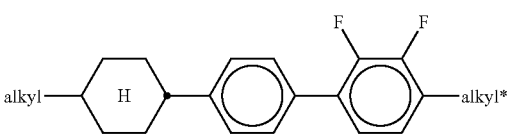

PY10
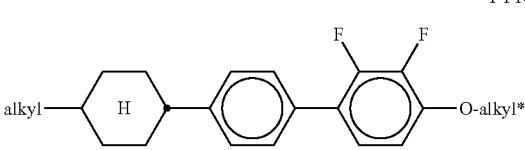

PY11
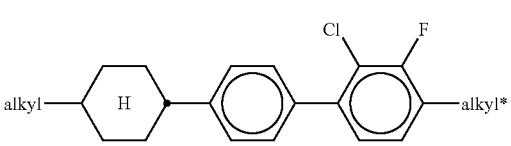

PY12
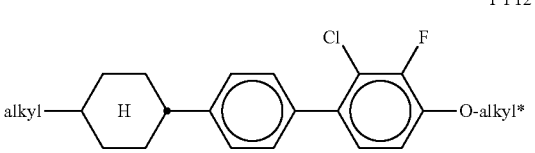

PY13
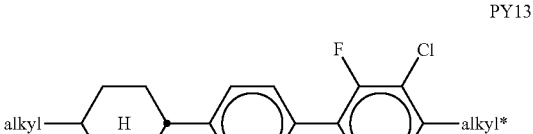

PY14
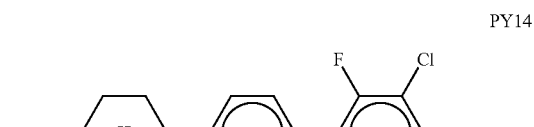

PY15
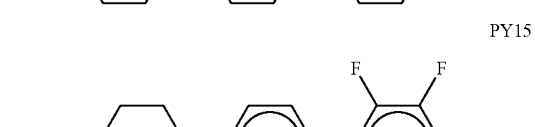

PY16
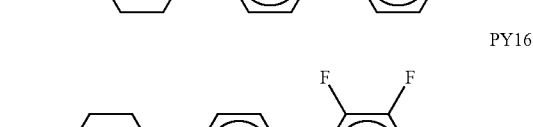

-continued

PY17
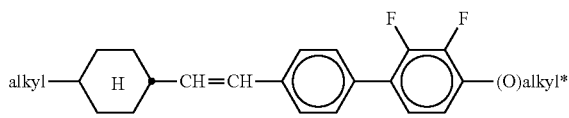

PY18
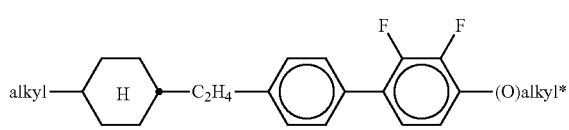

PY19
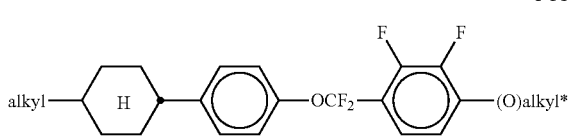

PY20
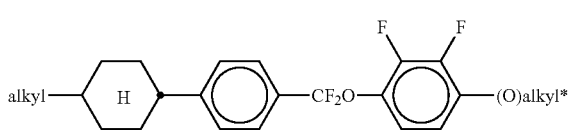

wherein alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

b) LC medium, which additionally comprises one or more compounds of the following formula:

ZK
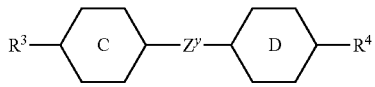

in which the individual radicals have the following meanings:

denotes

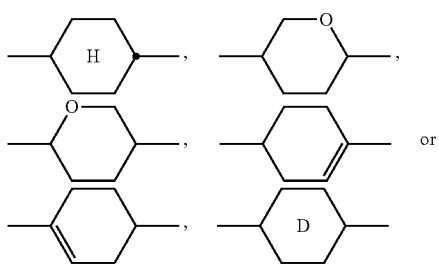

denotes

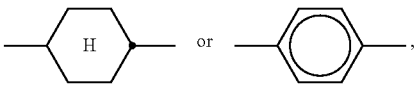

$R^3$ and $R^4$ each, independently of one another, denote alkyl having 1 to 12 C atoms, in which, in addition, one or two non-adjacent CH$_2$ groups may be replaced by —O—, —CH=CH—, —CO—, —O—OCO— or —CO—O— in such a way that O atoms are not linked directly to one another, $Z^y$ denotes —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond.

The compounds of the formula ZK are preferably selected from the group consisting of the following sub-formulae:

ZK1
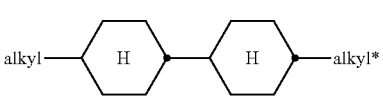

ZK2
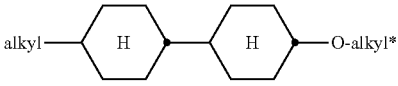

ZK3
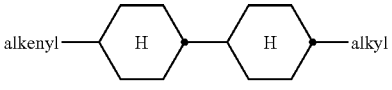

ZK4
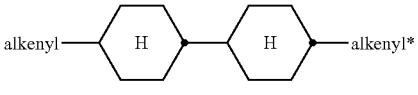

ZK5
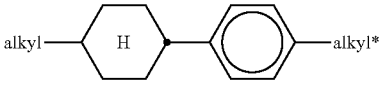

ZK6
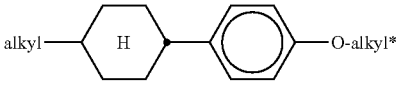

ZK7
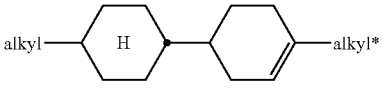

ZK8
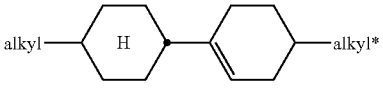

ZK9
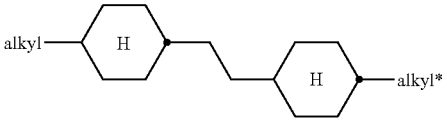

ZK10
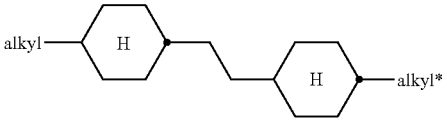

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Especially preferred are compounds of formula ZK1 and ZK3.

Particularly preferred compounds of formula ZK are selected from the following sub-formulae:

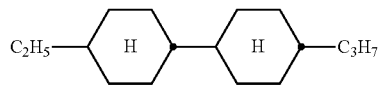

ZK1a

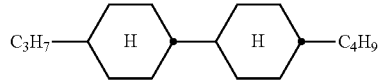

ZK1b

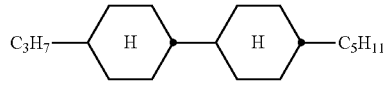

ZK1c

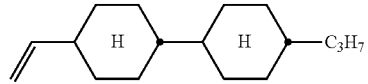

ZK3a

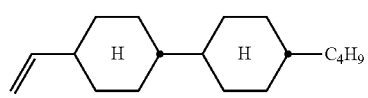

ZK3b

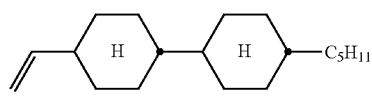

ZK3c

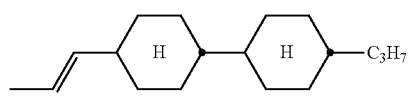

ZK3d wherein the propyl, butyl and pentyl groups are straight-chain groups.

Most preferred are compounds of formula ZK1a and ZK3a.

c) LC medium, which additionally comprises one or more compounds of the following formula:

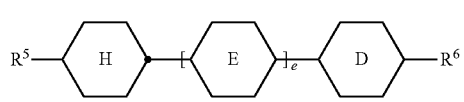

DK in which the individual radicals on each occurrence, identically or differently, have the following meanings:

R$^5$ and R$^6$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that 0 atoms are not linked directly to one another, preferably alkyl or alkoxy having 1 to 6 C atoms,

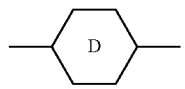

denotes

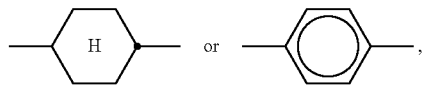

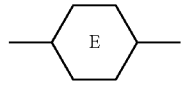

denotes

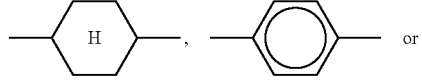

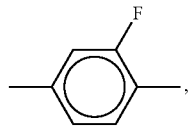

and e denotes 1 or 2.

The compounds of the formula DK are preferably selected from the group consisting of the following sub-formulae:

DK1

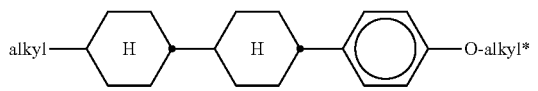

DK2

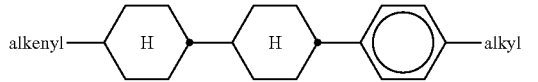

DK3

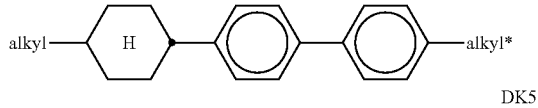

DK4

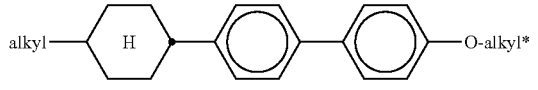

DK5

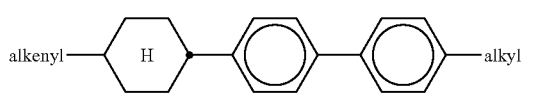

DK6

-continued

DK7
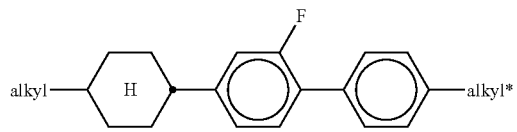

DK8
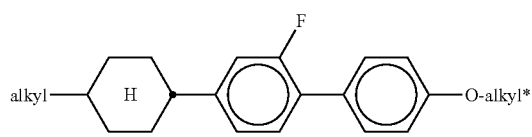

DK9
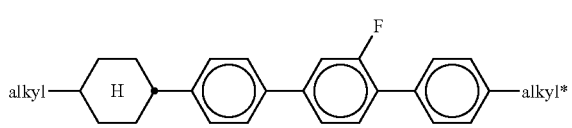

DK10
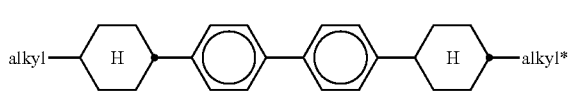

DK11
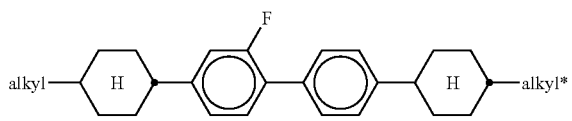

DK12
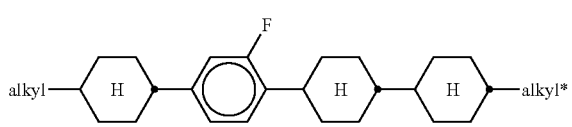

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

d) LC medium, which additionally comprises one or more compounds of the following formula:

LY
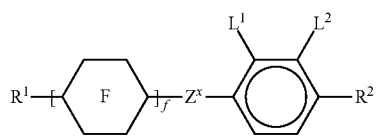

in which the individual radicals have the following meanings:

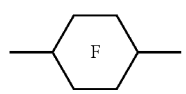

denotes

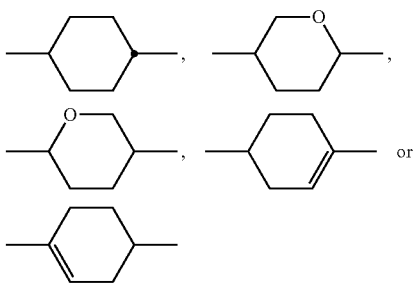

with at least one ring F being different from cyclohexylene, f denotes 1 or 2,

R$^1$ and R$^2$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, Z$^x$ denotes —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, L$^1$ and L$^2$ each, independently of one another, denote F, Cl, OCF$_3$, CF$_3$, CH$_3$, CH$_2$F, CHF$_2$.

In a preferred embodiment, both radicals L$^1$ and L$^2$ denote F or one of the radicals L$^1$ and L$^2$ denotes F and the other denotes Cl.

The compounds of the formula LY are preferably selected from the group consisting of the following sub-formulae:

LY1
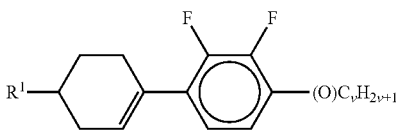

LY2
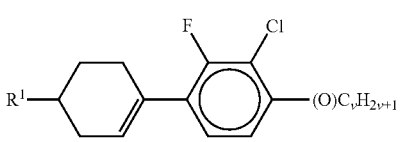

LY3
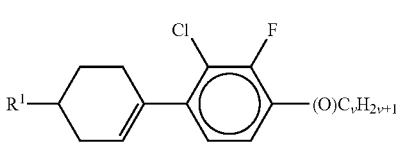

LY4
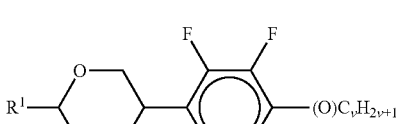

LY5
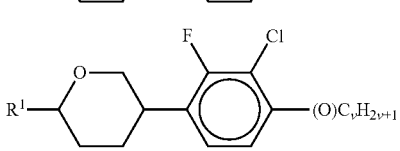

-continued

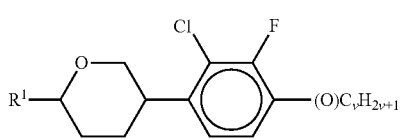
LY6

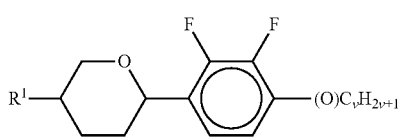
LY7

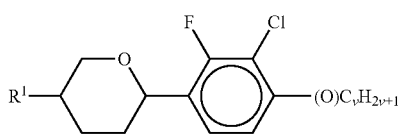
LY8

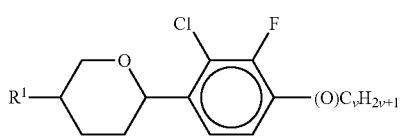
LY9

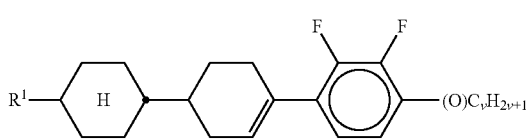
LY10

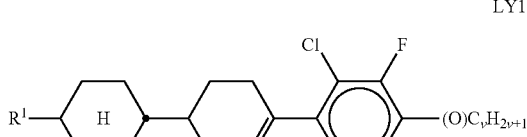
LY11

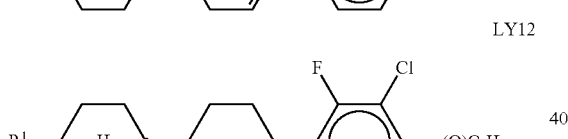
LY12

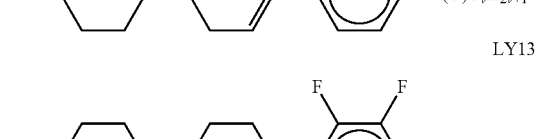
LY13

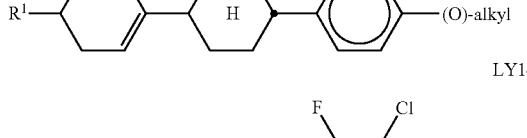
LY14

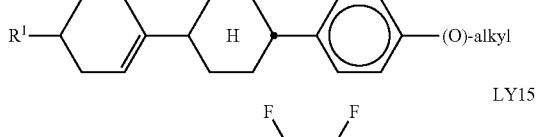
LY15

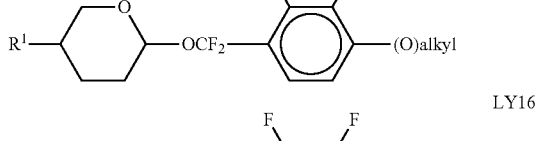
LY16

-continued

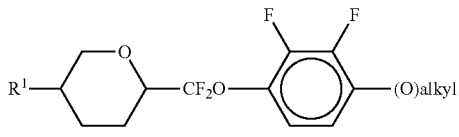
LY17

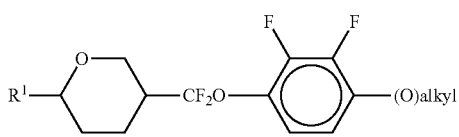
LY18

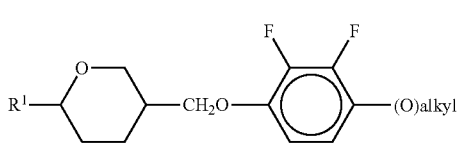
LY19

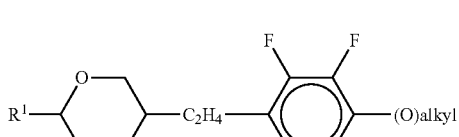
LY20

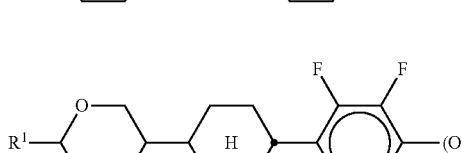
LY21

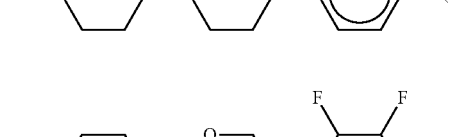
LY22

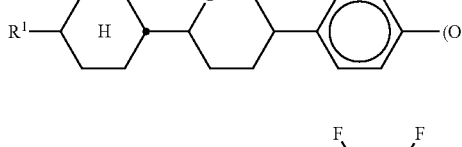
LY23

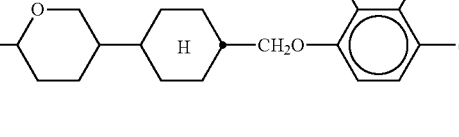
LY24 in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

e) LC medium, which additionally comprises one or more compounds, selected from the group consisting of the following formulae:

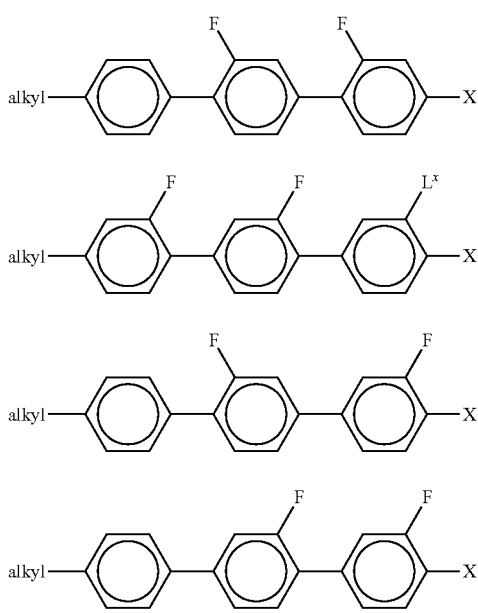
in which alkyl denotes $C_{1-6}$-alkyl, $L^x$ denotes H or F, and X denotes F, Cl, $OCF_3$, $OCHF_2$ or $OCH{=}CF_2$. Particular preference is given to compounds of the formula G1 in which X denotes F.
f) LC medium, which additionally comprises one or more compounds, selected from the group consisting of the following formulae:
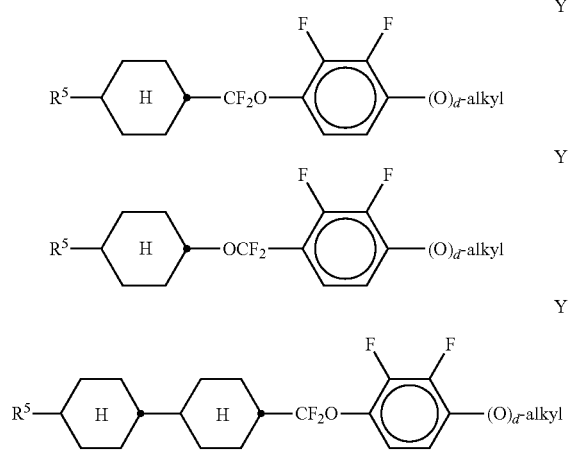
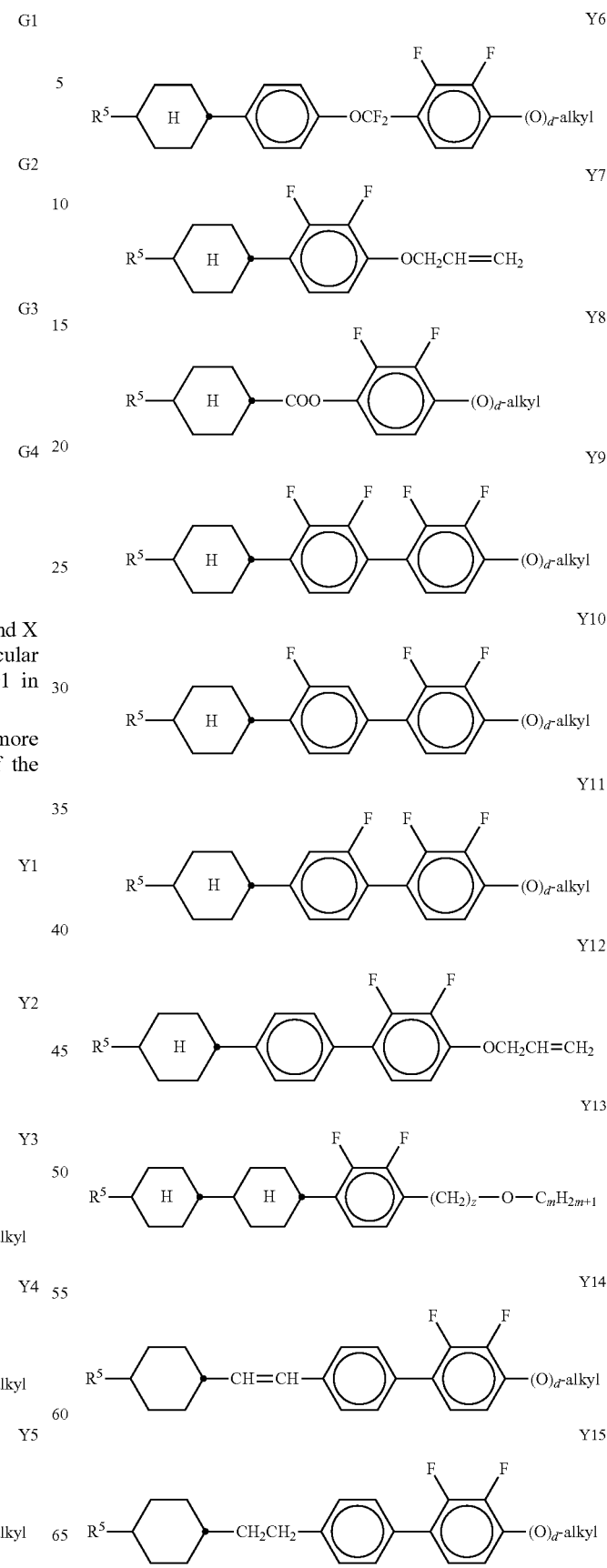

Y16

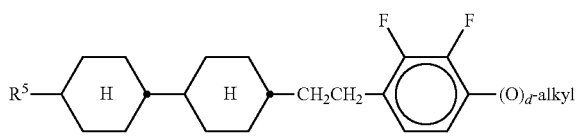

in which R⁵ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

g) LC medium, which additionally comprises one or more biphenyl compounds, selected from the group consisting of the following formulae:

B1

B2

B3

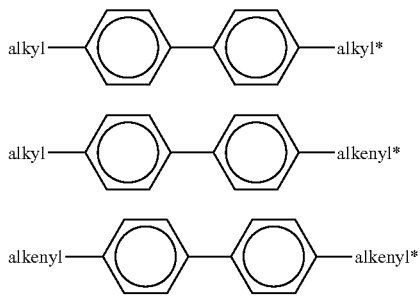

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote CH₂=CH—, CH₂=CHCH₂CH₂—, CH₃—CH=CH—, CH₃—CH₂—CH=CH—, CH₃—(CH₂)₂—CH=CH—, CH₃—(CH₂)₃—CH=CH— or CH₃—CH=CH—(CH₂)₂—.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

B1a

B2a

B2b

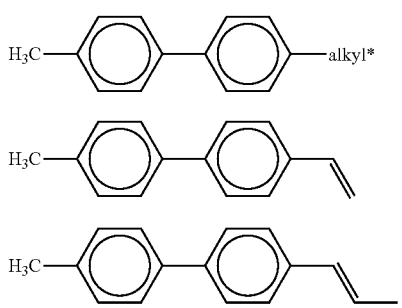

B2c

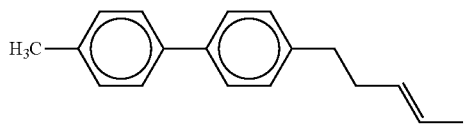

in which alkyl* denotes an alkyl radical having 1-6 C atoms. The medium according to the invention particularly preferably comprises one or more compounds of the formulae B1a and/or B2c.

h) LC medium, which additionally comprises one or more terphenyl, compounds of the following formula:

T

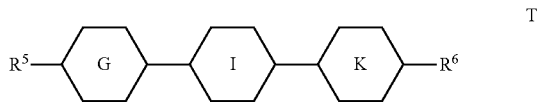

in which $R^5$ and $R^6$ each, independently of one another, have one of the meanings indicated above, and

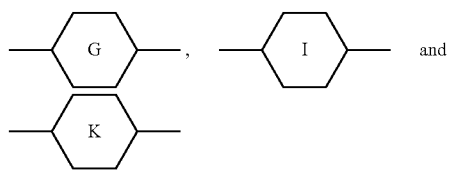

each, independently of one another, denote

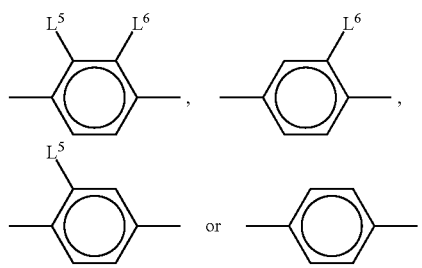

in which $L^5$ denotes F or Cl, preferably F, and $L^6$ denotes F, Cl, OCF₃, CF₃, CH₃, CH₂F or CHF₂, preferably F.

The compounds of the formula T are preferably selected from the group consisting of the following sub-formulae:

T1

T2

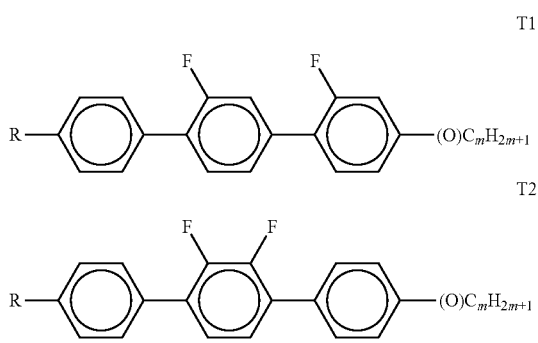

T3
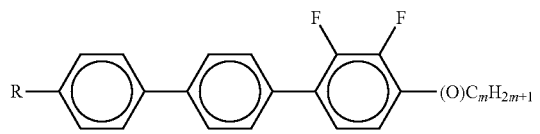
T4
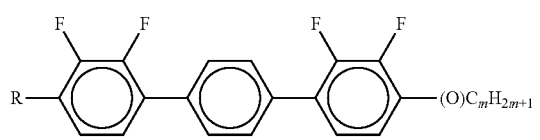
T5
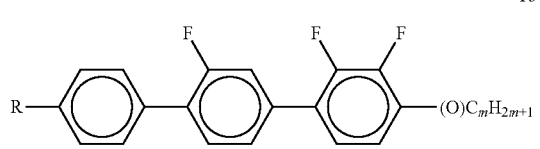
T6
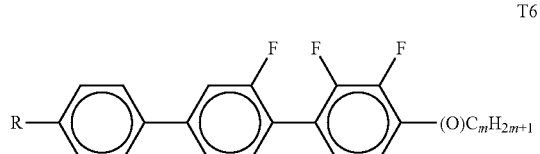
T7
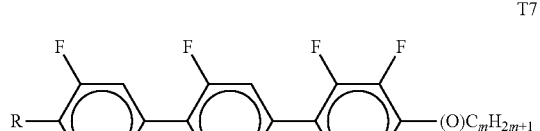
T8
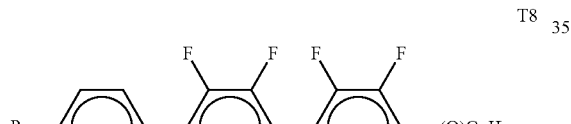
T9
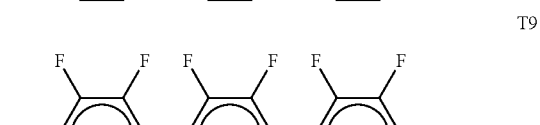
T10
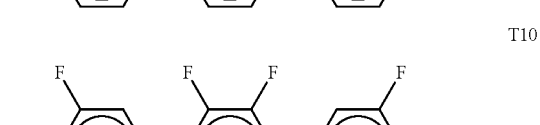
T11
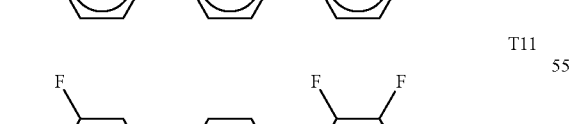
T12
T13
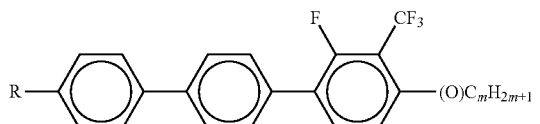
T14
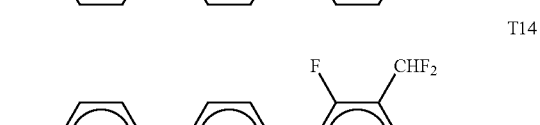
T15
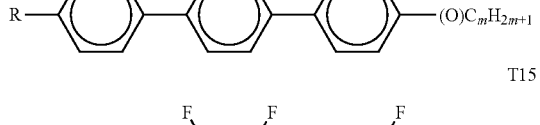
T16
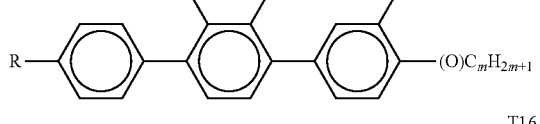
T17
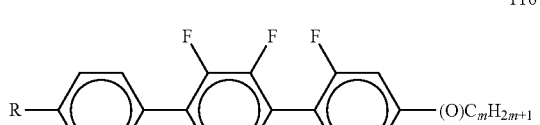
T18
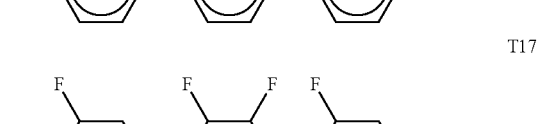
T19
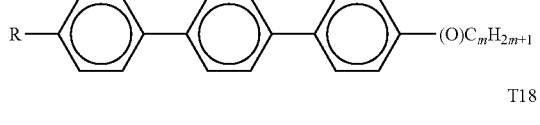
T20
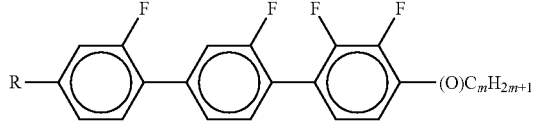
T21
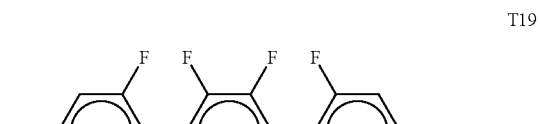
T22
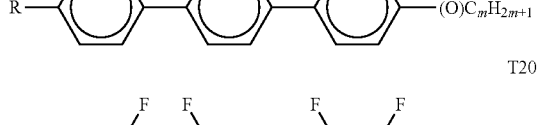

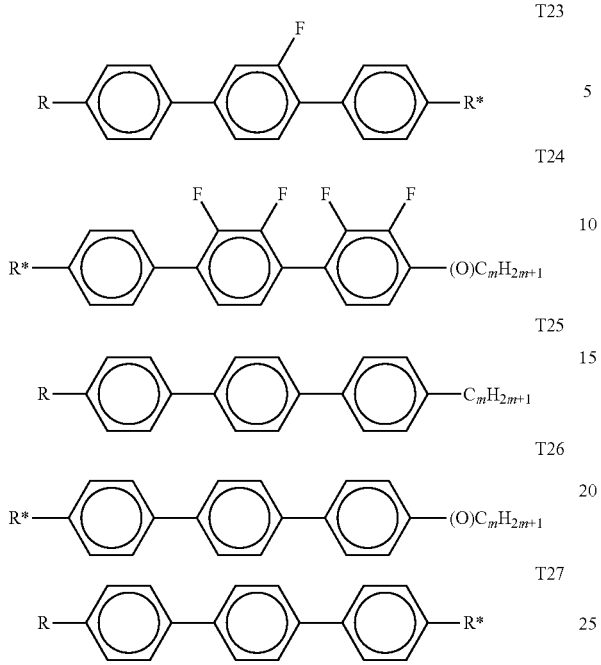

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be ≥0.1. Preferred mixtures comprise 2-20% by weight of one or more terphenyl compounds of the formula T, preferably selected from the group of compounds T1 to T22.

i) LC medium, which additionally comprises one or more compounds, selected from the group consisting of the following formulae:

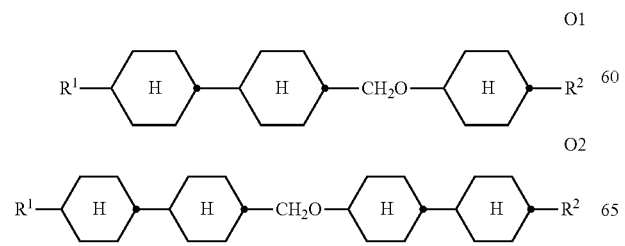

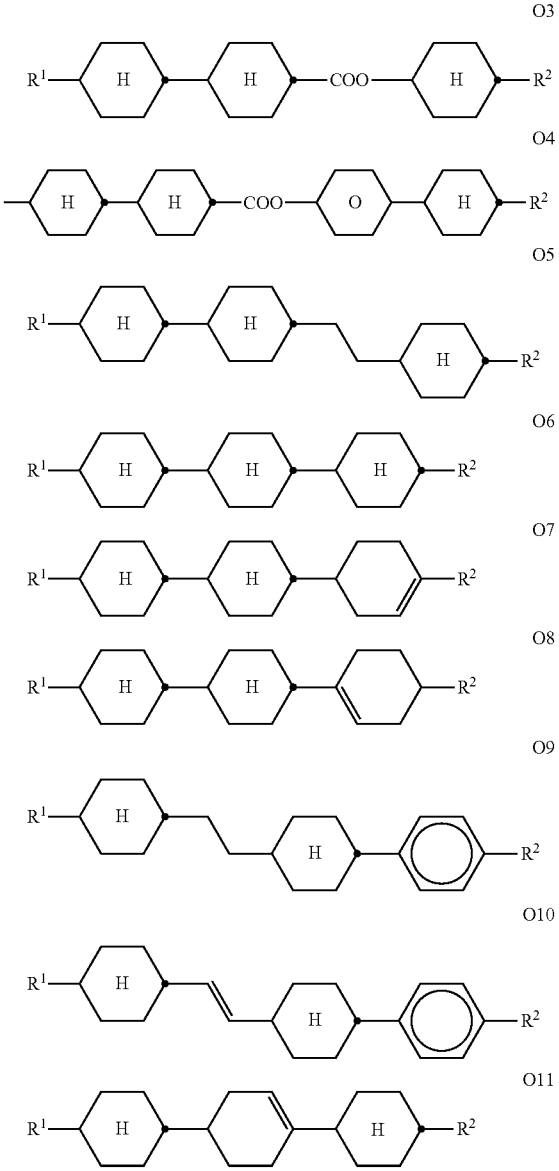

in which R$^1$ and R$^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

k) LC medium, which additionally comprises one or more compounds of the following formula:

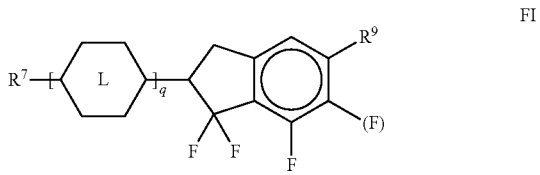

in which

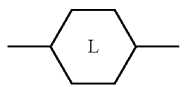

donates

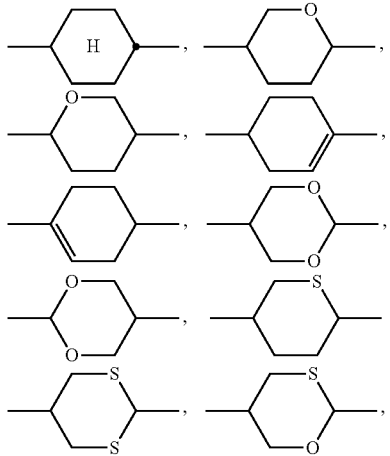

R⁹ denotes H, CH₃, C₂H₅ or n-C₃H₇, (F) denotes an optional fluorine substituent, and q denotes 1, 2 or 3, and R⁷ has one of the meanings indicated for R¹, preferably in amounts of >3% by weight, in particular ≥5% by weight and very particularly preferably 5-30% by weight.

Particularly preferred compounds of the formula FI are selected from the group consisting of the following sub-formulae:

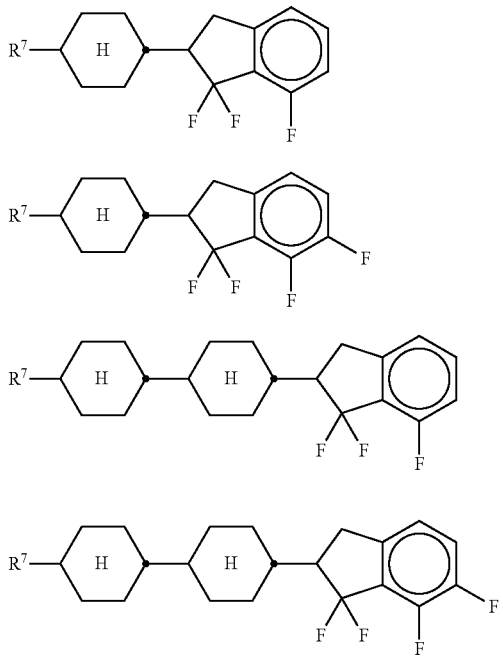

FI1

FI2

FI3

FI4

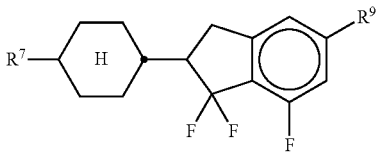

FI5

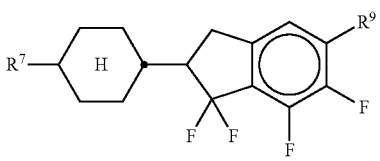

FI6

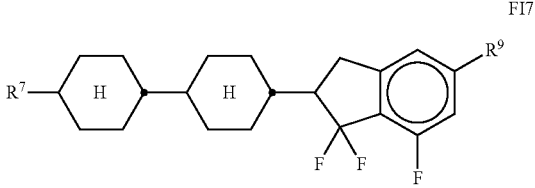

FI7

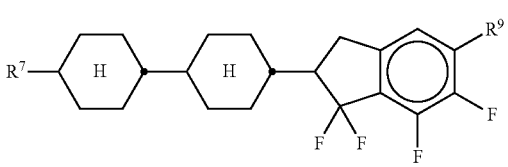

FI8 in which R⁷ preferably denotes straight-chain alkyl, and R⁹ denotes CH₃, C₂H₅ or n-C₃H₇. Particular preference is given to the compounds of the formulae FI1, FI2 and FI3.

l) LC medium, which additionally comprises one or more compounds, selected from the group consisting of the following formulae:

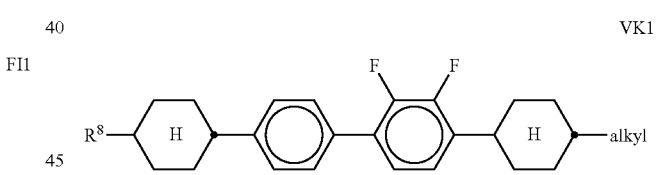

VK1

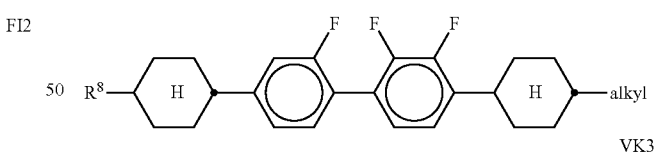

VK2

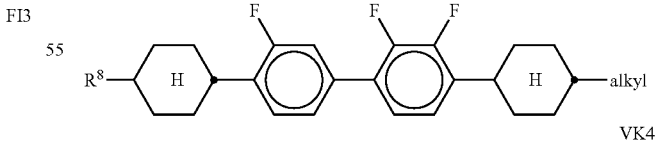

VK3

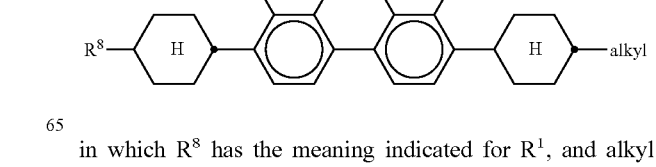

VK4 in which R⁸ has the meaning indicated for R¹, and alkyl denotes a straight-chain alkyl radical having 1-6 C atoms.

m) LC medium, which additionally comprises one or more compounds which contain a tetrahydronaphthyl or naphthyl unit, such as, for example, the compounds selected from the group consisting of the following formulae:

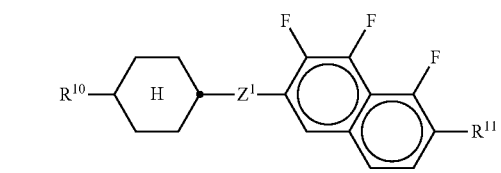
N1

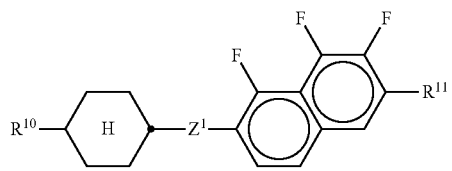
N2

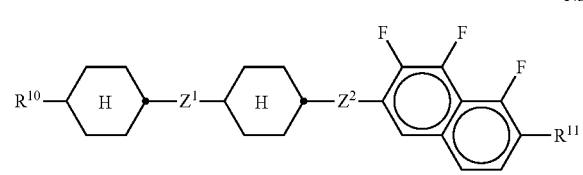
N3

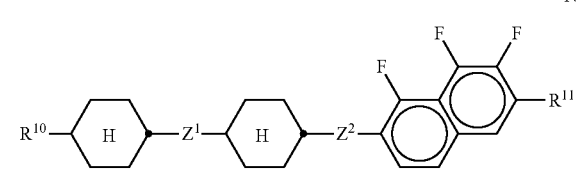
N4

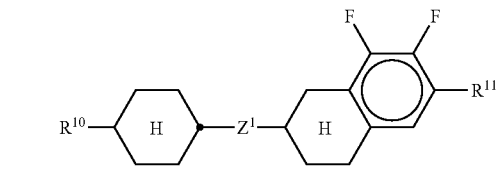
N5

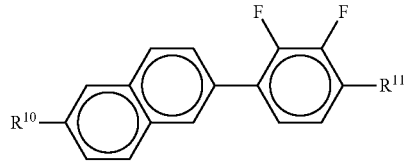
N6

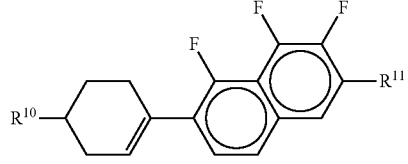
N7

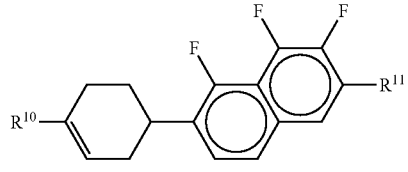
N8

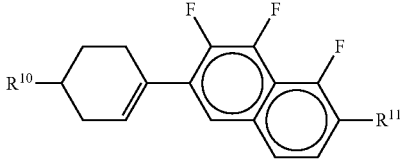
N9

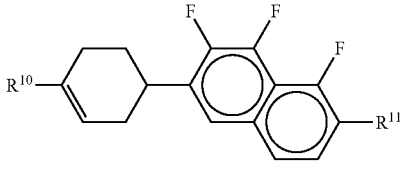
N10 in which $R^{10}$ and $R^{11}$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms, and $R^{10}$ and $R^{11}$ preferably denote straight-chain alkyl or alkoxy having 1 to 6 C atoms or straight-chain alkenyl having 2 to 6 C atoms, and $Z^1$ and $Z^2$ each, independently of one another, denote —C$_2$H$_4$—, —CH=CH—, —(CH$_2$)$_4$—, —(CH$_2$)$_3$O—, —O(CH$_2$)$_3$—, —CH=CH—CH$_2$CH$_2$—, —CH$_2$CH$_2$CH=CH—, —CH$_2$O—, —OCH$_2$—, —CO—O—, —O—CO—, —C$_2$F$_4$—, —CF=CF—, —CF=CH—, —CH=CF—, —CH$_2$— or a single bond.

n) LC medium, which additionally comprises one or more difluoro-dibenzochromans and/or chromans of the following formulae:

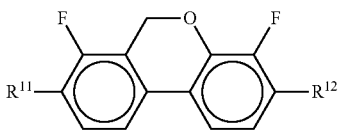
BC

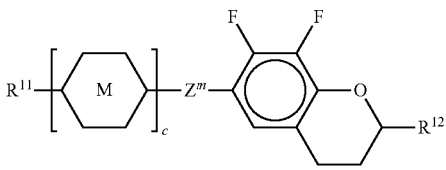
CR

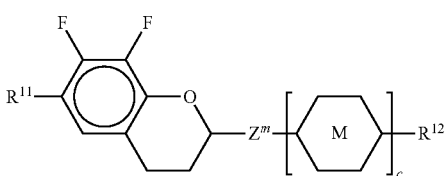
RC in which $R^{11}$ and $R^{12}$ each, independently of one another, have one of the meanings indicated above for $R^{11}$, ring M is trans-1,4-cyclohexylene or 1,4-phenylene, $Z^m$ —C$_2$H$_4$—, —CH$_2$O—, —OCH$_2$—, —CO—O— or —O—CO—, c is 0, 1 or 2, preferably in amounts of 3 to 20% by weight, in particular in amounts of 3 to 15% by weight.

Particularly preferred compounds of the formulae BC, CR and RC are selected from the group consisting of the following sub-formulae:
BC1
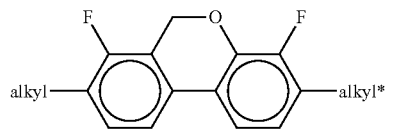
BC2
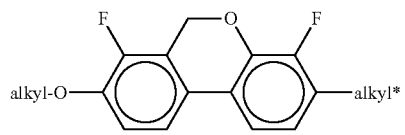
BC3
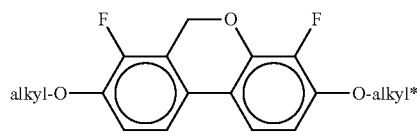
BC4
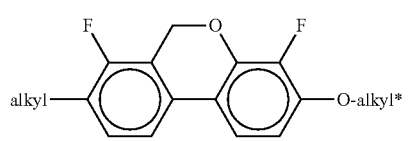
BC5
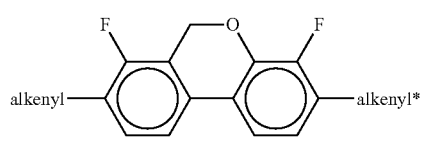
BC6
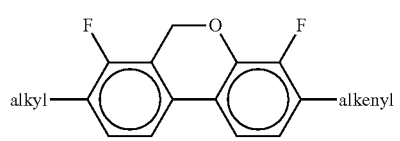
BC7
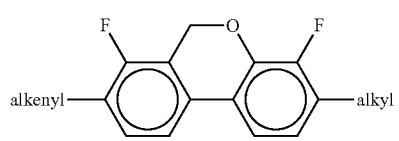
CR1
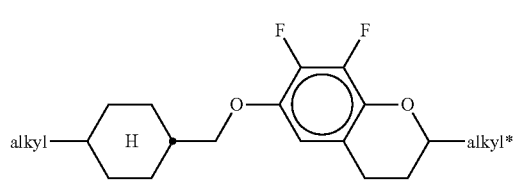
CR2
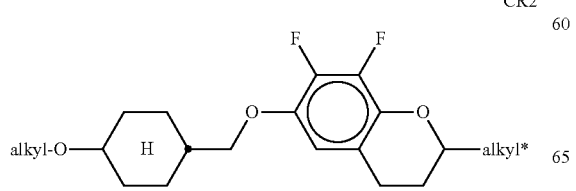
CR3
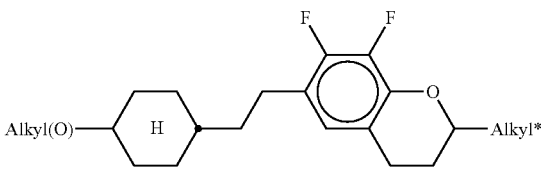
CR4
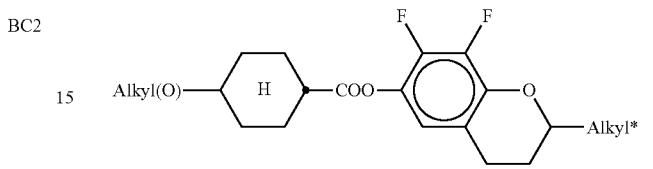
CR5
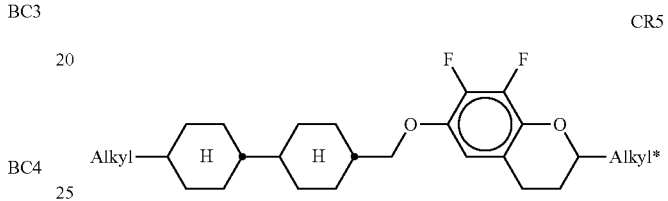
CR6
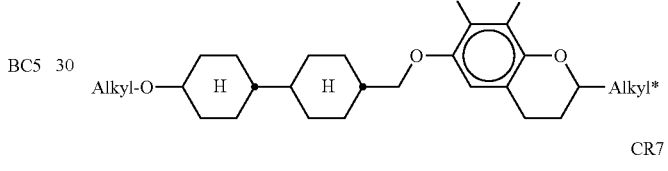
CR7
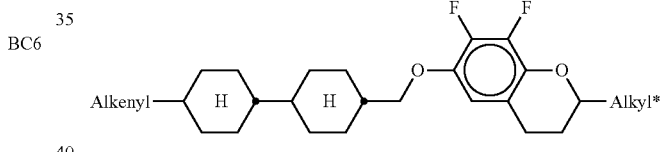
CR8
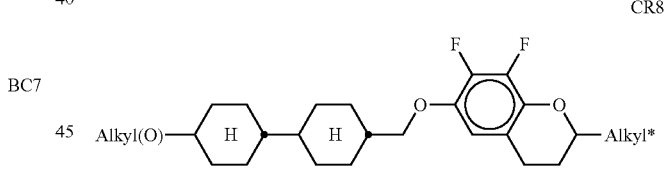
CR9
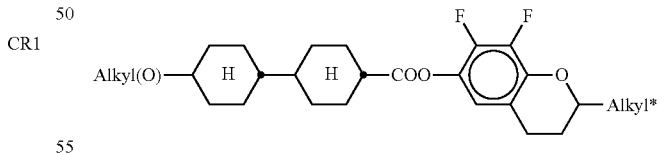
RC1
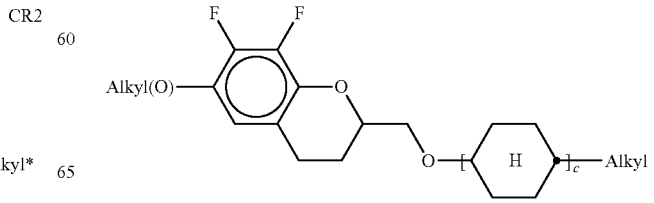

-continued

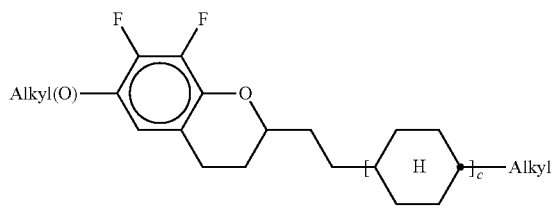
RC2

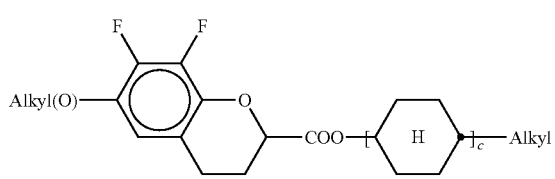
RC3 in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very particular preference is given to mixtures comprising one, two or three compounds of the formula BC-2.

o) LC medium, which additionally comprises one or more fluorinated phenanthrenes and/or dibenzofurans of the following formulae:

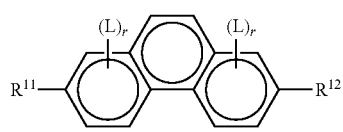
PH

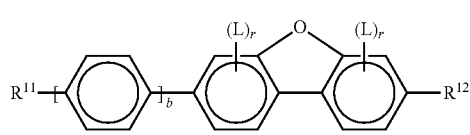
BF in which $R^{11}$ and $R^{12}$ each, independently of one another, have one of the meanings indicated above for $R^{11}$, b denotes 0 or 1, L denotes F, and r denotes 1, 2 or 3.

Particularly preferred compounds of the formulae PH and BF are selected from the group consisting of the following sub-formulae:

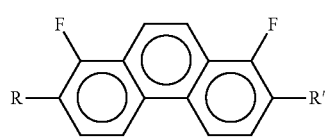
PH1

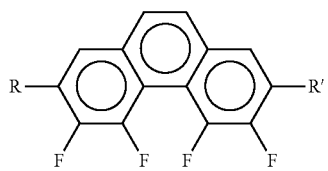
PH2

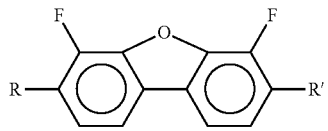
BF1

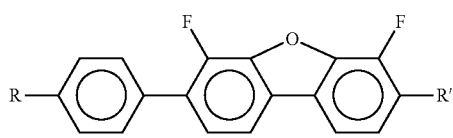
BF2 in which R and $R^{11}$ each, independently of one another, denote a straight-chain alkyl or alkoxy radical having 1-7 C atoms.

p) LC medium, which additionally comprises one or more monocyclic compounds of the following formula

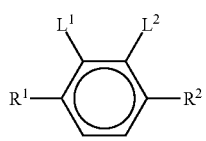
Y wherein
$R^1$ and $R^2$ each, independently of one another, denote alkyl having 1 to 12 C atoms, where, in addition, one or two non-adjacent $CH_2$ groups may be replaced by $-O-$, $-CH=CH-$, $-CO-$, $-OCO-$ or $-COO-$ in such a way that O atoms are not linked directly to one another, preferably alkyl or alkoxy having 1 to 6 C atoms,
$L^1$ and $L^2$ each, independently of one another, denote F, Cl, $OCF_3$, $CF_3$, $CH_3$, $CH_2F$, $CHF_2$.

In a preferred embodiment, both $L^1$ and $L^2$ denote F or one of $L^1$ and $L^2$ denotes F and the other denotes Cl, The compounds of the formula Y are preferably selected from the group consisting of the following sub-formulae:

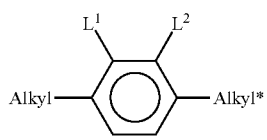
Y1

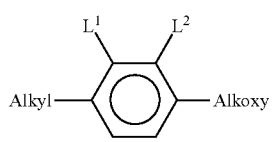
Y2

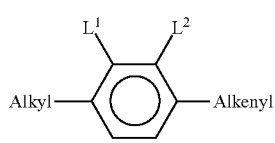
Y3

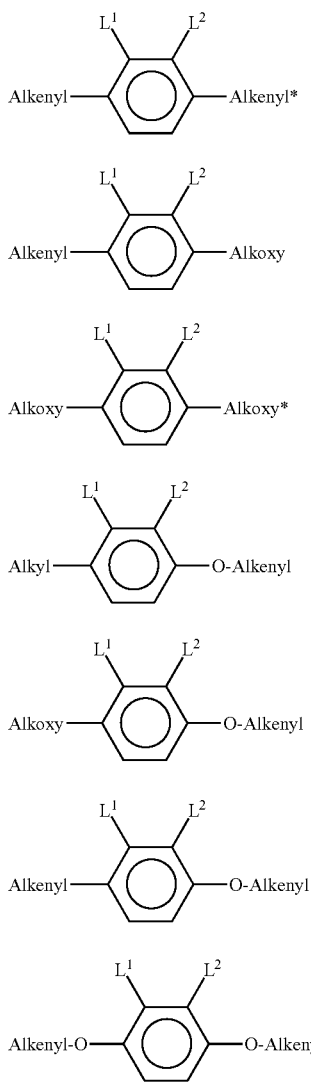

in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred compounds of the formula Y are selected from the group consisting of the following sub-formulae:

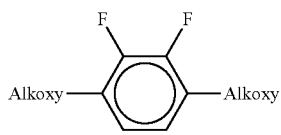

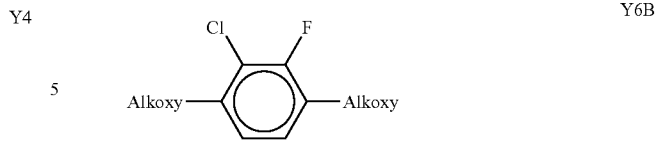

wherein Alkoxy preferably denotes straight-chain alkoxy with 3, 4, or 5 C atoms.

q) LC medium, which, apart from the stabilisers according to the invention, in particular of the formula I or sub-formulae thereof and the comonomers, comprises no compounds which contain a terminal vinyloxy group ($-O-CH=CH_2$).

r) LC medium, which comprises 1 to 5, preferably 1, 2 or 3, stabilisers, preferably selected from stabilisers according to the invention, in particular of the formula I or sub-formulae thereof.

s) LC medium in which the proportion of stabilisers, in particular of the formula I or sub-formulae thereof, in the mixture as a whole is 1 to 1500 ppm, preferably 100 to 1000 ppm.

t) LC medium, which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.

u) LC medium, which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.

v) LC medium, which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

w) LC medium in which the proportion of compounds of the formulae CY, PY and ZK in the mixture as a whole is greater than 70%, preferably greater than 80%.

x) LC medium in which the LC host mixture contains one or more compounds containing an alkenyl group, preferably selected from the group consisting of formula CY, PY and LY, wherein one or both of $R^1$ and $R^2$ denote straight-chain alkenyl having 2-6 C atoms, formula ZK and DK, wherein one or both of $R^3$ and $R^4$ or one or both of $R^5$ and $R^6$ denote straight-chain alkenyl having 2-6 C atoms, and formula B2 and B3, very preferably selected from formulae CY15, CY16, CY24, CY32, PY15, PY16, ZK3, ZK4, DK3, DK6, B2 and B3, most preferably selected from formulae ZK3, ZK4, B2 and B3. The concentration of these compounds in the LC host mixture is preferably from 2 to 70%, very preferably from 3 to 55%.

y) LC medium, which contains one or more, preferably 1 to 5, compounds selected of formula PY1-PY8, very preferably of formula PY2. The proportion of these compounds in the mixture as a whole is preferably 1 to 30%, particularly preferably 2 to 20%. The content of these individual compounds is preferably in each case 1 to 20%.

z) LC medium, which contains one or more, preferably 1, 2 or 3, compounds of formula T2. The content of these compounds in the mixture as a whole is preferably 1 to 20%.

In another preferred embodiment of the present invention, the LC medium contains an LC host mixture with positive dielectric anisotropy. Preferred embodiments of such an LC medium, and the corresponding LC host mixture, are those of sections aa)-mmm) below:

aa) LC-medium, characterised in that it comprises one or more compounds selected from the group of compounds of the formulae II and III

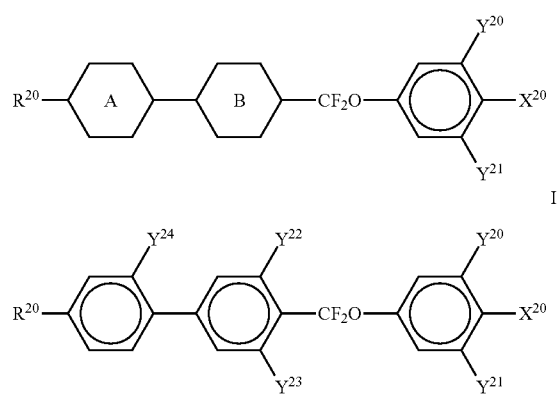

wherein $R^{20}$ each, identically or differently, denote a halogenated or unsubstituted alkyl or alkoxy radical having 1 to 15 C atoms, where, in addition, one or more $CH_2$ groups in these radicals may each be replaced, independently of one another,

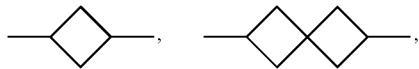

by $-C\equiv C-$, $-CF_2O-$, $-CH=CH-$, $-O-$, $-CO-O-$ or $-O-CO-$ in such a way that O atoms are not linked directly to one another, $X^{20}$ each, identically or differently, denote F, Cl, CN, $SF_5$, SCN, NCS, a halogenated alkyl radical, a halogenated alkenyl radical, a halogenated alkoxy radical or a halogenated alkenyloxy radical, each having up to 6 C atoms, and $y^{20-24}$ each, identically or differently, denote H or F;

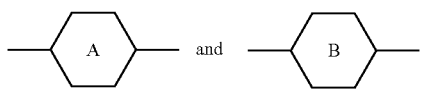

each, independently of one another, denote

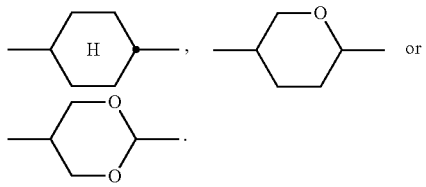

The compounds of the formula II are preferably selected from the following formulae:

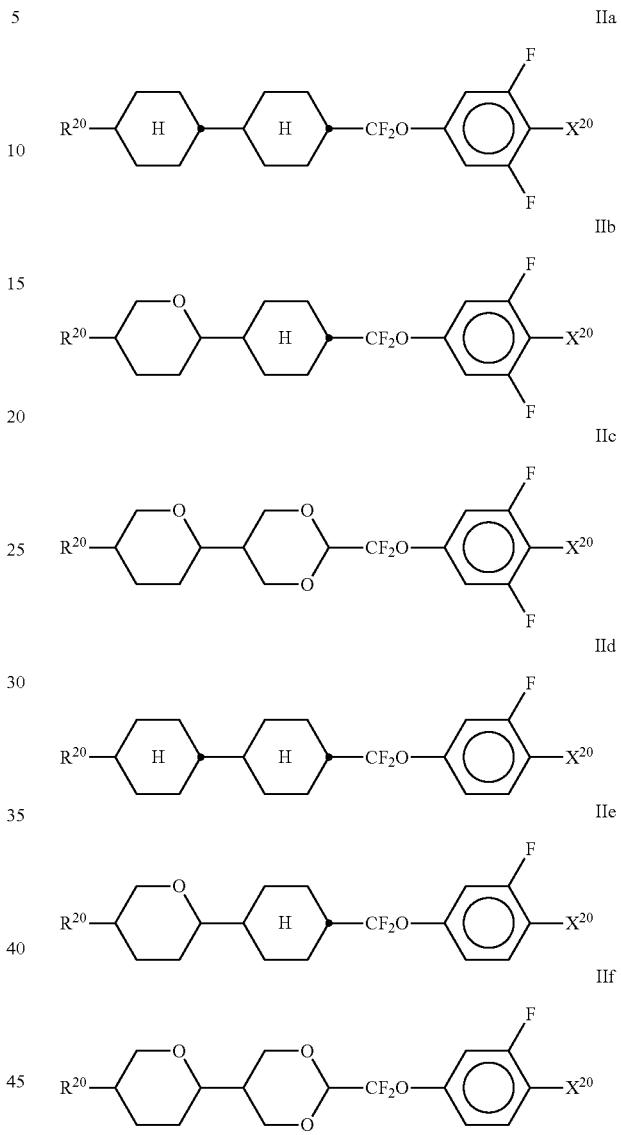

wherein $R^{20}$ and $X^{20}$ have the meanings indicated above. $R^{20}$ preferably denotes alkyl having 1 to 6 C atoms. $X^{20}$ preferably denotes F. Particular preference is given to compounds of the formulae IIa and IIb, in particular compounds of the formulae IIa and IIb wherein X denotes F.

The compounds of the formula III are preferably selected from the following formulae:

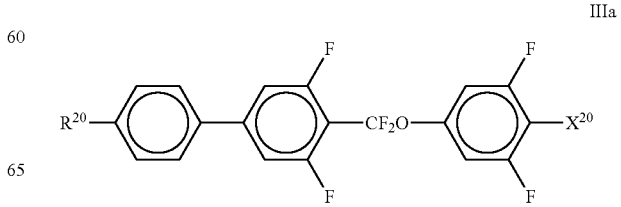

IIIb

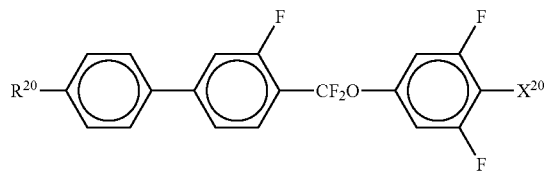

IIIc

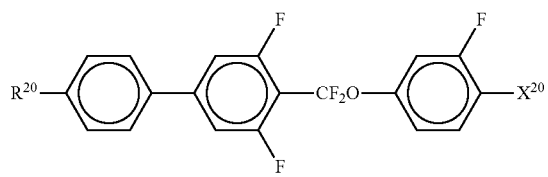

IIId

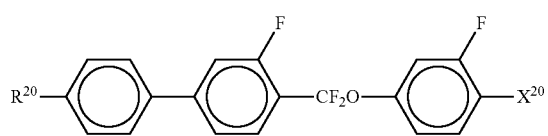

IIIe

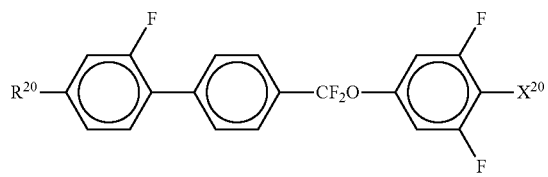

wherein R$^{20}$ and X$^{20}$ have the meanings indicated above.

R$^{20}$ preferably denotes alkyl having 1 to 6 C atoms. X$^{20}$ preferably denotes F. Particular preference is given to compounds of the formulae IIIa and IIIe, in particular compounds of the formula IIIa;

bb) LC-medium additionally comprising one or more compounds selected from the following formulae:

IV

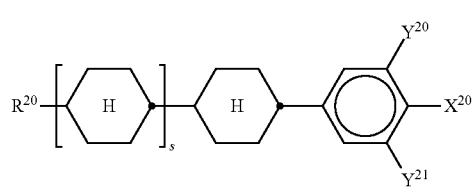

V

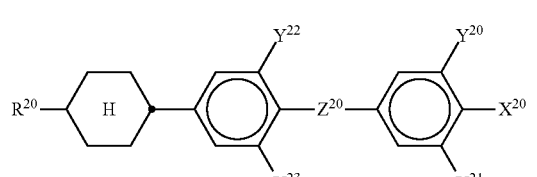

VI

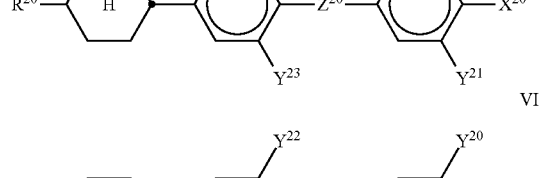

VII

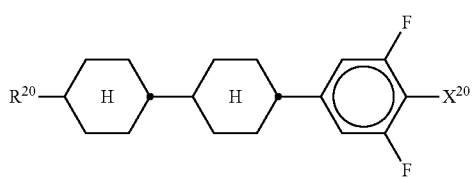

VIII

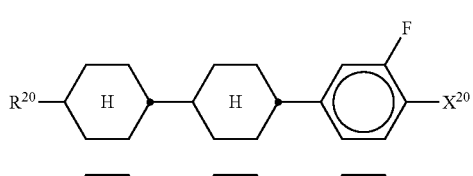

wherein
R$^{20}$, X$^{20}$ and y$^{20\text{-}23}$ have the meanings indicated above, and
Z$^{20}$ denotes —C$_2$H$_4$—, —(CH$_2$)$_4$—, —CH=CH—, —CF=CF—, —C$_2$F$_4$—, —CH$_2$CF$_2$—, —CF$_2$CH$_2$—, —CH$_2$O—, —OCH$_2$—, —COO— or —OCF$_2$—, in formulae V and VI also a single bond, in formulae V and VIII also —CF$_2$O—,
r denotes 0 or 1, and
s denotes 0 or 1;

The compounds of the formula IV are preferably selected from the following formulae:

IVa

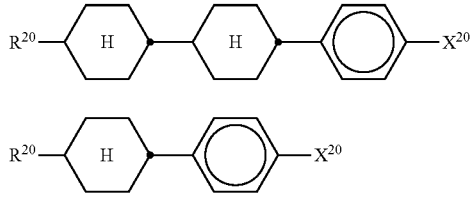

IVb

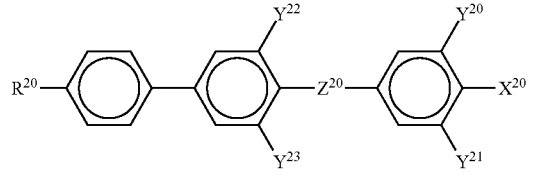

IVc

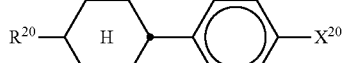

IVd wherein R$^{20}$ and X$^{20}$ have the meanings indicated above.

R$^{20}$ preferably denotes alkyl having 1 to 6 C atoms. X$^{20}$ preferably denotes F or OCF$_3$, furthermore OCF=CF$_2$ or Cl;

The compounds of the formula V are preferably selected from the following formulae:

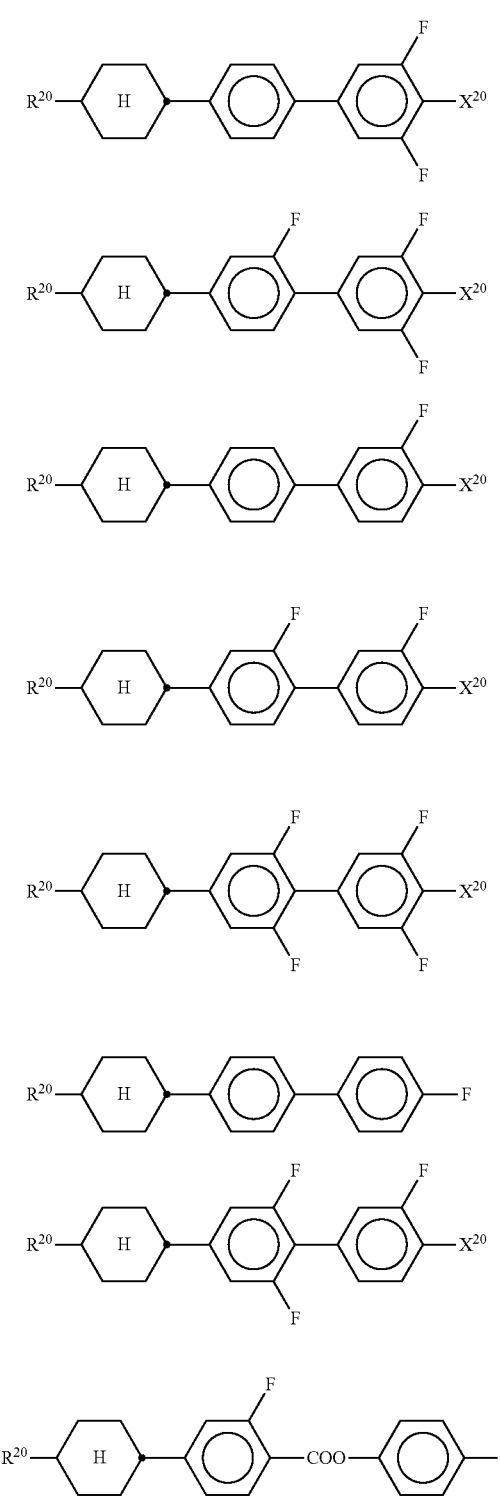

wherein R²⁰ and X²⁰ have the meanings indicated above.

R²⁰ preferably denotes alkyl having 1 to 6 C atoms. X²⁰ preferably denotes F and OCF₃, furthermore OCHF₂, CF₃, OCF=CF₂ and OCH=CF₂;

The compounds of the formula VI are preferably selected from the following formulae:

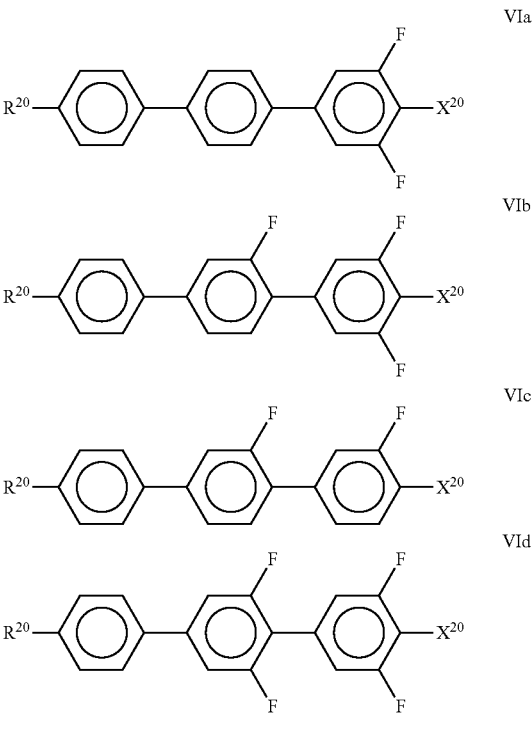

wherein R²⁰ and X²⁰ have the meanings indicated above.

R²⁰ preferably denotes alkyl having 1 to 6 C atoms. X²⁰ preferably denotes F, furthermore OCF₃, CF₃, CF=CF₂, OCHF₂ and OCH=CF₂;

The compounds of the formula VII are preferably selected from the following formulae:

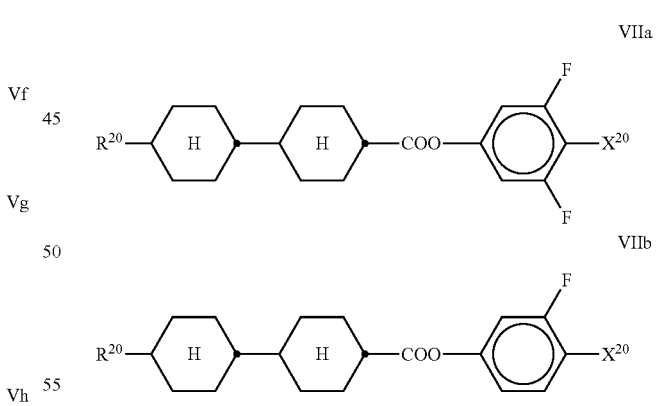

wherein R²⁰ and X²⁰ have the meanings indicated above.

R²⁰ preferably denotes alkyl having 1 to 6 C atoms. X²⁰ preferably denotes F, furthermore OCF₃, OCHF₂ and OCH=CF₂.

cc) The medium additionally comprises one or more compounds selected from the formulae ZK1 to ZK10 given above. Especially preferred are compounds of formula ZK1 and ZK3. Particularly preferred compounds of formula ZK are selected from the sub-formulae ZK1a, ZK1b, ZK1c, ZK3a, ZK3b, ZK3c and ZK3d.

dd) The medium additionally comprises one or more compounds selected from the formulae DK1 to DK12 given above. Especially preferred compounds are DK3.

ee) The medium additionally comprises one or more compounds selected from the following formulae:

IX

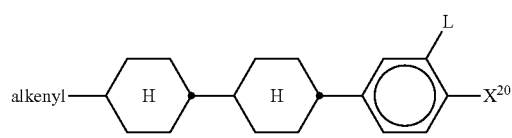

wherein $X^{20}$ has the meanings indicated above, and
L denotes H or F,
"alkenyl" denotes $C_{2-6}$-alkenyl.

ff) The compounds of the formulae DK-3a and IX are preferably selected from the following formulae:

DK3a

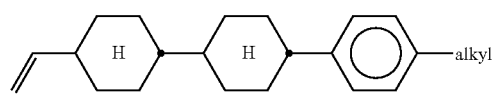

IXa

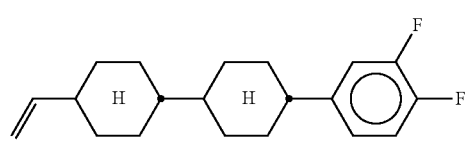

wherein "alkyl" denotes $C_{1-6}$-alkyl, preferably n-$C_3H_7$, n-$C_4H_9$ or n-$C_5H_{11}$, in particular n-$C_3H_7$.

gg) The medium additionally comprises one or more compounds selected from the formulae B1, B2 and B3 given above, preferably from the formula B2. The compounds of the formulae B1 to B3 are particularly preferably selected from the formulae B1a, B2a, B2b and B2c.

hh) The medium additionally comprises one or more compounds selected from the following formula:

X

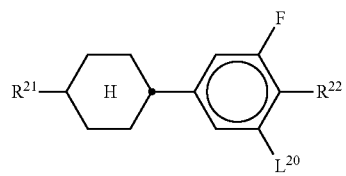

wherein $L^{20}$ denotes H or F, and $R^{21}$ and $R^{22}$ each, identically or differently, denote n-alkyl, alkoxy, oxaalkyl, fluoroalkyl or alkenyl, each having up to 6 C atoms, and preferably each, identically or differently, denote alkyl having 1 to 6 C atoms.

ii) The medium comprises one or more compounds of the following formulae:

XI

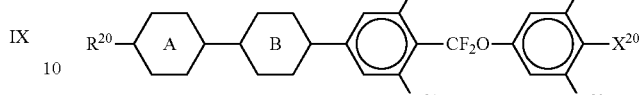

XII

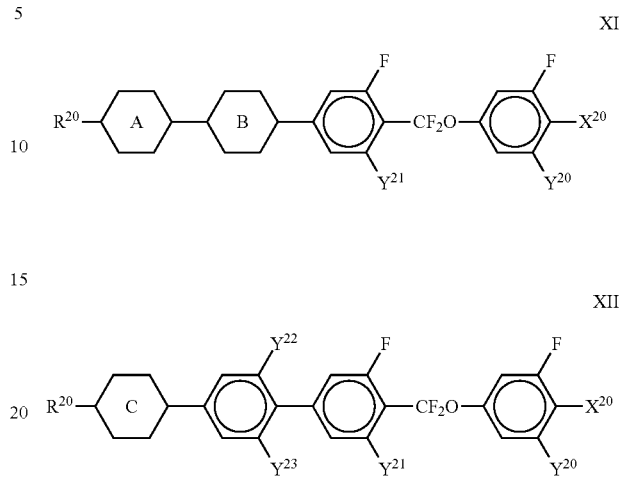

wherein $R^{20}$, $X^{20}$ and $Y^{20-23}$ have the meanings indicated in formula III, and

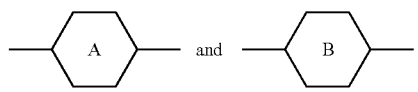

each, independently of one another, denote

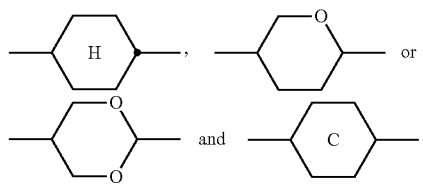

denotes

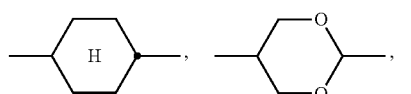

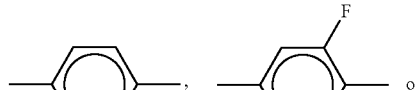

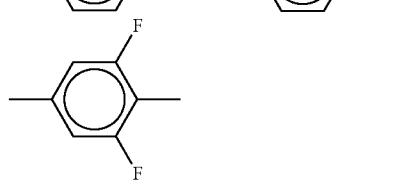

The compounds of the formulae XI and XII are preferably selected from the following formulae:

XIa
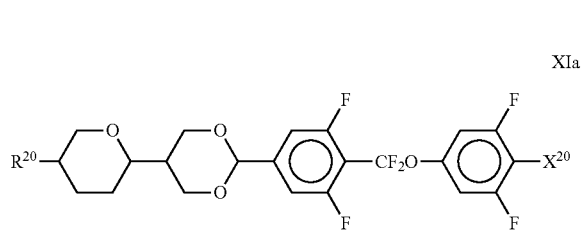

XIb
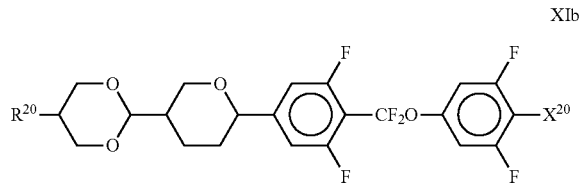

XIc
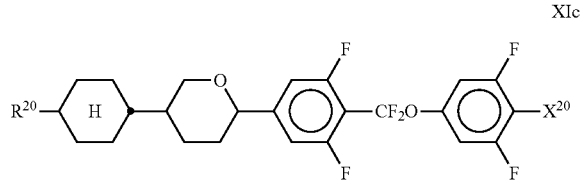

XId
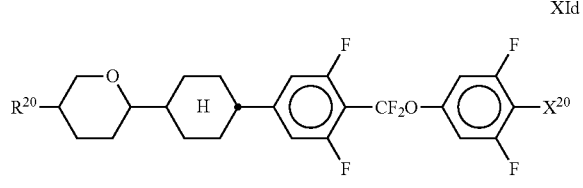

XIe
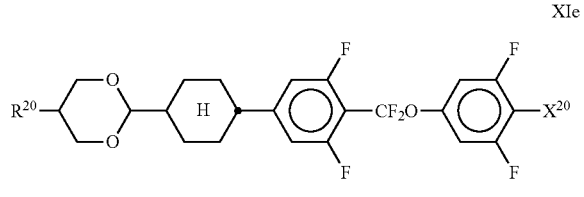

XIf
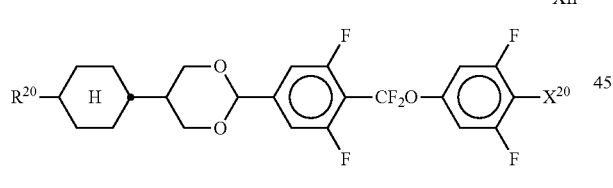

XIIa
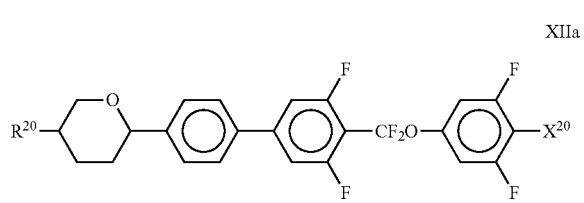

XIIb
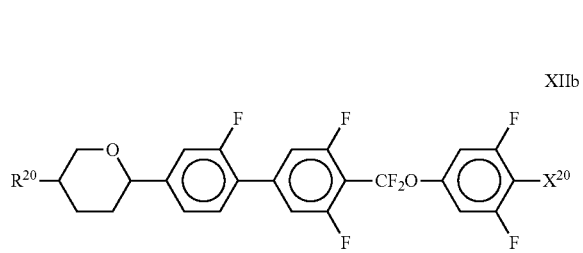

XIIc
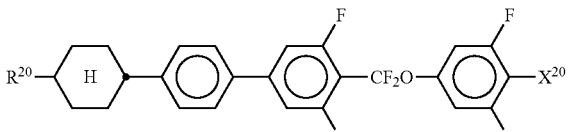

XIId
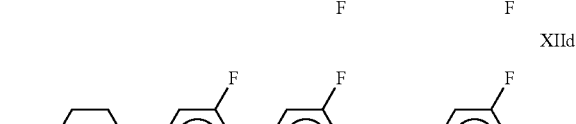

XIIe
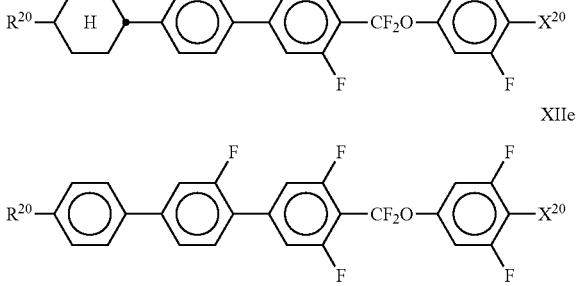

wherein $R^{20}$ and $X^{20}$ have the meaning indicated above and preferably $R^{20}$ denotes alkyl having 1 to 6 C atoms and $X^{20}$ denotes F. The mixture according to the invention particularly preferably comprises one or more compounds of the formula XIIa and/or XIIe.

jj) The medium comprises one or more compounds of formula T given above, preferably selected from the group of compounds of the formulae T21 to T23 and T25 to T27.

Particular preference is given to the compounds of the formulae T21 to T23. Very particular preference is given to the compounds of the formulae

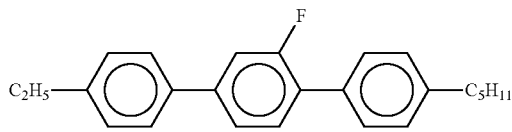

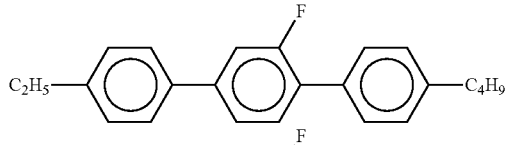

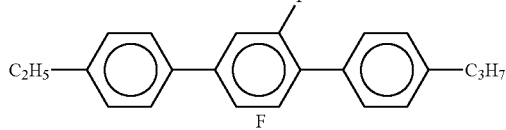

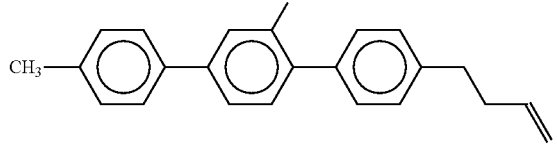

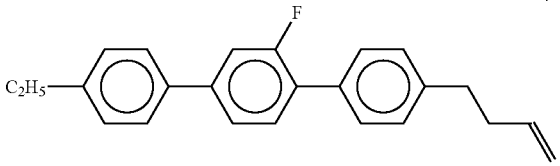

-continued

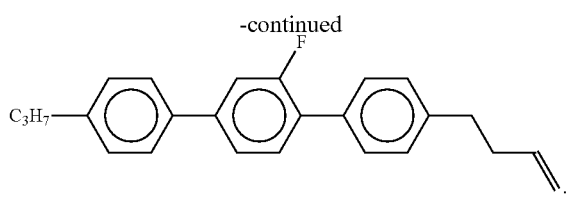

kk) The medium comprises one or more compounds selected from the group of formulae DK9, DK10 and DK11 given above.

ll) The medium additionally comprises one or more compounds selected from the following formulae:

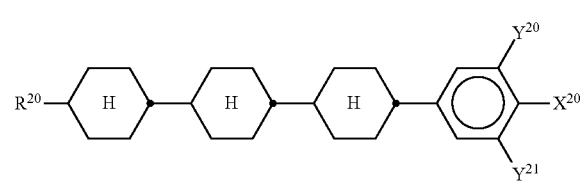

XIII

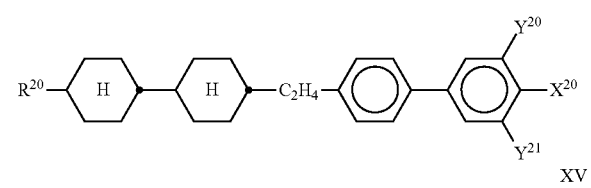

XIV

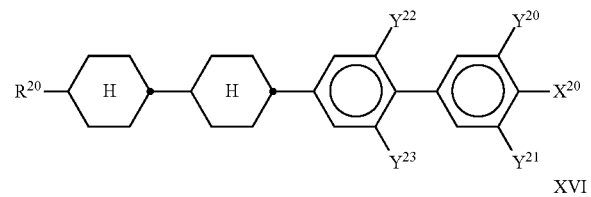

XV

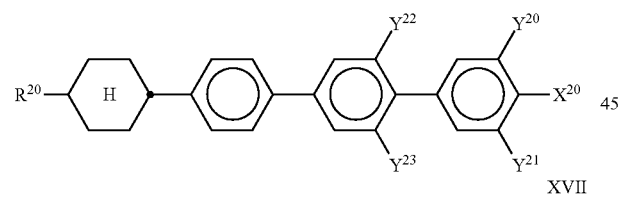

XVI

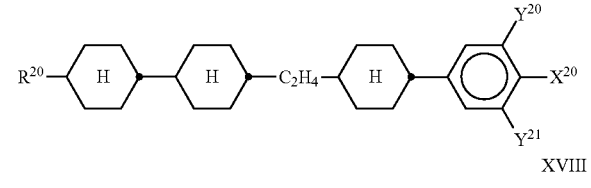

XVII

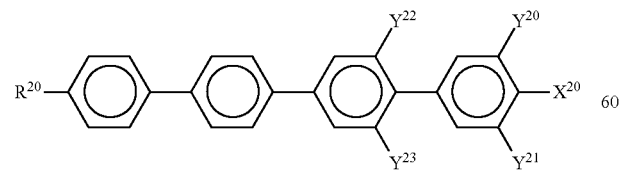

XVIII wherein $R^{20}$ and $X^{20}$ each, independently of one another, have one of the meanings indicated above, and $y^{20\text{-}23}$ each, independently of one another, denote H or F. $X^{20}$ is preferably F, Cl, $CF_3$, $OCF_3$ or $OCHF_2$. $R^{20}$ preferably denotes alkyl, alkoxy, oxaalkyl, fluoroalkyl or alkenyl, each having up to 6 C atoms.

The mixture according to the invention particularly preferably comprises one or more compounds of the formula XVIII-a,

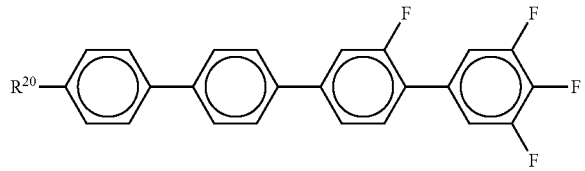

wherein $R^{20}$ has the meanings indicated above. $R^{20}$ preferably denotes straight-chain alkyl, in particular ethyl, n-propyl, n-butyl and n-pentyl and very particularly preferably n-propyl. The compound(s) of the formula XVIII, in particular of the formula XVIII-a, is (are) preferably employed in the mixtures according to the invention in amounts of 0.5-20% by weight, particularly preferably 1-15% by weight.

mm) The medium additionally comprises one or more compounds of the formula XIX,

XIX

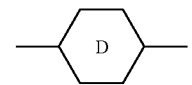

wherein $R^{20}$, $X^{20}$ and $y^{20\text{-}25}$ have the meanings indicated in formula I, s denotes 0 or 1, and

denotes

In the formula XIX, $X^{20}$ may also denote an alkyl radical having 1-6 C atoms or an alkoxy radical having 1-6 C atoms. The alkyl or alkoxy radical is preferably straight-chain.

$R^{20}$ preferably denotes alkyl having 1 to 6 C atoms. $X^{20}$ preferably denotes F;

The compounds of the formula XIX are preferably selected from the following formulae:
XIXa
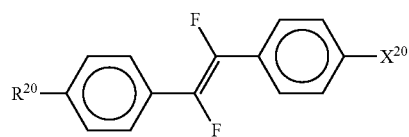
XIXb
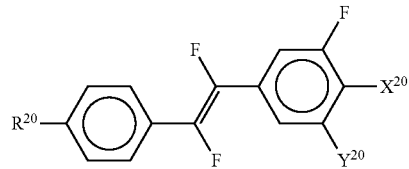
XIXc
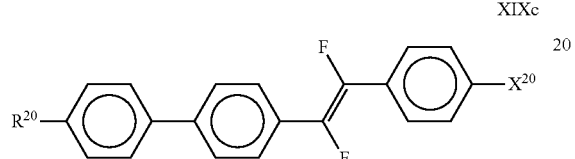
XIXd
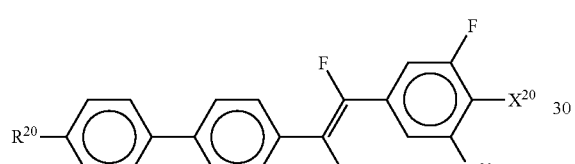
XIXe
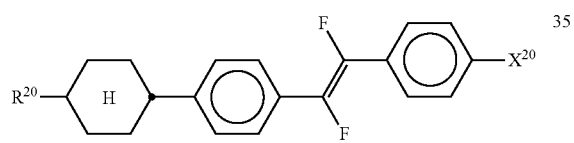
XIXf
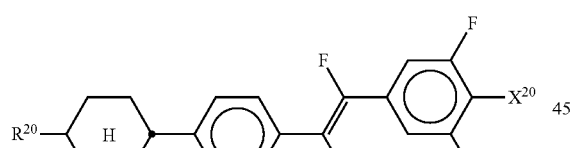
XIXg
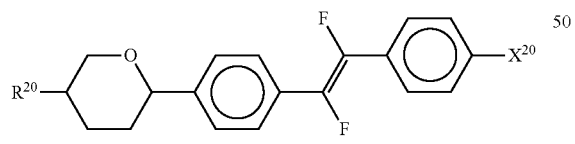
XIXh
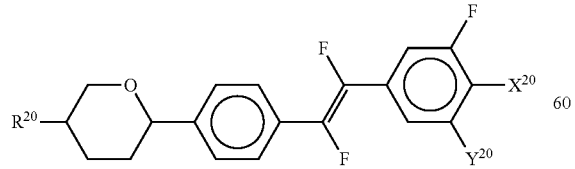
wherein $R^{20}$, $X^{20}$ and $Y^{20}$ have the meanings indicated above. $R^{20}$ preferably denotes alkyl having 1 to 6 C atoms. $X^{20}$ preferably denotes F, and $Y^{20}$ is preferably F;
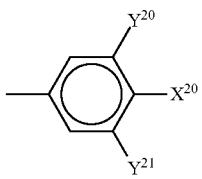
is preferably
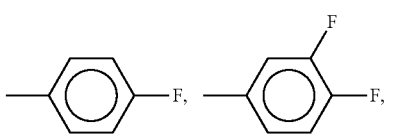
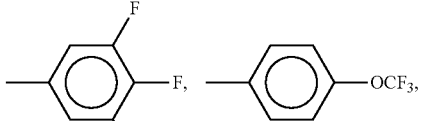
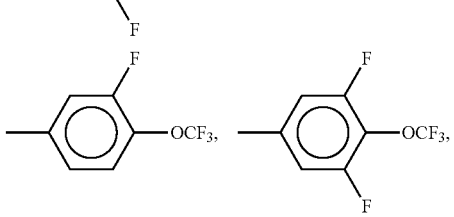
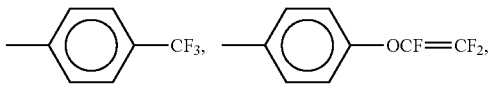
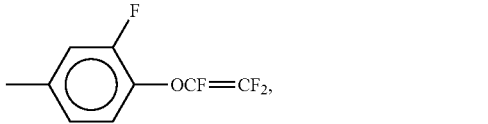
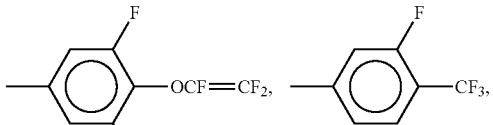
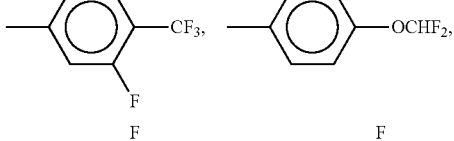
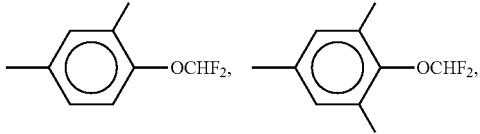
 or

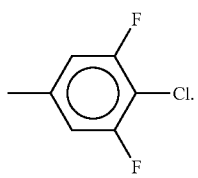

$R^{20}$ is straight-chain alkyl or alkenyl having 2 to 6 C atoms;

nn) The medium comprises one or more compounds of the formulae G1 to G4 given above, preferably selected from G1 and G2 wherein alkyl denotes $C_{1-6}$-alkyl, $L^x$ denotes H and X denotes F or Cl. In G2, X particularly preferably denotes Cl.

oo) The medium comprises one or more compounds of the following formulae:

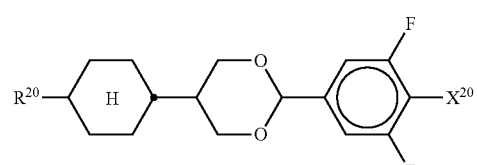

XX

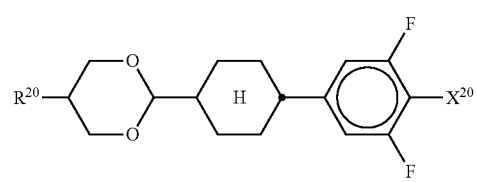

XXI

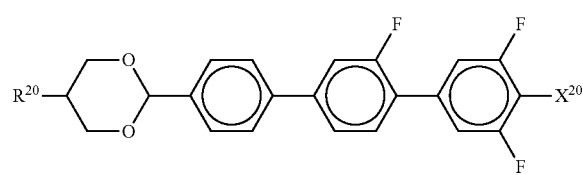

XXII wherein $R^{20}$ and $X^{20}$ have the meanings indicated above. $R^{20}$ preferably denotes alkyl having 1 to 6 C atoms. $X^{20}$ preferably denotes F. The medium according to the invention particularly preferably comprises one or more compounds of the formula XXII wherein $X^{20}$ preferably denotes F. The compound(s) of the formulae XX-XXII is (are) preferably employed in the mixtures according to the invention in amounts of 1-20% by weight, particularly preferably 1-15% by weight. Particularly preferred mixtures comprise one or more compound of the formula XXII.

pp) The medium comprises one or more compounds of the following pyrimidine or pyridine compounds of the formulae

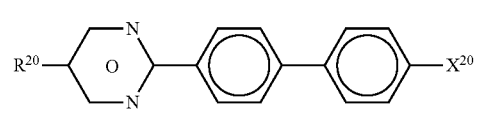

M-1

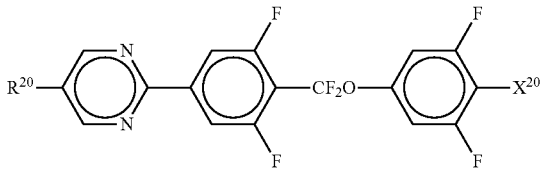

M-2

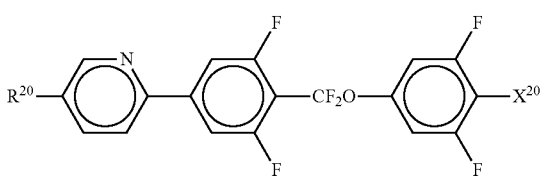

M-3 wherein $R^{20}$ and $X^{20}$ have the meanings indicated above. $R^{20}$ preferably denotes alkyl having 1 to 6 C atoms. $X^{20}$ preferably denotes F. The medium according to the invention particularly preferably comprises one or more compounds of the formula M-1, wherein $X^{20}$ preferably denotes F. The compound(s) of the formulae M-1-M-3 is (are) preferably employed in the mixtures according to the invention in amounts of 1-20% by weight, particularly preferably 1-15% by weight.

Further preferred embodiments are indicated below:

qq) The medium comprises two or more compounds of the formula XII, in particular of the formula XIIe;

rr) The medium comprises 2-30% by weight, preferably 3-20% by weight, particularly preferably 3-15% by weight, of compounds of the formula XII;

ss) Besides the compounds of the formulae XII, the medium comprises further compounds selected from the group of the compounds of the formulae II, III, IX-XIII, XVII and XVIII;

tt) The proportion of compounds of the formulae II, III, IX-XI, XIII, XVII and XVIII in the mixture as a whole is 40 to 95% by weight;

uu) The medium comprises 10-50% by weight, particularly preferably 12-40% by weight, of compounds of the formulae II and/or III;

vv) The medium comprises 20-70% by weight, particularly preferably 25-65% by weight, of compounds of the formulae IX-XIII;

ww) The medium comprises 4-30% by weight, particularly preferably 5-20% by weight, of compounds of the formula XVII;

xx) The medium comprises 1-20% by weight, particularly preferably 2-15% by weight, of compounds of the formula XVIII;

yy) The medium comprises at least two compounds of the formulae

XIIe-1

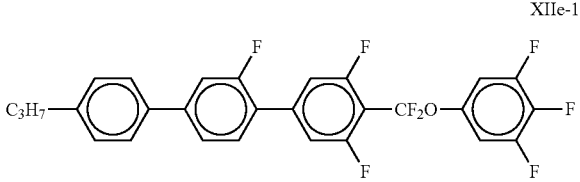

-continued

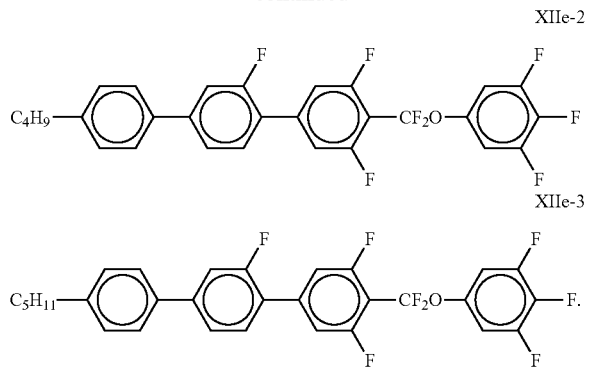

zz) The medium comprises at least two compounds of the formulae

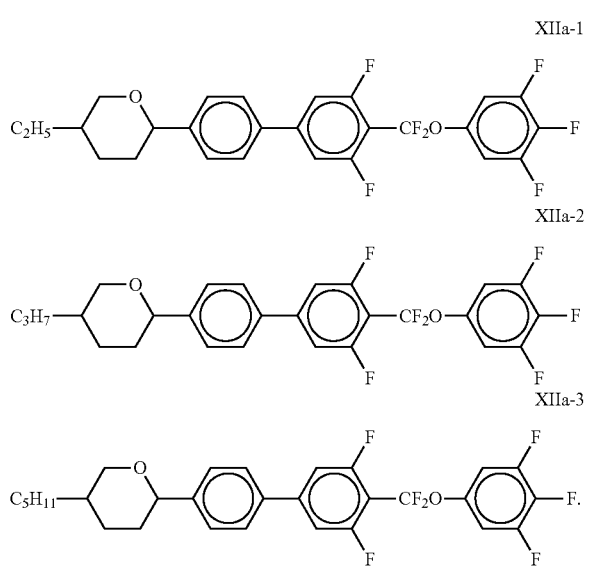

aaa) The medium comprises at least two compounds of the formula XIIa and at least two compounds of the formula XIIe.
bbb) The medium comprises one or more compounds of the formula XIIa and one or more compounds of the formula XIIe and one or more compounds of the formula IIIa.
ccc) The medium comprises at least two compounds of the formula XIIa and at least two compounds of the formula XIIe and one or more compound of the formula IIIa.
ddd) The medium comprises in total ≥25% by weight, preferably ≥30% by weight, of one or more compounds of the formula XII.
eee) The medium comprises ≥20% by weight, preferably ≥24% by weight, preferably 25-60% by weight, of compounds of the formula ZK3, in particular the compound of the formula ZK3a,

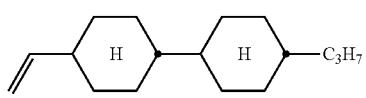

fff) The medium comprises one or more compounds selected from the group of compounds ZK3a, ZK3b and ZK3c, preferably ZK3a, in combination with compound ZK3d

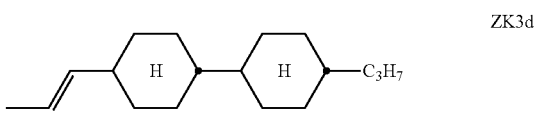

ggg) The medium comprises one or more compounds of the formula DPGU-n-F.
hhh) The medium comprises one or more compounds of the formula CDUQU-n-F.
iii) The medium comprises one or more compounds of the formula CPU-n-OXF.
jjj) The medium comprises one or more compounds of the formula CPGU-3-OT.
kkk) The medium comprises one or more compounds of the formula PPGU-n-F.
lll) The medium comprises one or more compounds of the formula PGP-n-m, preferably two or three compounds.
mmm) The medium comprises at least one compound of the formula PGP-2-2V having the structure

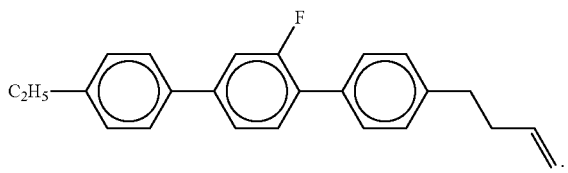

The media according to the invention preferably comprise from 0.01 to 10%, particularly preferably from 0.05 to 5% and most preferably from 0.1 to 3% of component A) comprising compounds of formula I according to the invention. The media preferably comprise one, two or three, more preferably one or two and most preferably one compound of the formula I according to the invention.

In a preferred embodiment component A) consists of compounds of formula I.

The compounds used in the present invention are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

The compounds of formula I are preferably synthesised according to or in analogy to the procedure described in GB 2306470 A.

The media according to the invention are prepared in a manner conventional per se. In general, the components are dissolved in one another, preferably at elevated temperature. By means of suitable additives, the liquid-crystalline phases of the present invention can be modified in such a way that they can be used in all types of liquid-crystal display element that have been disclosed hitherto. Additives of this type are known to the person skilled in the art and are described in detail in the literature (H. Kelker/R. Hatz, Handbook of Liquid Crystals, Verlag Chemie, Weinheim, 1980). For example, pleochroic dyes can be added for the production of coloured guest-host systems or substances can be added in order to modify the dielectric anisotropy, the viscosity and/or the alignment of the nematic phases.

The light modulation element may furthermore comprise filters which block light of certain wavelengths, for example UV filters. In accordance with the invention, further functional layers, such as, for example, protective films, heat-insulation films or metal-oxide layers, may also be present.

In the following, a suitable production process of a light modulation element according to the present invention is described in greater detail.

In a first preferred embodiment a suitable process for the production of a light modulation element according to the present invention, comprises typically the steps of
a. Providing an electrode structure on at least one of the substrates, which is capable to allow the application of an electric field, which is substantially parallel to the substrates or the liquid-crystal layer,
b. Optionally, providing an alignment layer on the other substrate or on the electrode structure,
c. Providing a layer of a polymerizable LC material on top of the alignment layer, or substrate, or electrode structure,
d. Irradiating the layer stack with actinic radiation,
e. Providing a layer of an liquid crystalline medium comprising at least a photoalignment component A) and a liquid-crystalline component B) on one of the substrates or the layer stack,
f. Assembling the cell, and
g. Irradiating the cell, with linear polarized light.

Often the sufficient alignment of the polymerisable LC material can be achieved just by providing a layer of the polymerisable LC material onto the substrate as given below. However, it is likewise possible to provide one or more alignment layers on to the substrate inducing the respective initial alignment of the calamitic reactive mesogens (RM) before the polymerisation as described above.

Typically, the alignment layer materials can be applied onto the substrates or electrode structures by conventional coating techniques like spin coating, roll-coating, dip coating or blade coating, by vapour deposition or conventional printing techniques that are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

In order to provide a layer of a polymerizable LC material on top of the alignment layer or substrate or electrode structure, preferably the polymerisable LC material is dissolved in a suitable solvent.

Suitable solvents are preferably selected from organic solvents. The solvents are preferably selected from ketones such as acetone, methyl ethyl ketone, methyl propyl ketone, methyl isobutyl ketone or cyclohexanone; acetates such as methyl, ethyl or butyl acetate or methyl acetoacetate; alcohols such as methanol, ethanol or isopropyl alcohol; aromatic solvents such as toluene or xylene; alicyclic hydrocarbons such as cyclopentane or cyclohexane; halogenated hydrocarbons such as di- or trichloromethane; glycols or their esters such as PGMEA (propyl glycol monomethyl ether acetate), γ-butyrolactone. It is also possible to use binary, ternary or higher mixtures of the above solvents.

In case the polymerisable LC material contains one or more solvents, the total concentration of all solids, including the RMs, in the solvent(s) is preferably from 10 to 60%.

The polymerisable LC material can be applied onto the alignment layer by conventional coating techniques like spin coating, bar coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

For the production of the polymer films according to the invention, the polymerisable compounds in the polymerisable LC material are polymerised or crosslinked (if one compound contains two or more polymerisable groups) by in-situ polymerisation.

The polymerisation can be carried out in one-step. It is also possible to polymerise or crosslink the compounds in a second step, which have not reacted in the first step ("end curing").

In a preferred method of preparation the polymerisable LC material is coated onto a substrate and subsequently polymerised for example by exposure to heat or actinic radiation as described for example in WO 01/20394, GB 2,315,072 or WO 98/04651.

Polymerisation of the LC material is preferably achieved by exposing it to actinic radiation. Actinic radiation means irradiation with light, like UV light, IR light or visible light, irradiation with X-rays or gamma rays, or irradiation with high-energy particles, such as ions or electrons. In a preferred embodiment, polymerisation is carried out by photo irradiation, in particular with UV light. As a source for actinic radiation, for example a single UV lamp or a set of UV lamps can be used. When using a high lamp power the curing time can be reduced. Another possible source for photo radiation is a laser, like e.g. a UV laser, an IR laser, or a visible laser.

The curing time is dependent, inter alia, on the reactivity of the polymerisable LC material, the thickness of the coated layer, the type of polymerisation initiator and the power of the UV lamp. The curing time is preferably ≤5 minutes, very preferably ≤3 minutes, most preferably ≤1 minute. For mass production, short curing times of ≤30 seconds are preferred.

A suitable UV radiation power is preferably in the range from approximately 5 $mWcm^{-2}$ to approximately 200 $mWcm^{-2}$, more preferably in the range from approximately 50 $mWcm^{-2}$ to approximately 175 $mWcm^{-2}$ and most preferably in the range from approximately 100 $mWcm^{-2}$ to approximately 150 $mWcm^{-2}$.

In connection with the applied UV radiation and as a function of time, a suitable UV dose is preferably in the range from approximately 25 $mJcm^{-2}$ to approximately 7200 $mJcm^{-2}$ more preferably in the range from approximately 500 $mJcm^{-2}$ to approximately 7200 $mJcm^{-2}$ and most preferably in the range from approximately 3000 $mJcm^{-2}$ to approximately 7200 $mJcm^{-2}$.

Polymerisation is preferably performed under an inert gas atmosphere, preferably in a heated nitrogen atmosphere, but also polymerisation in air is possible.

Polymerisation is preferably performed at a temperature from 1° C. to 70° C., more preferably 5° C. to 50° C., even more preferably 15° C. to 30° C.

In one embodiment of the present invention, the liquid crystal composition is injected between the first and second substrates or is filled into the assembled cell by capillary force after combining the first and second substrates.

In an alternative embodiment, the liquid crystal composition may be interposed between the first and second substrates by combining the second substrate to the first substrate after loading the liquid crystal composition on the first substrate. In a preferred embodiment, the liquid crystal is dispensed dropwise onto a first substrate in a process known as "one drop filling" (ODF) process, as disclosed in for example JPS63-179323 and JPH10-239694, or using the Ink Jet Printing (IJP) method. Accordingly the steps e) Assembling the cell, and f) Filling the cell with a liquid crystalline medium comprising at least a photoalignment component A) and a liquid-crystalline component B) are interchangeable with each other depending on the filling method.

In a preferred embodiment, the process according to the invention contains a process step where the liquid crystal inside the display panel is allowed to rest for a period of time in order to evenly redistribute the liquid crystal medium inside the panel (herein referred to as "annealing").

For the production of the displays according to the present invention, the photoreactive mesogen of formula I is preferably allowed to redistribute in the panel. After filling and assembly, the display panel is annealed for a time between 1 min and 3 h, preferably between 10 min and 1 h and most preferably between 20 min and 30 min. The annealing is preferably performed at room temperature.

In an alternative embodiment, the annealing is performed at elevated temperature, preferably at above 20° C. and below 140° C., more preferably above 40° C. and below 100° C. and most preferably above 50° C. and below 80° C.

In a preferred embodiment, one or more of the process steps of filling the display, annealing, photoalignment and curing of the polymerisable compound is performed at a temperature above the clearing point of the liquid crystal host mixture.

During the photoalignment of the liquid crystal inside the liquid crystal panel, anisotropy is induced by exposing the display or the liquid crystal layer to linearly polarised light.

In a preferred embodiment of the present invention the photoreactive component A) is photoaligned in a first step using linearly polarised light and in a second step further cured using linearly polarized or unpolarised UV light.

In another preferred embodiment, the linearly polarised light applied according to the process is ultraviolet light, which enables simultaneous photoalignment and curing of the photoreactive component A).

The radiation wavelength can be adjusted by UV band pass filters. The irradiation wavelength is preferably in the range from 250 nm to 450 nm, more preferably in the range from 320 nm to 390 nm. Especially preferred is an irradiation wavelength of about 365 nm.

As a source for UV radiation, for example a single UV lamp or a set of UV lamps can be used. When using a high lamp power the curing time can be reduced. Another possible source for UV radiation is a laser.

The linear polarisation of the UV radiation can be achieved by methods known to the expert. Preferably, the linear polarisation is achieved by passing the radiation through a suitable linear polarizer, such as, for example, a commercially available wire grid polariser (WGP).

Photoalignment of the photoreactive compounds of formula I and curing of the polymerisable groups of compounds of formula I can be performed simultaneously or stepwise. In case the process is split into different steps, the individual steps can be performed at the same temperature or at different temperatures.

After the photoalignment and curing step(s) a so-called "post-curing" step can optionally be performed by irradiation with UV-light and/or visible light (both either linearly or unpolarised) at reduced temperature in order to remove unreacted polymerisable compounds. The post-curing is preferably performed at above 20° C. and below 70° C., more preferably below 60° C. and most preferably above 20° C. and below 40° C.

In a second preferred embodiment a suitable process for the production of a light modulation element according to the present invention, comprises typically the steps of h. Providing an electrode structure on at least one of the substrates, which is capable to allow the application of an electric field, which is substantially parallel to the substrates or the liquid-crystal layer,
i. Laminating one or more optical films on the other substrate or on the electrode structure,
j. Providing a layer of an liquid crystalline medium comprising at least a photoalignment component A) and a liquid-crystalline component B) on one the layer stack
k. Assembling the cell, and
l. Irradiating the cell, with linear polarized light.

Preferably, one or more optical films or multilayer optical films are laminated directly onto the transparent substrate utilizing adhesive layers like for example pressure sensitive adhesives (PSA).

The light transmission of the light modulation element according to the present invention is dependent on the applied electric field. In a preferred embodiment, the light transmission of the device is high when an electric field is applied and low in the initial state when no electric field is applied.

In a preferred embodiment, the light modulation element according to the invention has a boundary state A and a boundary state B. For the purposes of the present application, the term boundary state is taken to mean a state in which the transmission reaches a maximum or minimum value and changes no further or virtually no further on a further reduction or increase in the of the applied electric field.

The light modulation element preferably has the boundary state A with a transmission $T_A$ when no electrical field is applied, the so called off state.

The light modulation element preferably has another boundary state B with a transmission $T_B$ when an electric field is applied, the so called "on state", whereby $T_A<T_B$.

The light modulation element according to the present invention can be operated with a conventional driving waveform as commonly known by the expert.

The required applied electric field strength is mainly dependent on the electrode gap and the $\Delta\varepsilon$ of the host mixture. The applied electric field strengths are typically lower than approximately 0.5 V/$\mu m^{-1}$, preferably lower than approximately 0.2 V/$\mu m^{-1}$ and more preferably lower than approximately 0.1 V/$\mu m^{-1}$.

In a preferred embodiment, the applied driving voltage is in the range from 0 V to approximately 10 V, more preferably in the range from approximately 1 V to approximately 7V, and even more preferably in the range from approximately 1.5 V to approximately 4.V.

The light modulation element of the present invention can be used in various types of optical and electro-optical devices.

Therefore, the invention also relates to the use of a light modulation element according to the present invention in an electro optical device.

Said optical and electro optical devices include, without limitation electro-optical displays, liquid crystal displays (LCDs), non-linear optic (NLO) devices, and optical information storage devices.

Accordingly, the present invention also relates to an electro optical device comprising the light modulation element according to the present invention.

Unless the context clearly indicates otherwise, as used herein plural forms of the terms herein are to be construed as including the singular form and vice versa.

The parameter ranges indicated in this application all include the limit values including the maximum permissible errors as known by the expert. The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy (Δn) is determined at a wavelength of 589.3 nm. The dielectric anisotropy (Δε) is determined at a frequency of 1 kHz or if explicitly stated at a frequency 19 GHz. The threshold voltages, as well as all other electro-optical properties, are determined using test cells produced at Merck KGaA, Germany. The test cells for the determination of Δε have a cell thickness of approximately 20 μm. The electrode is a circular ITO electrode having an area of 1.13 cm$^2$ and a guard ring. The orientation layers are SE-1211 from Nissan Chemicals, Japan, for homeotropic orientation (ε∥) and polyimide AL-1054 from Japan Synthetic Rubber, Japan, for homogeneous orientation (ε⊥). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here.

It will be appreciated that many of the features described above, particularly of the preferred embodiments, are inventive in their own right and not just as part of an embodiment of the present invention. Independent protection may be sought for these features in addition to, or alternative to any invention presently claimed.

Throughout the present application it is to be understood that the angles of the bonds at a C atom being bound to three adjacent atoms, e.g. in a C=C or C=O double bond or e.g. in a benzene ring, are 120° and that the angles of the bonds at a C atom being bound to two adjacent atoms, e.g. in a C≡C or in a C≡N triple bond or in an allylic position C=C=C are 180°, unless these angles are otherwise restricted, e.g. like being part of small rings, like 3-, 4- or 5-atomic rings, notwithstanding that in some instances in some structural formulae these angles are not represented exactly.

It will be appreciated that variations to the foregoing embodiments of the invention can be made while still falling within the scope of the invention. Alternative features serving the same, equivalent or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

The following abbreviations are used to illustrate the liquid crystalline phase behavior of the compounds: K=crystalline; N=nematic; N2=Twist-Bend nematic; S=smectic; Ch=cholesteric; I=isotropic; Tg=glass transition. The numbers between the symbols indicate the phase transition temperatures in ° C.

In the present application and especially in the following examples, the structures of the liquid crystal compounds are represented by abbreviations, which are also called "acronyms". The transformation of the abbreviations into the corresponding structures is straightforward according to the following three tables A to C.

All groups $C_nH_{2n+1}$, $C_mH_{2m+1}$, and $C_lH_{2l+i}$ are preferably straight chain alkyl groups with n, m and l C-atoms, respectively, all groups $C_nH_{2n}$, $C_mH_{2m}$ and $C_lH_{2l}$ are preferably $(CH_2)_n$, $(CH_2)_m$ and $(CH_2)_l$, respectively and —CH=CH— preferably is trans- respectively E vinylene.

Table A lists the symbols used for the ring elements, table B those for the linking groups and table C those for the symbols for the left hand and the right hand end groups of the molecules.

TABLE A

Ring Elements

| C | P |
| D | Dl |
| A | Al |

TABLE A-continued
Ring Elements
| | | | |
|---|---|---|---|
| G | 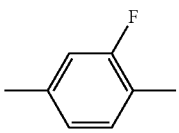 | Gl | 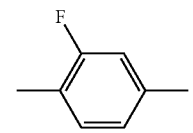 |
| U | 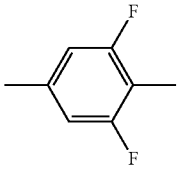 | Ul | 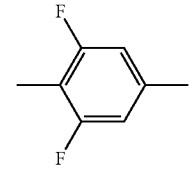 |
| Y | 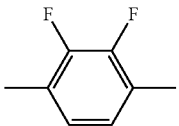 | | |
| M | 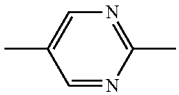 | Ml | 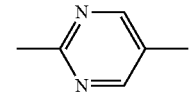 |
| N | 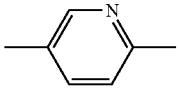 | Nl | 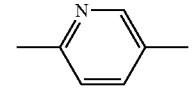 |
| np | 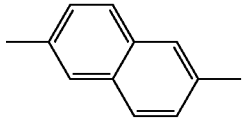 | | |
| n3f | 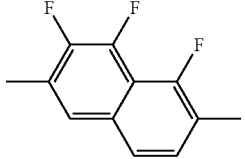 | n3fl | 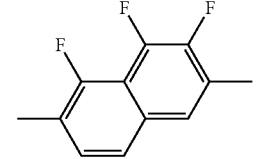 |
| th | 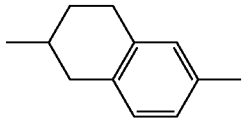 | thl | 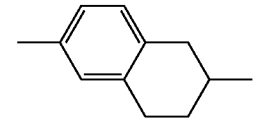 |
| th2f | 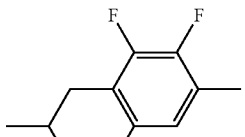 | th2fl | 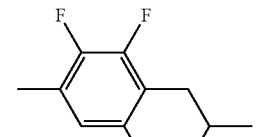 |
| o2f | 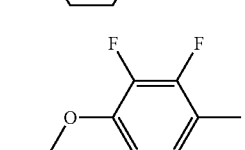 | o2fl | 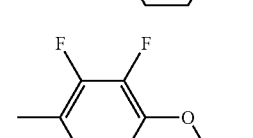 |
| dh | 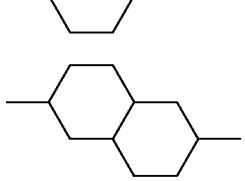 | | |

TABLE A-continued

Ring Elements

K ⟨structure: indane with F, F, F substituents and methyl⟩  Kl ⟨structure: indane mirror with F, F, F and methyl⟩

L ⟨cyclohexene with two methyl substituents⟩  Ll ⟨cyclohexene with two methyl substituents⟩

F ⟨fluoro-cyclohexene with methyl⟩  Fl ⟨fluoro-cyclohexene with methyl⟩

TABLE B

Linking Groups

| | |
|---|---|
| E | —CH$_2$—CH$_2$— |
| V | —CH=CH— |
| T | —C≡C— |
| W | —CF$_2$—CF$_2$— |
| B | —CF=CF— |
| Z | —CO—O— |
| X | —CF=CH— |
| O | —CH$_2$—O— |
| Q | —CF$_2$—O— |
| ZI | —O—CO— |
| XI | —CH=CF— |
| OI | —O—CH$_2$— |
| QI | —O—CF$_2$— |

TABLE C

End Groups

| Left hand side, used alone or in combination with others | | Right hand side, used alone or in combination with others | |
|---|---|---|---|
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |

| Left hand side, used in combination with others only | | Right hand side, used in combination with others only | |
|---|---|---|---|
| -...n...- | —C$_n$H$_{2n}$— | -...n... | —C$_n$H$_{2n}$— |
| -...M...- | —CFH— | -...M... | —CFH— |
| -...D...- | —CF$_2$— | -...D... | —CF$_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n und m each are integers, preferably between 1 and 20 and three points "..." indicate a space for other symbols of this table.

EXAMPLES

Component A—Photoreactive Compound

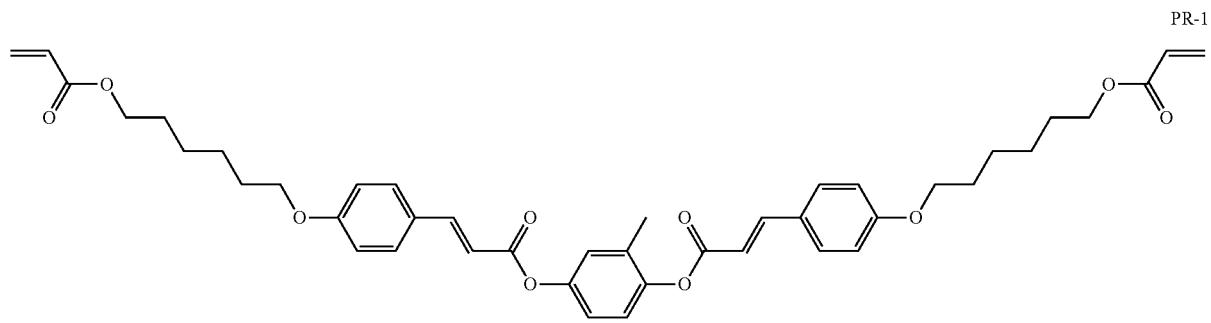 [SMILES: C=CC(=O)OCCCCCCOc1ccc(/C=C/C(=O)Oc2ccc(OC(=O)/C=C/c3ccc(OCCCCCCOC(=O)C=C)cc3)c(C)c2)cc1]

PR-1

Transition temperatures: K 92.6 N 176 I

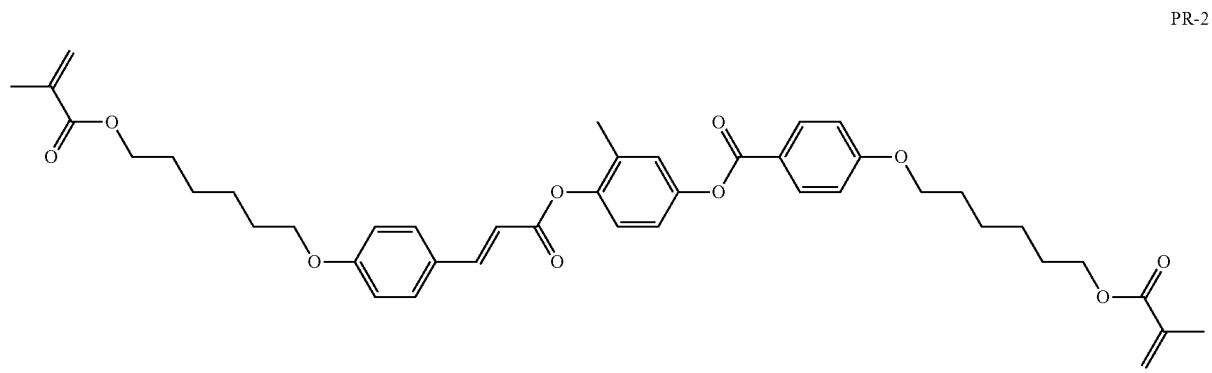 [SMILES: C=C(C)C(=O)OCCCCCCOc1ccc(/C=C/C(=O)Oc2ccc(OC(=O)c3ccc(OCCCCCCOC(=O)C(=C)C)cc3)cc2C)cc1]

PR-2

Transition temperatures: K 52 N 135 I

Component B—LC Host Mixtures

The nematic LC host mixture N-1 is prepared as indicated in the following table.

| Mixture N-1: | | | | |
|---|---|---|---|---|
| Composition Compound | | | | |
| No. | Abbreviation | c/% | Physical properties | |
| 1 | CC-3-V | 37.00 | T(N, I) = | 73.5° C. |
| 2 | CCY-3-O1 | 5.00 | $n_e$ (20° C., 589.3 nm) = | 1.583 |
| 3 | CCY-3-O2 | 9.50 | $\Delta n$ (20° C., 589.3 nm) = | 0.1005 |
| 4 | CCY-4-O2 | 5.00 | $\varepsilon_\parallel$ (20° C., 1 kHz) = | 3.70 |
| 5 | CPY-2-O2 | 10.00 | $\Delta\varepsilon$ (20° C., 1 kHz) = | −3.65 |
| 6 | CPY-3-O2 | 10.00 | $k_1$(20° C.) = | 12.7 |
| 7 | CY-3-O2 | 11.50 | $k_3$(20° C.) = | 14.7 |
| 8 | PY-3-O2 | 12.00 | $\gamma_1$ (20° C.) = | 93 |
| Σ | | 100.0 | | |

The nematic LC host mixture N-2 is prepared as indicated in the following table.

Mixture N-2:

| No. | Abbreviation | c/% | Physical properties | |
|---|---|---|---|---|
| 1 | CY-3-O2 | 15.00 | $T(N,I) =$ | 79.1° C. |
| 2 | CY-5-O2 | 9.50 | $n_e$ (20° C., 589.3 nm) = | 1.5744 |
| 3 | CCY-3-O1 | 4.00 | $\Delta n$ (20° C., 589.3 nm) = | 0.0944 |
| 4 | CCY-3-O2 | 6.00 | $\varepsilon_\parallel$ (20° C., 1 kHz) = | 3.70 |
| 5 | CCY-3-O3 | 4.50 | $\Delta\varepsilon$ (20° C., 1 kHz) = | −4.00 |
| 6 | CCY-4-O2 | 6.00 | $k_1$(20° C.) = | — |
| 7 | CCY-5-O2 | 4.00 | $k_3$(20° C.) = | |
| 8 | CPY-2-O2 | 8.00 | $\gamma_1$ (20° C.) = | — |

Mixture N-2:

| No. | Abbreviation | c/% | Physical properties |
|---|---|---|---|
| 9 | CPY-3-O2 | 9.00 | |
| 10 | PYP-2-4 | 2.00 | |
| 11 | CC-3-V | 32.00 | |
| Σ | | 100.00 | |

Reactive Mesogenic Mixtures:

The following polymerizable mesogenic mixture RMM-1 is prepared:

| Compound | %-w/w |
|---|---|
| acrylate-O-(CH$_2$)$_6$-O-C$_6$H$_4$-COO-C$_6$H$_4$-OCH$_3$ | 23.60 |
| acrylate-O-(CH$_2$)$_6$-O-C$_6$H$_4$-COO-C$_6$H$_4$-CN | 23.60 |
| acrylate-O(CH$_2$)$_3$O-C$_6$H$_4$-COO-C$_6$H$_3$(CH$_3$)-OCO-C$_6$H$_4$-O(CH$_2$)$_3$-O-acrylate | 37.80 |
| acrylate-O(CH$_2$)$_6$O-C$_6$H$_4$-COO-C$_6$H$_3$(CH$_3$)-OCO-C$_6$H$_4$-O(CH$_2$)$_6$-O-acrylate | 9.83 |
| Irgacure ®907 | 5.10 |
| Irganox ®1076 | 0.10 |
| FluoroN ®562 | 0.60 |

The following polymerizable mesogenic mixture RMM-2 is prepared:

| Compound | %-w/w |
|---|---|
| [acrylate-O-(CH₂)₆-O-phenyl-COO-phenyl-OCH₃] | 17.62 |
| [acrylate-O-(CH₂)₆-O-phenyl-COO-phenyl-CN] | 17.63 |
| [acrylate-O(CH₂)₃O-phenyl-COO-(methylphenyl)-OCO-phenyl-O(CH₂)₃-O-acrylate] | 28.25 |
| [acrylate-O(CH₂)₆O-phenyl-COO-(methylphenyl)-OCO-phenyl-O(CH₂)₆-O-acrylate] | 6.95 |
| 2,2,3,3,4,4,5,5-OCTAFLUORO-1,6-HEXANEDIOL DIACRYLATE | 25.20 |
| Irgacure ®907 | 3.82 |
| Irganox ®1076 | 0.43 |
| FluoroN ®563 | 0.09 |

The mixture RMM-2 has the additive 2,2,3,3,4,4,5,5-OCTAFLUORO-1,6-HEXANEDIOL DIACRYLATE (OFHDA).

The following polymerizable mesogenic mixture RMM-3 is prepared:

| Compound | %-w/w |
|---|---|
| [acrylate-O-(CH₂)₆-O-phenyl-COO-phenyl-cyclohexyl-C₃H₇] | 10.00 |
| CH₂=CHCO₂(CH₂)₆O-phenyl-OOC-cyclohexyl-COO-phenyl-O(CH₂)₆O₂CCH=CH₂ | 16.06 |
| CH₂=CHCO₂(CH₂)₃O-phenyl-COO-(methylphenyl)-OOC-phenyl-O(CH₂)₃O₂CCH=CH₂ | 6.87 |
| CH₂=CHCO₂(CH₂)₄OOCO-phenyl-COO-(methylphenyl)-OOC-phenyl-OCOO(CH₂)₄O₂CCH=CH₂ | 47.73 |

| Compound | %-w/w |
|---|---|
| [structure: acrylate-(CH$_2$)$_4$-OCO-cyclohexyl-COO-phenyl-COO-cyclohexyl-cyclohexyl-C$_5$H$_{11}$ with extended phenyl-alkyne chain and second acrylate arm: H$_{11}$C$_5$-cyclohexyl-cyclohexyl-OCO-phenyl-OCO-cyclohexyl-COO(CH$_2$)$_4$-O-acrylate] | 17.78 |
| Darocure ®TPO | 1.01 |
| Irganox ®1076 | 0.13 |
| FluoroN ®563 | 0.42 |

Example 1

The mixture RMM-1 is dissolved in PGMEA resulting in a 30% solution RMS-1. RMS-1 is spin-coated at 3000 rpm for 30 seconds onto a rubbed PI (AL-1054) side of a glass substrate. The resulting layer is annealed at 55° C. for 60 seconds and subsequently irradiated with 50 mW/cm$^2$ of UV (Omnicure 250-450 nm with Hg emission spectrum) for 60 seconds at 20° C. under a N2-atmosphere. The retardation is measured on a Woolam M2000 Ellipsometer. The optical film has an on-axis retardation of 118 nm at a nominal thickness of 800 nm, giving a birefringence of 0.15. The director of the polymer film is parallel to the rubbing direction of the PI film.

A test cell is assembled by utilizing a second glass substrate and 5 μm spacer beads in Norland 65 adhesive. The cell is irradiated using an Omnicure lamp (250-450 nm) at 50 mW/cm$^2$ for 60 seconds to cure the Norland adhesive. The thickness of the cell is measured and results in a cell gap of 7.4 μm.

The cell is filled by capillary action with a mixture consisting of 2.1% of PR-1 as Component A and 97.9% of nematic host mixture N-1 as component B at 100° C. and is left to settle for 3 minutes. The cell is then exposed to polarised UV light (50 mW/cm$^2$ of 250 to 450 nm measured at 365 nm for 60 seconds) at 100° C. with the direction of polarisation of the UV light at an angle of 45° to the PI rubbing direction of the polymer film substrate. The exposure is performed on a black surface. The cell is then cooled slowly to room temperature at approximately 5° C. per minute.

The alignment of the LC is measured by viewing the cell between crossed polarisers. A homogenous dark state is observed when the direction of polarisation of the PUV light from the exposure is parallel to one of the crossed polariser directions. A homogenous bright state is observed at other angles. This indicates that the LC is aligned with the direction of polarisation of the PUV light exposure rather than the director of the polymer film.

The results show clearly that using this technique and these parameters an alignment of the LC medium is possible independently of the alignment of the in-cell polymer film.

Example 2

The mixture RMM-2 is dissolved in PGMEA resulting in a 34.45% solution RMS-2. Four polymer films are made by spin coating RMS-2 onto a rubbed PI (AL-1054) side of a glass substrate at 3000 rpm for 30 seconds and subsequently annealed at 55° C. for 60 seconds. Four reference polymer films are made using the equivalent method using RMS-01 as given above in example 1, which does not contain the OFHDA additive. The resulting layers are all irradiated with 50 mW/cm$^2$ of UV (250 to 450 nm Omnicure lamp with Hg emission spectrum) for 60 seconds at 20° C. under an N2-atmosphere and the retardation of the resulting polymer film is measured on a Woolam M2000 Ellipsometer. The polymer films made with RMS-2 exhibit an on-axis retardation of 95.1 to 99.5 nm at a nominal thickness of 830 nm, giving a birefringence of 0.11 to 0.12. The polymer films made with RMS-1 exhibit an on-axis retardation of 132.4 to 133.5 nm at a nominal thickness of 830 nm, giving a birefringence of 0.160 to 0.161. In both cases the director of the polymer film is parallel to the rubbing direction of the PI film.

Test cells are assembled by utilizing a second glass substrate and 5 μm spacer beads in Norland 65 adhesive. The cells are irradiated using an Omnicure lamp (250-450 nm) at 50 mW/cm² for 60 seconds to cure the Norland adhesive. The cell thickness of each cell is measured before filling. The cell gaps range from 8.3 μm to 16.6 μm.

The cells are filled by capillary action with a mixture consisting of 1.9% of PR-1 as Component A and 98.1% of nematic host mixture N-1 as component B at 100° C. and are left to settle for 3 minutes. The cells are exposed to polarised UV light (50 mW/cm² of 250 to 450 nm measured at 365 nm) at 100° C. with the direction of polarisation of the UV light at an angle of 45° to the PI rubbing direction on the polymer film substrate. Four different exposures doses of 30, 40, 50 and 60 seconds are used for the two cell types (with and without OFHDA additive). The exposure is performed on a black surface. The cell is cooled slowly to room temperature at approximately 5° C. per minute.

The alignment of the LC in each cell is measured by viewing the cell between crossed polarisers. A homogeneous dark state when the direction of polarisation of the PUV exposure is parallel to one of the crossed polarisers indicates that the LC is aligned with the direction of polarisation of the PUV light. No homogenous dark state indicates that the director of the LC is twisted though the thickness of the cell. A summary of the results is given in the following table:

| Exposure times [s] | 30 | 40 | 50 | 60 |
|---|---|---|---|---|
| RMM-1, No Additive | No homogenous dark state—twisted alignment | No homogenous dark state—twisted alignment | No homogenous dark state—twisted alignment | Dark state observed—aligned with PUV |
| RMM-2, 25.2% OFHDA | No homogenous dark state—twisted alignment | Dark state observed—aligned with PUV | Dark state observed—aligned with PUV | Dark state observed—aligned with PUV |

The cells with the OFHDA additive in the polymer film have alignment of the LC parallel to the direction of polarisation of the PUV light for exposure times of 40, 50 and 60 s and a twisted LC alignment for the exposure time of 30 s. The cells with no OFHDA additive in the polymer film have alignment of the LC with the direction of polarisation of the PUV light for the exposure time of 60 s and a twisted LC alignment for the exposure times of 30, 40 and 50 s.

The results indicate that the OFHDA additive in the RM film is beneficial in that it extends the processing window for the photoinduced alignment of the LC in terms of total PUV dosage required from a minimum of 60 s without the additive down to 40 s with the additive.

Example 3

Four films are made by spin coating RMS-2 onto a rubbed PI (AL-1054) side of a glass substrate at 3000 rpm for 30 seconds and subsequently annealed at 55° C. for 60 seconds. Four reference films are made using the equivalent method using RMS-01 as given above in example 1. The resulting layers are all irradiated with 50 mW/cm² of UV (250 to 450 nm Omnicure lamp with Hg emission spectrum) for 60 seconds at 20° C. under an N2-atmosphere and the retardation of the resulting polymer film is measured on a Woolam M2000 Ellipsometer. The polymer films made with RMS-2 exhibit an on-axis retardation of 92.1 to 96.3 nm at a nominal thickness of 770 nm, giving a birefringence of 0.120 to 0.125. The polymer films made with RMS-1 exhibit an on-axis retardation of 118.5 to 119.4 nm at a nominal thickness of 800 nm, giving a birefringence of 0.148 to 0.149. In both cases, the director of the polymer film is parallel to the rubbing direction of the PI film Test cells are assembled by utilizing a second glass substrate and 5 μm spacer beads in Norland 65 adhesive. The cells are irradiated using an Omnicure lamp (250-450 nm) at 50 mW/cm² for 60 seconds to cure the Norland adhesive. The cell thickness of each cell is measured before filling. The cell gaps range from 8.2 μm to 12.1 μm.

The cells are filled by capillary action with a mixture consisting of 2.0% of the PR-1 as Component A and 98.0% of nematic host mixture N-1 as component B at 100° C. and are left to settle for 3 minutes. The cells are exposed to polarised UV light (50 mW/cm² of 250 to 450 nm measured at 365 nm) for 60 s at 100° C. with the direction of polarisation of the UV light at an angle of 45° to the PI rubbing direction of the polymer film sample. The collimation of the PUV can be adjusted and is quantified by the cone angle. The cone angle is twice the inverse tan function of the radius that the beam makes at the cell position divided by the distance of the lamp head to the cell position. Four different PUV cone angles of 45.9°, 39.4°, 33.3° and 79.6° are used for the two cell types (with and without OFHDA additive). The exposure is performed on a black surface. The cells are cooled slowly to room temperature at approximately 5° C. per minute.

The alignment of the LC in each cell is measured by viewing the cell between crossed polarisers. A homogeneous dark state when the direction of polarisation of the PUV light is parallel to one of the crossed polarisers indicates that the LC is aligned with the direction of polarisation of the PUV light. No homogenous dark state indicates that the director of the LC is twisted though the thickness of the cell. A summary of the results are given in following table:

| Cone angle of PUV | 33.3° | 45.9° | 39.4° | 79.6° |
|---|---|---|---|---|
| RMM-1, No Additive | Dark state observed—aligned with PUV | No homogenous dark state—twisted alignment | No homogenous dark state—twisted alignment | No homogenous dark state—twisted alignment |
| RMM-2, 25.2% OFHDA | Dark state observed—aligned with PUV | Dark state observed—aligned with PUV | Dark state observed—aligned with PUV | Dark state observed—aligned with PUV |

The cells with the OFHDA additive in the polymer film have alignment of the LC with the direction of polarisation of the PUV light for all cone angles. The cells with no OFHDA additive in the polymer film have alignment of the LC with the direction of polarisation of the PUV light for the smallest cone angle of 33.3° but have a twisted alignment for higher cone angles.

The results indicate that the OFHDA additive in the RM film is beneficial as it extends the processing window for the photoinduced LC alignment in terms of the PUV collimation requirements.

Example 4

The mixture RMM-3 is dissolved in a 7:3 ratio of Toluene:Cyclohexanone resulting in a 33% solution RMS-3.

RMS-3 is spin-coated at 6000 rpm for 30 seconds onto a rubbed PI (AL-1054) side of a glass substrate. The resulting layer is annealed at 68° C. for 60 seconds and subsequently irradiated with 80 mW/cm² of UV (Dela 365 nm Narrow Band LED lamp) for 60 seconds at 20° C. under a $N_2$-atmosphere. The retardation is measured on a Woolam M2000 Ellipsometer. The optical film has an on-axis retardation of 130 nm at a nominal thickness of 1,040 nm, giving a birefringence of 0.12. The director of the polymer film is parallel to the rubbing direction of the PI film. The dispersion, defined as the ration on-axis retardation measured with light with wavelength of 450 nm and 550 nm was 1.035. As the dispersion is close to 1 the film can be considered to be flat.

The following isotropic polymer mixture IPM-1 is prepared:

| Compound | % w-w |
|---|---|
| Irgacure 907 | 5.00 |
| Irganox 1076 | 0.08 |
| HDDA | 20.00 |
| 2-Ethylhexyl acrylate (EHA) | 74.92 |

IPM-1 is spin coated at 3,000 RPM for 30 s on top of the optical film obtained from RMM-3 and irradiated with 50 mW/cm² of UV (Omnicure 250-450 nm with Hg emission spectrum) for 60 seconds at 20° C. under a $N_2$-atmosphere. To prevent IPM-1 from de-wetting from the RMM-3 film was exposed to UV ozone for 10 minutes. The nominal thickness of the isotropic layer was 100 nm.

A test cell is assembled by utilizing a second glass substrate and 5 μm spacer beads in Norland 65 adhesive. The cell is irradiated using an Omnicure lamp (250-450 nm) at 50 mW/cm² for 60 seconds to cure the Norland adhesive. The thickness of the cell is measured and results in a cell gap of 13.8 μm.

The cell is filled by capillary action with a mixture consisting of 1.0% of PR-2 as Component A and 99.0% of nematic host mixture N-2 as component B at 100° C. and is left to settle for 3 minutes. The cell is then exposed to polarised UV light (50 mW/cm² of 250 to 450 nm measured at 365 nm for 60 seconds) at 100° C. with the direction of polarisation of the UV light at an angle of 45° to the PI rubbing direction of the polymer film substrate. The exposure is performed on a black surface. The cell is then cooled slowly to room temperature at approximately 5° C. per minute.

The alignment of the LC is measured by viewing the cell between crossed polarisers. A homogenous dark state is observed when the direction of polarisation of the PUV light from the exposure is parallel to one of the crossed polariser directions. A homogenous bright state is observed at other angles. This indicates that the LC is aligned with the direction of polarisation of the PUV light exposure rather than the director of the polymer film.

The results show clearly that using this technique and these parameters an alignment of the LC medium is possible independently of the alignment of the in-cell polymer film.

The invention claimed is:

1. A light modulation element comprising a pair of substrates, one or more optical films located on the inner side of one of the substrates, an electrode structure capable of inducing an electric field substantially in parallel to the substrates main plane, and a homogenously aligned liquid crystalline medium, which is obtained from a photoalignment component A and a liquid-crystalline component B comprising polymerizable liquid crystalline materials comprising one or more multi- or direactive mesogenic compounds, optionally one or more monoreactive mesogenic compounds, and one or more polymerizable isotropic compounds of formula DRI, $$P^1\text{-}Sp^1\text{-}(CF_2)_n\text{-}Sp^2\text{-}P^2 \qquad \text{DRI}$$

wherein
$P^1$ and $P^2$ independently of each other denote a polymerisable group,
$Sp^1$ and $Sp^2$ independently of each other are a spacer group or a single bond, and n denotes an integer from 2 to 12.

2. Light modulation element according to claim 1, wherein the one or more di- or multireactive mesogenic compounds are of formula DRM $$P^1\text{-}Sp^1\text{-}MG\text{-}Sp^2\text{-}P^2 \qquad \text{DRM}$$

wherein
$p^1$ and $p^2$ independently of each other denote a polymerizable group,
$Sp^1$ and $Sp^2$ independently of each other are a spacer group or a single bond, and
MG is a mesogenic group, which is of formula MG $$-(A^1-Z^1)_n-A^2 \qquad \text{MG}$$

wherein
$A^1$ and $A^2$ denote, in case of multiple occurrence independently of one another, an aromatic or alicyclic group, which optionally contains one or more heteroatoms selected from N, O and S, and is optionally mono- or polysubstituted by $L^1$,
$L^1$ denotes, in case of multiple occurrence independently of one another, $P^1$-$Sp^1$-, F, Cl, Br, I, —CN, —NO₂, —NCO, —NCS, —OCN, —SCN, —C(=O)Nr$^{00}$R$^{000}$, —C(=O)OR$^{00}$, —C(=O)R$^{00}$, —Nr$^{00}$R$^{000}$, —OH, —SF₅, optionally substituted silyl, aryl or heteroaryl with 1 to 12 C atoms, and straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl,
$Z^1$ denotes, in case of multiple occurrence independently of one another, —O—, —S—, —CO—, —COO—, —OCO—,
—S—CO—, —CO—S—, —O—COO—, —CO—NR$^{00}$—, —NR$^{00}$—CO—,
—NR$^{00}$—CO—NR$^{000}$, —NR$^{00}$—CO—O—, —O—CO—NR$^{00}$—,
—OCH₂—, —CH₂O—, —SCH₂—, —CH₂S—, —CF₂O—, —OCF₂—,
—CF₂S—, —SCF₂—, —CH₂CH₂—, —(CH₂)$_{n1}$, —CF₂CH₂—,
—CH₂CF₂—, —CF₂CF₂—, —CH=N—, —N=CH—, —N=N—,
—CH=CR$^{00}$—, —CY$^1$=CY$^2$—, —C≡C—, —CH=CH—COO—,
—OCO—CH=CH—or a single bond,
R$^{00}$ and R$^{000}$ independently of each other denote H or alkyl with 1 to 12 C-atoms,
$Y^1$ and $Y^2$ independently of each other denote H, F, Cl or CN,
n is 1, 2, 3 or 4,
n1 is an integer from 1 to 10.

3. The light modulation element according to claim 1, wherein in the one or more polymerizable isotropic compounds of formula DRI, Sp¹ and Sp² independently of each other are a spacer group of the formula Sp'-X',
wherein Sp' denotes alkylene having 1 to 20 carbon atoms which is optionally mono- or polysubstituted by F, Cl, Br, I or CN and in which, in addition, one or more non-adjacent CH2 groups may each be replaced, independently of one another, by —O—, —S—, —NH—, —NRxx-, —SiRxxRyy-, —CO—, —COO—, —O—, —OCO—O—, —S CO—, —CO—S—, —NRxx-CO—O—, —O—CO—NR$^{0xx}$, —NR$^{xx}$—CO—NR$^{yy}$, —CH=CH— or —C≡C— in such a way that O and/or S atoms are not linked directly to one another,
X' denotes —O—, —S—, —CO—, —COO—, —OCO—, —O—COO—, —CO—NR$^{xx}$—, —NR$^{xx}$—CO—, —NR$^{xx}$—CO—NR$^{yy}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, or a single bond.

4. The light modulation element according to claim 1, comprising one or more optical films that are A-plates, C-Plates, 0-plates, biaxial films and/or cholesteric films.

5. The light modulation element according to claim 1, wherein one or more optical films exhibit positive wavelength dispersion.

6. The light modulation element according to claim 1, wherein one or more optical films exhibit negative or flat wavelength dispersion.

7. The light modulation element according to claim 1, comprising additionally an isotropic layer on top of the optical film.

8. The light modulation element according to claim 1, wherein the photoalignment component A comprises one or more photoreactive mesogenic compounds of formula I,

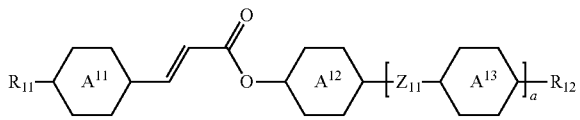

I wherein
A$^{11}$ denotes an aryl or heteroaryl group, which may be substituted by one or more radicals L,
A$^{12}$, A$^{13}$ are each, independently of one another, defined like A$^{11}$ or denote a cycloalkyl group having 3 to 10 C atoms, in which 1 to 4 non-adjacent CH$_2$ groups may be replaced by O and in which one or more H atoms may be replaced by a group L,
L on each occurrence, identically or differently, denotes OH, F, Cl, Br, I, —CN, —NO$_2$, SF$_5$, —NCO, —NCS, —OCN, —SCN, —C(=O)N(R$^z$)$_2$, —C(=O)R$^z$, —N(R$^z$)$_2$, optionally substituted silyl, optionally substituted aryl having 6 to 20 C atoms, or straight-chain or branched alkyl or alkenyl with up to 15 C atoms in which one or more non adjacent CH$_2$-groups may be replaced by —O—, —S—, —CO—, —C(O)O—, —O—C(O)—, O—C(O)—O—, in which, in addition, one or more H atoms may be replaced by F or Cl,
Z$^{11}$ on each occurrence, identically or differently, denotes —CH$_2$CH$_2$—, —CF$_2$CF$_2$—, —CF$_2$CH$_2$—, —CH$_2$CF$_2$—, —C(O)O—, —OC(O)—, —CH=CH—COO—, —OCO—CH=CH—, or a single bond, R$^{11}$ and R$^{12}$ identically or differently, denote a group P—Sp—, or halogen, CN, optionally fluorinated alkyl or alkenyl with up to 15 C atoms in which one or more non adjacent CH$_2$-groups may be replaced by —O—, —S—, —CO—, —C(O)O—, —O—C(O)—, O—C(O)—O—,
whereby at least one of R$^{11}$ and R$^{12}$ denotes a group P-Sp-,
R$^z$ each, independently of one another, denote H or alkyl having 1-12 C atoms,
P a polymerisable group,
Sp a spacer group or a single bond,
a is 0 or 1.

9. The light modulation element according to claim 1, wherein the liquid crystalline medium exhibits dielectrically negative anisotropy.

10. The light modulation element according to claim 1, wherein the liquid crystalline medium exhibits dielectrically positive anisotropy.

11. A process for the production of a light modulation element according to claim 1, comprising
a. providing an electrode structure on at least one of the substrates, which is capable to allow the application of an electric field, which is substantially parallel to the substrates or the liquid-crystal layer,
b. optionally providing an alignment layer on the other substrate or on the electrode structure,
c. providing a layer of a polymerizable liquid crystalline material on top of the alignment layer, or substrate, or electrode structure,
d. irradiating the layer stack with actinic radiation,
f. providing a layer of a liquid crystalline medium comprising at least a photoalignment component A and a liquid-crystalline component B on the layer stack,
e. assembling the cell, and
g. irradiating the cell, with linear polarized light.

12. A process for the production of a Light modulation element according to claim 1, comprising
h. providing an electrode structure on at least one of the substrates, which is capable to allow the application of an electric field, which is substantially parallel to the substrates or the liquid-crystal layer,
i. laminating one or more optical films on the substrate or on the electrode structure,
j. providing a layer of an liquid crystalline medium comprising at least a photoalignment component A and a liquid-crystalline component B on one of the substrates or the layer stack,
k. assembling a cell, and
l. irradiating the cell, with linear polarized light.

13. An electro optical device comprising the light modulation element according to claim 1.

14. The light modulation element according to claim 8, wherein A$^{11}$ is phenyl, biphenyl, terphenyl, [1,1':3',1"]-terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, pyrrole, pyrazole, imidazole, 1,2,3-triazole, 1,2,4-triazole, tetrazole, furan, thiophene, selenophene, oxazole, isoxazole, 1,2 thiazole, 1,3-thiazole, 1,2,3-oxadiazole, 1,2,4 oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, indole, isoindole, indolizine, indazole, benzimidazole, benzotriazole, purine, naphth-imidazole, phenanthrimidazole, pyridimidazole, pyrazinimidazole, quinoxalinimidazole, benzoxazole, naphthoxazole, anthroxazole, phen-anthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]-thiophene, dithienothiophene, isobenzothiophene, dibenzothiophene, or benzothiadiazothiophene.

\* \* \* \* \*